United States Patent
Udy et al.

(10) Patent No.: US 12,484,746 B2
(45) Date of Patent: Dec. 2, 2025

(54) EXTRACTION CLEANER

(71) Applicant: SHARKNINJA OPERATING LLC, Needham, MA (US)

(72) Inventors: Adam Udy, Eastbourne (GB); Lee Cottrell, Edenbridge (GB); Chi Ho Hui, London (GB); Jian cheng Wang, Suzhou (CN); Fariha Ahmed, Brighton, MA (US); Jennifer Andrews, Cambridge, MA (US); Devan Schappler, Woburn, MA (US); Dejian He, Suzhou (CN); Kevin O'Malley, London (GB); Ognjen Vrdoljak, Quebec (CA); Peter Cahaly, West Newbury, MA (US); Scott Niedzwecki, Plainville, MA (US); Bartholomew De Banzie Lampard, London (GB); Qiang Liu, Suzhou (CN); Yinhui Li, Suzhou (CN); Daniel Innes, Worthing (GB); Jordan Ridgley, High Wycombe (GB); Bin Yao, Suzhou (CN); Linqiang Feng, Suzhou (CN); Yongsheng Lai, Suzhou (CN); Mingchun Zhu, Suzhou (CN); Mingliang Qin, Suzhou (CN); Xavier Cullere, Newton, MA (US); Zach Shonfeld, Cambridge, MA (US); Ryan Shimizu, Framingham, MA (US); Jeremy McDaniel, Plainville, MA (US); Richard Marc Dahlgren, Plymouth, MA (US)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 18/664,955

(22) Filed: May 15, 2024

(65) Prior Publication Data

US 2024/0292995 A1    Sep. 5, 2024

Related U.S. Application Data

(63) Continuation of application No. 18/207,551, filed on Jun. 8, 2023, now Pat. No. 12,336,682, and a
(Continued)

(51) Int. Cl.
*A47L 11/40*    (2006.01)
*A47L 5/22*    (2006.01)
(Continued)

(52) U.S. Cl.
CPC ............ *A47L 7/0014* (2013.01); *A47L 5/225* (2013.01); *A47L 7/0023* (2013.01); *A47L 9/04* (2013.01);
(Continued)

(58) Field of Classification Search
CPC .. A47L 5/225; A47L 11/4016; A47L 11/4083; A47L 11/4088; A47L 9/242; A47L 11/302
See application file for complete search history.

(56) References Cited

U.S. PATENT DOCUMENTS 4,168,563 A * 9/1979 O'Bryan .............. A47L 11/4083
                                                15/321
5,896,617 A * 4/1999 Kasen ..................... A47L 11/03
                                                15/320
(Continued)

FOREIGN PATENT DOCUMENTS

AU    2008200975 B2    9/2012
AU    2010246496 B2    11/2013
(Continued)

OTHER PUBLICATIONS

US 11,439,288 B2, 09/2022, Clas et al. (withdrawn)
(Continued)

*Primary Examiner* — Marc Carlson

(74) *Attorney, Agent, or Firm* — Mintz, Levin, Cohn, Ferris, Glovsky and Popeo, P.C.

(57) ABSTRACT

An extraction cleaner may include a base, an upright body pivotally coupled to the base, a supply tank removably coupled to the upright body and a recovery tank removably coupled to the upright body. The base may include a non-removable door and a removable suction nozzle. At least one fluid dispensing nozzle may be provided on the door. The door may be pivotally coupled to the base for providing access to an agitator. The cleaner may include and auto-spray configuration. The cleaner may include a support on the upright portion for the recovery tank. The cleaner may include an additive tank received in a receptacle of the supply tank. The recovery tank may include a float and/or an airflow management configuration. The cleaner may include a cleaning tool and a suction changeover valve and/or a fluid changeover valve. The cleaner may include a mixing valve for supplying fluid to a fluid changeover valve. A cleaning composition including an aqueous based cleaning solution mixed, on demand, with an aqueous based oxidizing solution is also provided.

19 Claims, 29 Drawing Sheets

Related U.S. Application Data continuation of application No. 18/207,579, filed on Jun. 8, 2023, now Pat. No. 12,011,129, said application No. 18/207,551 is a continuation of application No. PCT/CN2023/083670, filed on Mar. 24, 2023.

(60) Provisional application No. 63/440,250, filed on Jan. 20, 2023.

(51) Int. Cl.
*A47L 7/00* (2006.01)
*A47L 9/04* (2006.01)
*A47L 9/24* (2006.01)
*A47L 9/28* (2006.01)
*A47L 11/30* (2006.01)

(52) U.S. Cl.
CPC ......... *A47L 9/2847* (2013.01); *A47L 11/4011* (2013.01); *A47L 11/4016* (2013.01); *A47L 11/4083* (2013.01); *A47L 11/4088* (2013.01); *A47L 9/242* (2013.01); *A47L 11/302* (2013.01); *A47L 11/408* (2013.01)

(56) References Cited

U.S. PATENT DOCUMENTS

| | | | | |
|---|---|---|---|---|
| 6,467,122 B2* | 10/2002 | Lenkiewicz | ........ | A47L 11/4008 15/365 |
| 6,735,811 B2* | 5/2004 | Field | ........ | B01J 13/0095 15/353 |
| 6,775,880 B2* | 8/2004 | Kasper | ........ | A47L 11/34 15/322 |
| 7,076,830 B2* | 7/2006 | Conner | ........ | A47L 9/2842 15/340.1 |
| 7,156,324 B2* | 1/2007 | Birrenkott | ........ | B05B 7/2478 239/585.1 |
| 7,237,299 B2* | 7/2007 | Tondra | ........ | A47L 11/4061 15/319 |
| 7,305,731 B2 | 12/2007 | Graham | | |
| 7,340,797 B2* | 3/2008 | Theiss, Jr. | ........ | A47L 11/4091 15/353 |
| 7,362,064 B2* | 4/2008 | Coates | ........ | A47L 11/03 15/340.1 |
| 7,367,081 B2* | 5/2008 | O'Neal | ........ | A47L 5/32 15/334 |
| 7,484,265 B2* | 2/2009 | Kasper | ........ | A47L 11/4088 15/334 |
| 7,617,563 B2* | 11/2009 | Hertrick | ........ | A47L 11/4088 15/322 |
| 7,631,386 B1* | 12/2009 | Santiago | ........ | A47L 11/34 15/24 |
| 7,657,965 B2* | 2/2010 | Scott | ........ | A47L 11/4083 15/320 |
| 7,685,671 B2* | 3/2010 | Jansen | ........ | A47L 9/325 15/328 |
| 7,718,593 B2 | 5/2010 | Micciche et al. | | |
| 7,725,985 B2* | 6/2010 | Krebs | ........ | A47L 9/0653 15/246.2 |
| 7,757,342 B2* | 7/2010 | Gordon | ........ | A47L 5/30 15/322 |
| 7,775,734 B2* | 8/2010 | Dylkiewicz | ........ | B43K 5/17 401/108 |
| 7,784,148 B2 | 8/2010 | Lenkiwicz et al. | | |
| 7,784,311 B2* | 8/2010 | Santoemma | ........ | G05D 11/006 68/205 R |
| 7,823,250 B2* | 11/2010 | Vander Baan | ........ | A47L 5/34 15/328 |
| 7,845,045 B2* | 12/2010 | Lenkiewicz | ........ | A47L 11/4013 15/389 |
| 7,849,556 B1 | 12/2010 | Jansen | | |
| 7,904,990 B1* | 3/2011 | Miner | ........ | A47L 11/4044 15/320 |
| 7,906,473 B2 | 3/2011 | Williams et al. | | |
| 7,908,705 B2 | 3/2011 | Vanderbaan | | |
| 7,979,955 B2 | 7/2011 | Lenkiewicz et al. | | |
| 8,122,562 B2 | 2/2012 | Krebs | | |
| 8,146,200 B2 | 4/2012 | Krebs et al. | | |
| 8,214,968 B2* | 7/2012 | Griffith | ........ | A47L 9/30 15/415.1 |
| 8,230,549 B2* | 7/2012 | Lenkiewicz | ........ | A47L 11/4088 15/322 |
| 8,230,550 B2 | 7/2012 | Krebs et al. | | |
| 8,327,503 B2* | 12/2012 | Worker | ........ | A47L 9/242 15/334 |
| 8,338,354 B2* | 12/2012 | Williams | ........ | C11D 3/0047 510/400 |
| 8,349,088 B1 | 1/2013 | Miner | | |
| 8,381,352 B2* | 2/2013 | Huffman | ........ | A47L 11/4016 15/320 |
| 8,516,650 B2* | 8/2013 | Beers | ........ | A47L 9/2889 15/319 |
| 8,635,740 B2* | 1/2014 | Gordon | ........ | A47L 11/34 15/320 |
| 8,756,752 B2* | 6/2014 | Krondorfer | ........ | H04B 7/0632 15/320 |
| 8,806,712 B2 | 8/2014 | Griffith | | |
| 8,850,654 B2* | 10/2014 | Nolan | ........ | A47L 13/22 15/328 |
| 8,887,347 B2* | 11/2014 | Louis | ........ | A47L 11/34 15/320 |
| 8,927,480 B2* | 1/2015 | Williams | ........ | A61L 9/03 15/228 |
| 8,978,207 B2* | 3/2015 | Sutrina | ........ | A47L 9/068 16/334 |
| 9,015,898 B2* | 4/2015 | Nguyen | ........ | A47L 11/4002 15/327.2 |
| 9,138,119 B1* | 9/2015 | Bantum | ........ | A47L 11/4088 |
| 9,155,437 B2* | 10/2015 | Williams | ........ | A47L 11/34 |
| 9,186,028 B2* | 11/2015 | White | ........ | A47L 5/225 |
| 9,265,394 B2* | 2/2016 | Van Der Kooi | ........ | A47L 9/0477 |
| 9,282,869 B2* | 3/2016 | Wall | ........ | A47L 11/202 |
| 9,320,402 B2* | 4/2016 | Krondorfer | ........ | A47L 7/0004 |
| 9,320,405 B2* | 4/2016 | Luedke | ........ | A47L 13/225 |
| 9,380,921 B2* | 7/2016 | Nguyen | ........ | A47L 11/408 |
| 9,392,922 B2 | 7/2016 | Lenkiewicz | | |
| 9,398,836 B2 | 7/2016 | Luedke et al. | | |

(56) References Cited

U.S. PATENT DOCUMENTS

| | | | |
|---|---|---|---|
| 9,414,728 B2* | 8/2016 | Van Der Kooi | A47L 9/0488 |
| 9,474,424 B2* | 10/2016 | Moyher, Jr. | A47L 11/4025 |
| 9,615,713 B2* | 4/2017 | Salo | A47L 11/4041 |
| 9,661,972 B2 | 5/2017 | Bantum | |
| 9,706,893 B2 | 7/2017 | Wall et al. | |
| 9,820,627 B2* | 11/2017 | Caro, Jr. | A47L 11/4088 |
| 9,855,350 B1* | 1/2018 | Dahlquist | B05B 9/0822 |
| 10,039,431 B1* | 8/2018 | Li | A47L 11/4091 |
| 10,092,155 B2* | 10/2018 | Xia | A47L 11/4086 |
| 10,189,614 B2* | 1/2019 | Pruiett | B65D 47/32 |
| 10,238,260 B2 | 3/2019 | Lenkiewicz et al. | |
| 10,512,383 B2* | 12/2019 | Luyckx | A47L 7/0004 |
| 10,575,700 B2* | 3/2020 | Conrad | A47L 11/201 |
| 10,631,702 B2 | 4/2020 | Xia et al. | |
| 10,716,448 B2 | 7/2020 | Conrad et al. | |
| 10,729,303 B2 | 8/2020 | Li et al. | |
| 10,813,519 B2 | 10/2020 | Diana et al. | |
| 10,813,520 B2 | 10/2020 | Diana et al. | |
| 10,813,521 B2* | 10/2020 | Diana | A47L 11/4011 |
| 10,820,762 B2* | 11/2020 | Paulla | A47L 7/0028 |
| 10,820,769 B2 | 11/2020 | Xia et al. | |
| 10,820,770 B2 | 11/2020 | Diana et al. | |
| 10,894,639 B2 | 1/2021 | Pruiett | |
| 10,925,455 B1 | 2/2021 | Xia et al. | |
| 10,966,586 B2 | 4/2021 | Luyckx et al. | |
| 10,973,383 B1* | 4/2021 | Nguyen | A47L 5/30 |
| 10,980,386 B2* | 4/2021 | Nguyen | A47L 11/4091 |
| 11,013,389 B2* | 5/2021 | Resch | A47L 11/145 |
| 11,039,723 B2* | 6/2021 | Pruiett | A47L 11/4019 |
| 11,071,428 B2 | 7/2021 | Resch et al. | |
| 11,076,735 B2 | 8/2021 | Resch et al. | |
| 11,083,170 B2* | 8/2021 | Moyher, Jr. | A47L 11/4044 |
| 11,089,933 B2 | 8/2021 | Xia et al. | |
| 11,096,539 B2 | 8/2021 | Xia et al. | |
| 11,096,540 B2 | 8/2021 | Xia et al. | |
| 11,096,541 B2 | 8/2021 | Xia et al. | |
| 11,096,542 B2 | 8/2021 | Xia et al. | |
| 11,096,543 B2 | 8/2021 | Xia et al. | |
| 11,096,544 B2 | 8/2021 | Nguyen et al. | |
| 11,122,946 B2* | 9/2021 | Nguyen | A47L 9/325 |
| 11,122,949 B2 | 9/2021 | Xia et al. | |
| 11,147,426 B2 | 10/2021 | Nguyen et al. | |
| 11,160,431 B2* | 11/2021 | Nguyen | A47L 9/2857 |
| 11,172,801 B2* | 11/2021 | Pohlman | A47L 11/03 |
| 11,185,205 B2 | 11/2021 | Luyckx et al. | |
| 11,206,962 B1* | 12/2021 | Tam | A47L 9/04 |
| 11,241,134 B2 | 2/2022 | Xia et al. | |
| 11,259,679 B2* | 3/2022 | Royale | A47L 9/0027 |
| 11,284,767 B2* | 3/2022 | Nguyen | A47L 11/4044 |
| 11,291,345 B2* | 4/2022 | Davila | A47L 11/302 |
| 11,304,581 B2 | 4/2022 | Resch et al. | |
| 11,363,923 B2 | 6/2022 | Paulla et al. | |
| 11,382,477 B2* | 7/2022 | Terry | A47L 9/2842 |
| 11,382,481 B2 | 7/2022 | Royale | |
| 11,395,571 B2 | 7/2022 | Diana et al. | |
| 11,406,240 B1 | 8/2022 | Davila et al. | |
| 11,432,699 B2* | 9/2022 | Krebs | A47L 11/28 |
| 11,484,174 B2* | 11/2022 | Clas | A47L 11/4044 |
| 11,490,774 B2 | 11/2022 | Scholten et al. | |
| 11,529,037 B2* | 12/2022 | Huang | A47L 11/4041 |
| 11,540,691 B2* | 1/2023 | Caro, Jr. | A47L 11/4088 |
| 11,607,101 B2 | 3/2023 | Pruiett | |
| 11,617,486 B2 | 4/2023 | Luyckx | |
| 11,779,182 B1 | 10/2023 | Harmelink et al. | |
| 11,986,139 B2* | 5/2024 | DeJonge | A47L 11/34 |
| 2004/0226584 A1* | 11/2004 | Guest | A47L 11/4044 134/36 |
| 2019/0021565 A1* | 1/2019 | Fester | A47L 9/06 |
| 2019/0350427 A1* | 11/2019 | DeJonge | A47L 7/0004 |
| 2020/0023414 A1* | 1/2020 | Pruiett | A47L 11/405 |
| 2020/0060498 A1* | 2/2020 | Bradley | A47L 11/4083 |
| 2020/0093344 A1* | 3/2020 | Quintero | A47L 11/4005 |
| 2021/0038046 A1* | 2/2021 | Pruiett | A47L 9/02 |
| 2021/0051921 A1* | 2/2021 | Hoffmann | A01K 13/001 |
| 2021/0153709 A1* | 5/2021 | Luyckx | F21V 23/0492 |
| 2021/0228046 A1 | 7/2021 | Nguyen et al. | |
| 2021/0259494 A1 | 8/2021 | Pruiett | |
| 2021/0267428 A1* | 9/2021 | Scholten | G01F 23/80 |
| 2021/0329886 A1 | 10/2021 | Moyher et al. | |
| 2021/0330149 A1* | 10/2021 | Krebs | A47L 11/4013 |
| 2021/0338033 A1 | 11/2021 | Nguyen et al. | |
| 2021/0345851 A1* | 11/2021 | Nguyen | A47L 11/4044 |
| 2022/0015597 A1 | 1/2022 | Nguyen et al. | |
| 2022/0061620 A1 | 3/2022 | Nguyen | |
| 2022/0061622 A1 | 3/2022 | Luyckx et al. | |
| 2022/0071466 A1 | 3/2022 | Xia et al. | |
| 2022/0142435 A1* | 5/2022 | Moyher, Jr. | A47L 11/4016 |
| 2022/0142445 A1* | 5/2022 | Johnson | A47L 7/0014 |
| 2022/0218167 A1* | 7/2022 | Lenkiewicz | A47L 11/4019 |
| 2022/0279999 A1 | 9/2022 | Nguyen | |
| 2022/0296072 A1 | 9/2022 | Royale | |
| 2022/0304534 A1 | 9/2022 | Terry et al. | |
| 2022/0313036 A1 | 10/2022 | Paulla et al. | |
| 2022/0313044 A1* | 10/2022 | Morphey | A47L 11/30 |
| 2022/0313049 A1 | 10/2022 | Bradley et al. | |
| 2022/0354333 A1* | 11/2022 | Krebs | A47L 11/4075 |
| 2023/0210333 A1 | 7/2023 | Fordahl et al. | |
| 2024/0008702 A1 | 1/2024 | Stuive et al. | |
| 2024/0065507 A1* | 2/2024 | Davila | A47L 11/4041 |
| 2024/0156320 A1* | 5/2024 | DeJonge | A47L 11/185 |

FOREIGN PATENT DOCUMENTS

| | | |
|---|---|---|
| AU | 2013101607 A4 | 1/2014 |
| AU | 2014100145 A4 | 3/2014 |
| AU | 2012201161 B2 | 4/2014 |
| AU | 2010201002 B2 | 6/2014 |
| AU | 2011253852 B2 | 6/2014 |
| AU | 2012201055 B2 | 7/2014 |
| AU | 2013201271 B2 | 7/2014 |
| AU | 2016101525 A4 | 9/2016 |
| AU | 2017100144 A4 | 3/2017 |
| AU | 2013205936 B2 | 6/2017 |
| AU | 2013219229 B2 | 7/2017 |
| AU | 2017101723 A4 | 1/2018 |
| AU | 2018101447 A4 | 11/2018 |
| AU | 2022291569 A1 | 7/2023 |
| AU | 2017248437 B2 | 8/2023 |
| AU | 2018203547 B2 | 9/2023 |
| CN | 1623488 A | 6/2005 |
| CN | 103494577 A | 1/2014 |
| CN | 105030149 A | 11/2015 |
| CN | 204734428 U | 11/2015 |
| CN | 206365853 U | 8/2017 |
| CN | 107504302 A | 12/2017 |
| CN | 209236011 U | 8/2019 |
| CN | 211066435 U | 7/2020 |
| CN | 212066635 U | 12/2020 |
| CN | 214073176 U | 8/2021 |
| CN | 114467789 A | 5/2022 |
| CN | 216602698 U | 5/2022 |
| CN | 216754370 U | 6/2022 |
| CN | 217285620 U | 8/2022 |
| EP | 3536212 B1 | 5/2020 |
| EP | 3597094 B1 | 11/2022 |
| EP | 3782463 B1 | 2/2023 |
| EP | 4321074 A1 | 2/2024 |
| GB | 2513006 B | 1/2016 |

OTHER PUBLICATIONS

International Search Report and Written Opinion received for PCT Application No. PCT/CN2023/101236, mailed on Dec. 22, 2023, 10 pages.

International Search Report and Written Opinion received for PCT Application No. PCT/CN2023/083670, mailed on Sep. 23, 2023, 9 pages.

* cited by examiner

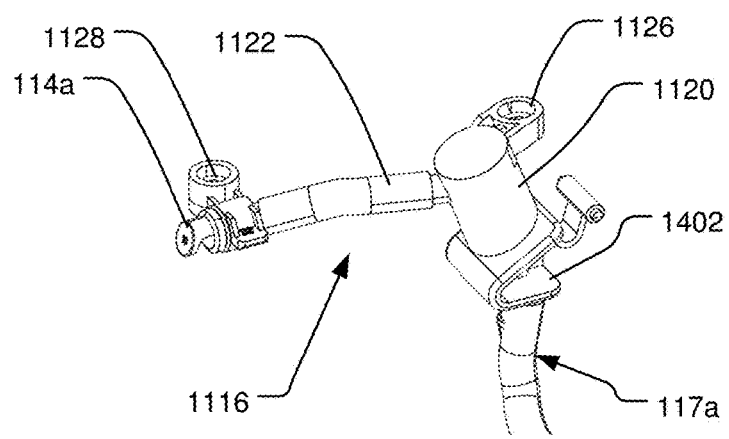
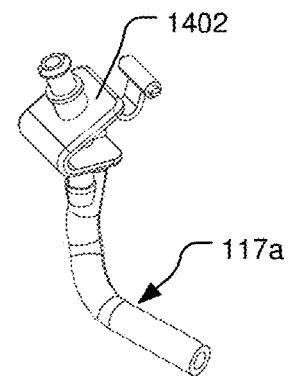
FIG. 13
FIG. 14
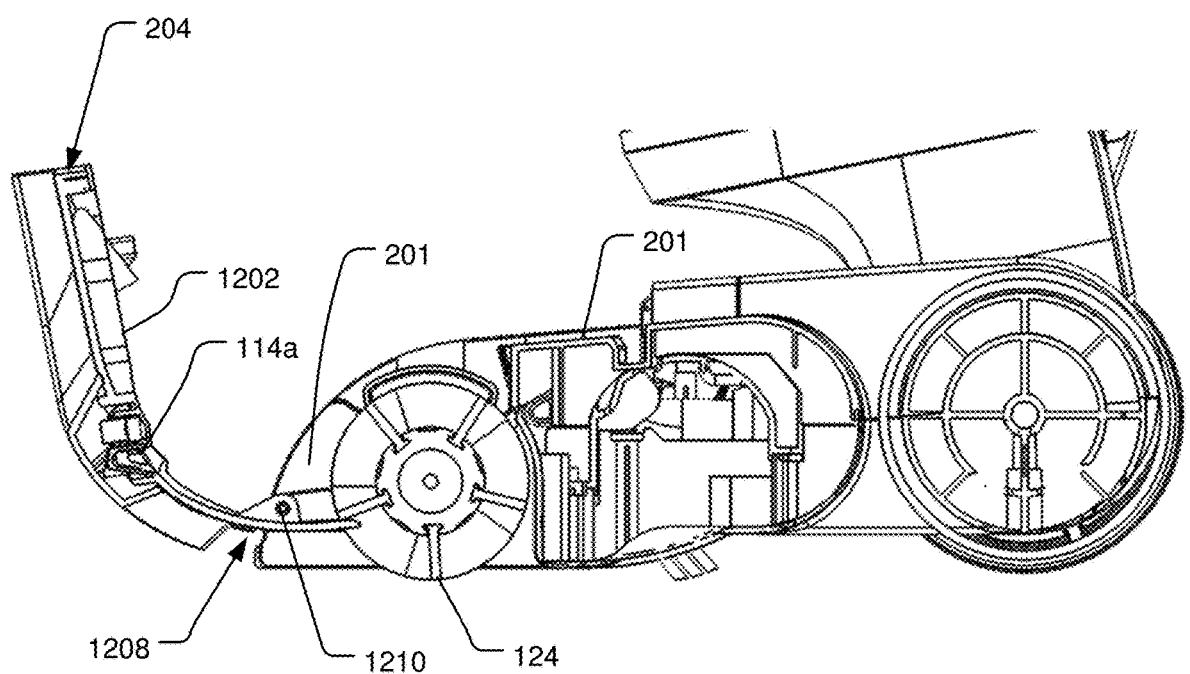
FIG. 15

EXTRACTION CLEANER

CROSS-REFERENCE TO RELATED APPLICATIONS

The present application is a continuation of U.S. patent application Ser. No. 18/207,551, filed on Jun. 8, 2023, entitled Extraction Cleaner, and is also a continuation of U.S. patent application Ser. No. 18/207,579, filed on Jun. 8, 2023, entitled Extraction Cleaner, and is also a continuation of PCT/CN2023/083670 filed on Mar. 24, 2023, entitled Extraction Cleaner, which claims the benefit of U.S. Provisional Application Ser. No. 63/440,250 filed on Jan. 20, 2023, entitled Extraction Cleaner, all of which applications are hereby fully incorporated herein by reference.

TECHNICAL FIELD

The present disclosure is generally directed to surface treatment apparatuses and more specifically to an extraction cleaner.

BACKGROUND

Surface treatment apparatuses are configured to be maneuvered over a surface to be cleaned (e.g., a floor). While being maneuvered over the surface to be cleaned, the surface treatment apparatus may collect at least a portion of any debris deposited on the surface to be cleaned. One example of a surface treatment apparatus is an extraction cleaner. An extraction cleaner is configured to apply a liquid to the surface to be cleaned and to suction at least a portion of the applied liquid from the surface to be cleaned.

BRIEF DESCRIPTION OF THE DRAWINGS

Features of the present embodiments will be understood better by reading the following detailed description, taken together with the figures herein described. The accompanying drawings are not intended to be drawn to scale. In the drawings, each identical or nearly identical component that is illustrated in various figures may be represented by a like numeral. For purposes of clarity, not every component may be labeled in every drawing.

FIG. 13 is a perspective view of a fluid supply and base supply line connection of the extraction cleaner shown in FIG. 2.

FIG. 14 is a perspective view of a base supply line connection of the extraction cleaner shown in FIG. 2.

FIG. 15 is a side sectional view of a portion of the extraction cleaner shown in FIG. 2.

DETAILED DESCRIPTION

The present disclosure is generally directed to extraction cleaners and cleaning compositions therefor. In some embodiments, the extraction cleaner includes a body, a supply tank removably coupled to the body, an additive tank removably coupled to the body, a recovery tank removably coupled to the body, a fluid pump fluidly coupled to the supply and additive tanks, a suction motor fluidly coupled to the recovery tank, and a base including a fluid applicator fluidly coupled to the pump and a suction inlet fluidly coupled to the recovery tank. The supply tank is configured to store a first fluid and the additive tank is configured to store a second fluid, the first and second fluids may be different fluids. The pump is configured to urge one or more of the first and/or second fluid(s) through the fluid applicator of the base such that the first and/or second fluid(s) are applied to a surface to be cleaned (e.g., a floor). The suction motor is configured to draw at least a portion of the applied first and/or second fluid(s) into the suction inlet of the base to be deposited within the recovery tank for later disposal.

In some embodiments, the extraction cleaner may further include a flexible hose configured to fluidly couple a cleaning tool to the recovery tank. The flexible hose may include a first end coupled (e.g., removably or non-removably) to the body and a second end coupled (e.g., removably or non-removably) to the cleaning tool such that the cleaning tool may be moved independently of the body of the extraction cleaner for performing targeted cleaning operations, e.g., to clean a specific spot, a small area where the base cannot enter, a pet, etc. The pump may be configured to urge liquid from supply tank and/or the additive tank through the cleaning tool and onto a target surface. The suction motor is configured to urge debris and fluid from the target surface into the cleaning tool and into the recovery tank for later disposal.

Figure 1:
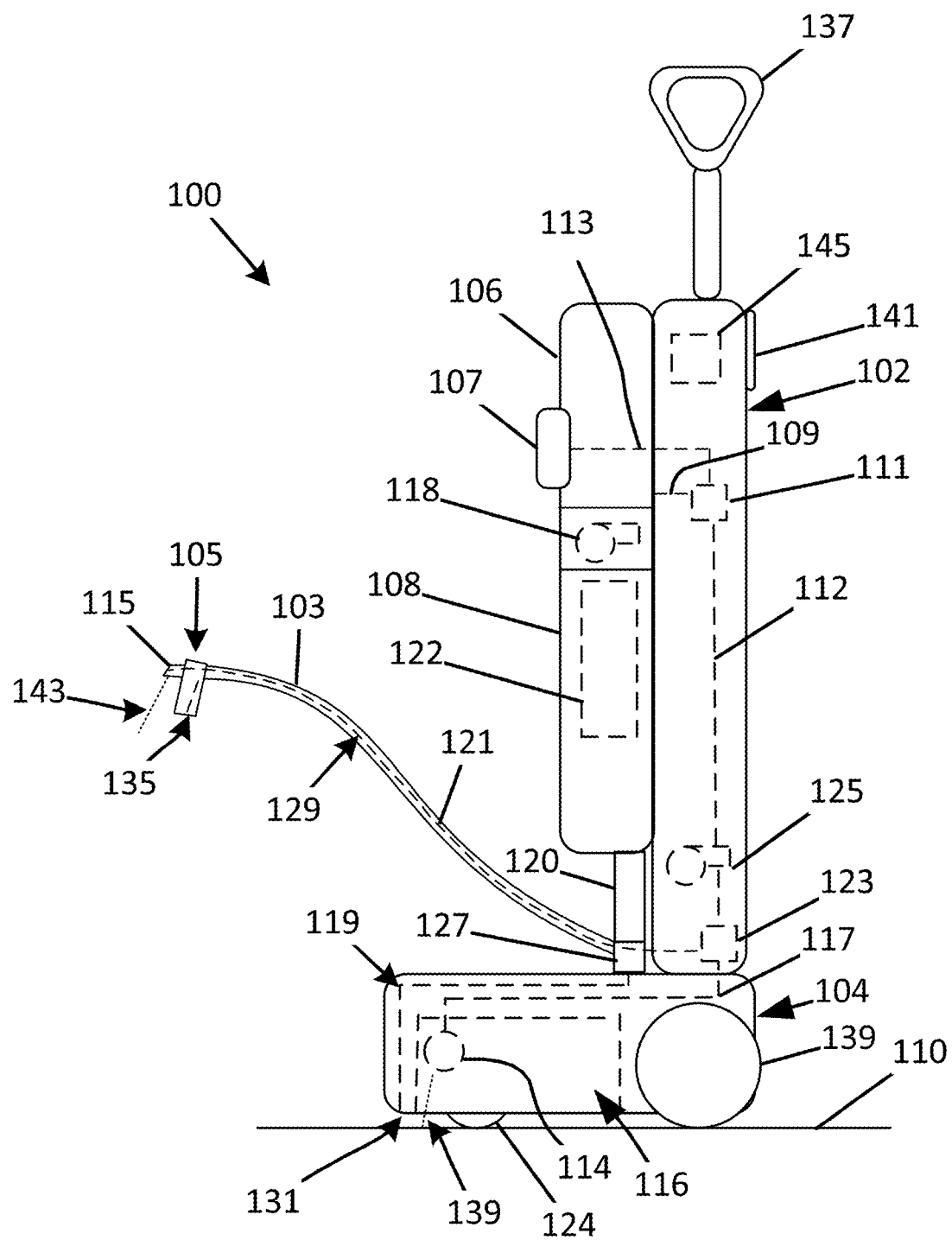
FIG. 1 schematically illustrates one example of an extraction cleaner consistent with the present disclosure.

FIG. 1 is a schematic view of one example of an extraction cleaner 100 consistent with the present disclosure. As shown, the extraction cleaner 100 includes an upright body 102, a base 104 pivotally coupled to the upright body 102, a flexible hose 103 having a cleaning tool 105 coupled to an end thereof, a supply tank 106, an additive tank 107, and a recovery tank 108. The extraction cleaner 100 may be configured to operate using one or more batteries and/or mains electrical power (e.g., via an electrical coupling to a home electrical outlet).

Fluid may be selectively distributed from the supply tank 106 and/or the additive tank 107 through one or more nozzles 114 (shown in hidden lines) coupled to the base 104 and/or one or more nozzles 115 coupled to the cleaning tool 105. A user may selectively fluidly couple the recovery tank 108 to a base airflow path 119 through the base 104 or a cleaning tool airflow path 129 through the cleaning tool 105. A user may thus selectively clean a surface to be cleaned 110, e.g., a carpet or floor, using fluid distribution and suction at the base 104, or clean a target surface, e.g., a specific spot, a small area where the base cannot enter, a pet, etc., using fluid distribution and suction at the cleaning tool 105.

In the illustrated example, the supply tank 106 is configured to receive the first cleaning fluid, e.g., water, detergent, soap, a fragrance, and/or other cleaning fluid. The additive tank 107 is configured to receive the second cleaning fluid, e.g., including water, detergent, soap, and/or cleaning fluid composition, intended for cleaning a particular type of soil on the cleaning surface. The second cleaning fluid may be different from the first cleaning fluid.

In some instances, the extraction cleaner 100 may be configured to deliver only the first cleaning fluid, only the second cleaning fluid, and/or a combination of the first and second cleaning fluids to the base 104 and/or the cleaning tool 105. For example, a user of the extraction cleaner 100 may be able to select between delivering only the first cleaning fluid, only the second cleaning fluid, or a combination of the first and second cleaning fluids to the surface to be cleaned 114 from the base 104 and/or the cleaning tool 105. By way of further example, the extraction cleaner 100 may be configured to deliver only a combination of the first and second cleaning fluids to the surface to be cleaned 114 from the base 104 and/or the cleaning tool 105. In this example, the extraction cleaner 100 may be configured to deliver the combination of the first and second cleaning fluids until at least one of the first and/or second cleaning fluids is depleted. Alternatively, in this example, when one of the first or second cleaning fluids is depleted, the other of the first or second cleaning fluids may continue to be delivered to the surface to be cleaned 114 until depleted.

In some embodiments, a boost fluid may be used in combination with a base cleaning fluid. For example, the second cleaning fluid may include a boost fluid mixed with a base cleaning fluid. In addition, or alternatively, the second cleaning fluid may include the boost fluid and the first cleaning fluid may include the base cleaning fluid. This approach may be useful in avoiding a reaction between the boost fluid and the base cleaning fluid and resultant breakdown of the boost fluid until they are mixed by the mixing valve. For example, a user may fill the supply tank with water to a designated level, e.g., indicated by a fill line on the supply tank, and then add a predetermined amount of base cleaning fluid to the water in the supply tank.

The boost fluid may include, for example, an oxide such as hydrogen peroxide. The base cleaning fluid may include, for example, water, detergent, soap, a fragrance, and/or other cleaning fluid. The boost fluid may have a pH (potential of hydrogen) that is less than the pH of the base cleaning fluid to prevent breakdown of the boost fluid in the second cleaning fluid. In some embodiments, for example, the pH of the boost fluid may be less than or equal to about 4.5 and the pH of the base cleaning fluid may be greater than or equal to about 9. Use of a boost fluid in the first and/or second cleaning fluid may be particularly useful when cleaning using the cleaning tool 105, e.g., to clean a heavily soiled target area.

In the illustrated example, a supply tank line 109 (shown in hidden lines) fluidly couples the supply tank 106 to a mixing valve 111 (shown in hidden lines) to convey the first cleaning fluid as an input to the mixing valve 111. An additive tank line 113 (shown in hidden lines) fluidly couples the additive tank 107 to the mixing valve 111 to convey the second cleaning fluid as an input to the mixing valve 111. The mixing valve 111 be configured to provide one or more of the first cleaning fluid, the second cleaning fluid and/or adjustable mixtures of the first cleaning fluid and the second cleaning fluid into one or more supply lines 112 (shown in hidden lines) and/or may be configured to allow a user to selectively provide only one of the first cleaning fluid or the second cleaning fluid to the supply line(s) 112. Fluid in the supply line(s) 112 may thus include the first cleaning fluid and/or the second cleaning fluid. In embodiments wherein a boost fluid is used in combination with the base cleaning fluid, the boost fluid and base cleaning fluid may be separated in respective ones of the additive and supply tanks to prevent any reaction therebetween, and then mixed, e.g., by the mixing valve or in a fitting such as a t-connector, to cause a chemical reaction between the boost fluid and the base fluid for improving cleaning and/or the stability of the mixed boost fluid and base fluid.

The supply line(s) 112 are fluidly coupled to a fluid changeover valve 123 (shown in hidden lines). The fluid changeover valve 123 may be selectively configured in base supply state and a cleaning tool supply state. The state of the fluid changeover valve 123 may be selected through a mechanical and/or electrical switch or by directly physically manipulating the fluid changeover valve 123, or another component of the extraction cleaner 100 such as a suction changeover valve 127 as described herein. In some embodiments, for example, the fluid changeover valve 123 may be automatically placed in the cleaning tool supply state by a mechanical and/or electrical switch when the upright body 102 is vertically upright relative to the base 104, as shown in FIG. 1, and in the base supply state when the upright body 102 is reclined relative to the base 104 and not in the vertically upright position. In addition, or alternatively, the fluid changeover valve 123 may be placed in the base supply state or the cleaning tool supply state by user input to a control panel 141.

When the fluid changeover valve 123 is in the base supply state one or more of the fluid supply line(s) 112 is fluidly coupled through a base supply line 117 (shown in hidden lines) to the one or more fluid dispensing nozzles 114 coupled to the base 104. Fluid from one or more of the supply line(s) 112 may thus be dispensed through the one or more fluid dispensing nozzles 114 directly and/or indirectly onto the surface to be cleaned 110. In some embodiments, the one or more nozzles 114 may be disposed within an agitator cavity 116 (shown in hidden lines) defined within the base 104. Additionally, or alternatively, the nozzles 114 may be disposed on an external surface of the base 104.

When the fluid changeover valve 123 is in the cleaning tool supply state one or more of the fluid supply line(s) 112 is fluidly coupled through a cleaning tool supply line 121 (shown in hidden lines) to the one or more fluid dispensing nozzles 115 coupled to the cleaning tool 105. Fluid from the supply line(s) 112 may thus be dispensed through the one or more fluid dispensing nozzles 115 directly and/or indirectly onto the target surface. For example, the one or more nozzles 115 may be disposed within the cleaning tool 105 and/or may be disposed on an external surface of the cleaning tool 105. In some embodiments, a pump 125 (shown in hidden lines) may be coupled the supply line(s) 112 such that the pump 125 urges fluid through the fluid changeover valve 123 and to either the nozzles 114 or the nozzles 115.

The recovery tank 108 is fluidly coupled to a suction motor 118 (shown in hidden lines), a recovery conduit 120 and a suction changeover valve 127. The suction changeover valve 127 is selectively configurable in a base suction state or a cleaning tool suction state. The state of the suction changeover valve 127 may be selected through a mechanical and/or electrical switch or by directly physically manipulating the suction changeover valve 127 or other component of the extraction cleaner 100. In some embodiments, the suction changeover valve 127 may be automatically placed in the cleaning tool suction state by a mechanical and/or electrical switch when the upright body 102 is vertically upright relative to the base 104, as shown in FIG. 1, and in the base suction state when the upright body 102 is reclined relative to the base 104 and not in the vertically upright position. In addition, or alternatively, the suction changeover valve 127 may be placed in the base suction state or the cleaning tool suction state by user input to a control panel 141.

When the suction changeover valve 127 is in the base suction state, the recovery conduit 120 and the recovery tank 108 are fluidly coupled through the changeover valve 127 to the base airflow path 119 (shown in hidden lines). The base airflow path 119 extends from the suction changeover valve 127 to a suction inlet 131 at the bottom and to the front of the base 104. When the suction changeover valve 127 is in the base suction state, the suction motor 118 can thus urge fluid deposited on the surface to be cleaned 110 into the suction inlet 131, through the base airflow path 119, and into the recovery tank 108.

When the suction changeover valve 127 is in the cleaning tool suction state, the recovery conduit 120 and the recovery tank 108 are fluidly coupled through the changeover valve 127 to the cleaning tool airflow path 129. The cleaning tool airflow path 129 extends from a cleaning tool suction inlet suction inlet 135 at the bottom of the cleaning tool 105, through the flexible hose 103 and to the suction changeover valve 127. When the suction changeover valve 127 is in the cleaning tool suction state, the suction motor 118 can establish suction airflow to urge fluid deposited on a target surface into the cleaning tool suction inlet 135, through the cleaning tool airflow path 129, and into the recovery tank 108.

In some embodiments, the recovery tank 108 can include a debris separator 122 (shown in hidden lines) configured to separate solid debris from liquid within the recovery tank 108. The debris separator 122 may be further configured to impede liquid from flowing from the recovery tank 108 into the suction motor 118.

The agitator cavity 116 of the base 104 may include an agitator 124 configured to engage the surface to be cleaned 110. In some embodiments, the agitator 124 may be a longitudinal cylindrical body configured to rotate about a longitudinal axis of the body. The agitator 124 may be driven for rotation about the longitudinal axis by a motor (not shown). In some embodiments, the agitator 124 may configured to vibrate relative to the base 104. The agitator 124 include any combination of flaps, bristles, and/or microfiber. In some embodiments, the agitator 124 may be a non-absorbent agitator.

The extraction cleaner 100 may also include a controller 145 (shown in hidden lines). The controller 145 may be coupled for receiving user inputs from the control panel 141 and or inputs from sensors and/or switches in the extraction cleaner 100 and may be configured for providing control outputs for controlling components of the extraction cleaner 100 in response to the inputs. For example, the controller 145 may be configured to control the state of the fluid changeover valve 123 and/or the suction changeover valve 127 in response to a user input and/or in response to a sensor or switch responsive to a position of the upright body 102 relative to the base 104. In addition, or alternatively, the controller 145 may be configured to control operation of the mixing valve 111, the suction motor 118, the pump 125 and/or a motor (not shown) for driving the agitator. Numerous configurations for the controller 145 will be apparent in light of the present disclosure.

The upright body 102 may have a handle 137 coupled to an end thereof for grasping by a user and the base 104 may include one or more wheels 139 coupled thereto and positioned for engaging the surface to be cleaned 110. The wheels 139 allow maneuvering of the base 104 along the surface to be cleaned 110. To clean using suction and fluid delivery at the base 104, a user may configure the suction changeover valve 127 in the base suction state and the fluid changeover valve 123 in the base supply state. The user may grasp the handle 137 and push and/or pull the base 104 along the surface to be cleaned 110. Fluid 139 may be distributed from the nozzles 114 and directly and/or indirectly onto the surface to be cleaned 110, e.g., during forward and/or rearward movement of the base 104, and the surface to be cleaned 110 with the fluid thereon may be agitated by the agitator 124. At least a portion of the fluid 139 may be recovered from the surface to be cleaned 110 by operation of the suction motor 118 to establish suction for drawing the fluid into the base airflow path 119 and into the recovery tank 108.

To clean using suction and fluid delivery at the cleaning tool 105, a user may configure the suction changeover valve 127 in the cleaning tool suction state and the fluid changeover valve 123 in the cleaning tool supply state. The user may grasp the cleaning tool 105 and maneuver the cleaning tool 105 over a target surface. Fluid 143 may be distributed from the nozzles 115 and directly and/or indirectly onto the target, e.g., in response to user operation of a trigger on the cleaning tool. At least a portion of the fluid 143 may be recovered from the surface to be cleaned 110 by operation of the suction motor 118 to establish suction for drawing the fluid into the cleaning tool airflow path 129 and into the recovery tank 108.

The supply and/or additive tanks 106 and/or 107 may be configured to provide, collectively and/or individually, a fabric/cleaning composition for removing stains and soil from substrates (the surface to be cleaned 110) such as carpets and fabrics. The fabric/cleaning composition is preferably formed via combination of an aqueous based cleaning solution and an aqueous based oxidizing solution immediately prior to application to the substrate. In some embodiments, the aqueous based cleaning solution may be the first cleaning fluid, e.g., the base cleaning fluid, received within the supply tank 106, and the aqueous based oxidizing solution may be the second cleaning fluid, e.g., the boost fluid, received within the additive tank 107. The use of two separate solutions and mixing on demand is contemplated to preserve storage stability and optimize cleaning effectiveness while allowing one to achieve the identified and effective levels of active components on a selected surface at a desired pH.

The first aqueous based cleaning solution preferably contains a mixture of ingredients in a relatively basic solution (pH>7.0) and the second aqueous based oxidizing solution contains a mixture of ingredients in a relatively acidic solution ((pH<7.0). The first aqueous based cleaning solution herein comprises a water-based solution, which as noted, is a relatively basic solution (pH>7.0). More preferably, the first aqueous based cleaning solution has a pH in the range of 8.5 to 10.0, including all values and increments therein. Accordingly, a pH of 8.5, 8.6, 8.7, 8.8, 8.9, 9.0, 9.1, 9.2, 9.3, 9.4, 9.5, 9.6, 9.7, 9.8, 9.9 or 10.0. A particularly preferred pH range is 8.5 to 9.5, or even more preferably, 9.0 to 9.5. The second aqueous based oxidizing solution herein also comprises a water-based solution, which as noted is a relatively acidic solution ((pH<7.0). More preferably, the pH of the oxidizing solution is less than or equal to 5.0, and preferably falls in the range of 3.0 to 5.0, including all individual values and increments therein. Accordingly, a pH of 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8. 4.9 or 5.0.

The second aqueous based oxidizing solution contains a peroxygen compound, i.e. a compound containing a peroxide anion $O_2^{2-}$ or an O—O single bond such as $H_2O_2$. Upon combination of the first and second aqueous solutions, the peroxygen that is then provided and is activated by the carbonate component to then engage with a given substrate for cleaning, and in the particular preferred case of $H_2O_2$ falls in the range of 0.20 wt. % to 0.70 wt. %, including all values and increments therein, e.g., 0.20 wt. %, 0.30 wt. %, 0.40. wt. %, 0.50 wt. % 0.60 wt. % and 0.70 wt. %. One particularly preferred range for the weight percent of $H_2O_2$ compound that is relied upon to treat a substrate for removal of stains and soil is in the range of 0.30 wt. % to 0.40 wt. %.

The peroxygen compound herein therefore are contemplated to include water soluble peroxygen agents that include hydrogen peroxide as well as inorganic alkali metal peroxides in acidic solution at (pH<7.0. Such peroxygen compounds therefore include sodium peroxide ($Na_2O_2$) and organic peroxides such as urea hydrogen peroxide ($CH_6N_2O_3$) and melamine hydrogen peroxide ($C_3H_8N_6O_2$). Also contemplated are alkyl hydroperoxides (R—O—OH) where R is an alkyl group such as in methyl hydroperoxide ($CH_3OOH$), tert-butyl hydroperoxide (($CH_3)_3C$—O—OH), or an aryl peroxide where R is an aryl group as in benzoyl peroxide ($C_{14}H_{10}O_4$). The peroxygen compound herein may also preferably be utilized with or without a peroxidase (enzymes that catalyze the break-up of peroxides).

The first aqueous based cleaning solution preferably contains the following ingredients: (1) nonionic surfactant(s), preferably an alcohol ethoxylate which is reference to a nonionic surfactant containing a hydrophobic alkyl chain attached via an ether linkage to a hydrophilic ethylene oxide chain, which is available under the trade name Ecosurf™ EH-9 from Dow, which is an ethoxylated propoxylated 2-ethyl-1-hexanol, CAS 64366-70-7, and Ecosurf™ EH-6 also available from Dow, CAS 64366-70-7, and alkyl polyglycoside (APG) which is reference to the reaction product of a fatty alcohol and a sugar and is characterized by a saccharide unit and one or more hydrophobic alkyl chains such as decyl glucoside available from Brenntag (CAS 68515-73-1); (2) a source of carbonate anion ($CO_3^{2-}$) such as water soluble alkali metal carbonate or alkali metal bicarbonate; (3) a metal chelating agent such as ethylene-diamine-N,N'-disuccinic acid (EDDS), more preferably biodegradable (S,S) ethylenediamine-N,N'-disuccinic acid (EDDS), CAS 178949-82-1; (4) an organic alkyl alcohol, preferably ethanol; (5) a dispersant polymer, a preferred example of which is Acusol 505N, an acrylic acid polymer, CAS 60472-42-6; (6) a metal hydroxide such as sodium hydroxide to provide the desired pH of >7; (7) free-radical scavenger (8) fragrances and/or odor control or other aesthetic agents; and (9) water.

With respect to the free-radical scavenger, preferably such is selected from an aliphatic amino acid, preferably glycine ($C_2H_5NO_2$), CAS 56-40-6. Other free radical scavengers are contemplated to include sarcosine (N-methyl glycine), lysine, serine, glutamic acid and mixtures thereof. The free radical scavenger herein is also contemplated to be selected from, 2-methoxyethylamine, glucosamine, morpholine, piperdine, ethylamine and 3-amino-1-propanol, and mixture thereof. It is contemplated that such free-radical scavengers can trap free radicals such as a hydroxy free radical (HO·) to reduce or eliminate the damage that such free radicals may impose upon a given substrate fabric.

The second aqueous based oxidizing solution preferably contains the following ingredients: (1) peroxy compound, e.g., hydrogen peroxide ($H_2O_2$); (2) nonionic surfactant(s), preferably an alcohol ethoxylate which is reference to a nonionic surfactant containing a hydrophobic alkyl chain attached via an ether linkage to a hydrophilic ethylene oxide chain, which is available under the trade name Ecosurf™ EH-9 from Dow, which is an ethoxylated propoxylated 2-ethyl-1-hexanol, CAS 64366-70-7, and Ecosurf™ EH-6 also available from Dow, CAS 64366-70-7; (3) anionic surfactant, a preferred example of which is sodium caprylyl sulfonate, CAS 13419-61-9; (4) a dispersant polymer, a preferred example of which is Acusol 460N, which is a carboxylated polyelectrolyte copolymer based upon maleic anhydride/olefin copolymer; (5) a multifunctional aliphatic organic acid to provide the desired pH of <7.0, preferably citric acid, CAS 77-92-9; (6) a defoaming agent, preferably XFO-64, a silicon polymer; and (6) water.

In the above, it should be noted that the source of the source of the carbonate anion ($CO_3^2$) and the metal chelating agent is limited to the first aqueous cleaning solution. In addition, the source of the peroxy compound is limited to the second aqueous based oxidizing solution. It therefore should be appreciated that the other ingredients identified (e.g., nonionic surfactant, organic alkyl alcohol, free radical scavenger, fragrances and/or odor control agents, anionic surfactant, dispersant polymer) may be sourced from either the first aqueous cleaning solution and/or the second aqueous based oxidizing solution.

Reference is now made to Table 1, which identifies preferred formulations, all in weight percent values, for the two-part fabric and cleaning composition herein. Table 1 also serves as a basis for the description of a preferred process for preparing the two-part solutions for placement into two tanks of a cleaning apparatus and the resulting molar concentration levels of the ingredients after mixing of the two solutions as applied to a given substrate.

TABLE 1

Preferred Formulations

| | Component | | | | |
|---|---|---|---|---|---|
| | I Aqueous Based Cleaning Solution (pH > 7.0) | II Aqueous Based Oxidizing Solution (pH < 7.0) | III Active Components (Oxidizing Solution) | IV Cleaning Solution Components After Water Dilution (20:1) | V Components Applied To Substrate For Cleaning |
| Water | 80.9 | 80.3 | 91.29 | 99.1 | 98.4 |
| 35% $H_2O_2$ | 0 | 11.43 | 4.00 | 0 | 0.36 |
| Nonionic Surfactant (EH-9) | 3.38 | 0.83 | 0.83 | 0.16 | 0.22 |
| Anionic Surfactant (38% Sodium Caprylyl Sulfonate) | 0 | 5.82 | 2.21 | 0 | 0.20 |
| Source of Carbonate Anion ($NaHCO_3$) | 4.12 | 0 | 0 | 0.20 | 0.14 [wt. % of $CO_3^{2-}$] |
| Dispersant Polymer (Acusol 460N) | 0 | 1.26 | 1.26 | 0 | 0.12 |
| Metal Chelant (EDDS Acid) | 2.11 | 0 | 0 | 0.10 | 0.09 |
| Nonionic Surfactant (EH-6) | 1.13 | 0.28 | 0.28 | 0.05 | 0.07 |
| Organic Alkyl Alcohol (Ethanol) | 1.6 | 0 | 0 | 0.08 | 0.07 |
| Nonionic Surfactant (APGs) | 1.50 | 0 | 0 | 0.07 | 0.06 |
| Odor Control Agent | 1.5 | 0 | 0 | 0.07 | 0.06 |
| Fragrance | 1.5 | 0 | 0 | 0.07 | 0.06 |
| Metal Hydroxide (50% NaOH) | 1.14 | 0 | 0) | 0.05 | 0.05 |
| Dispersant Polymer (Acusol 505N) | 0.60 | 0 | 0 | 0.03 | 0.03 |

TABLE 1-continued

Preferred Formulations

| | Component | | | | |
|---|---|---|---|---|---|
| | I Aqueous Based Cleaning Solution (pH > 7.0) | II Aqueous Based Oxidizing Solution (pH < 7.0) | III Active Components (Oxidizing Solution) | IV Cleaning Solution Components After Water Dilution (20:1) | V Components Applied To Substrate For Cleaning |
| Radical Scavenger Aliphatic Amino Acid (Glycine) | 0.52 | 0 | 0 | 0.02 | 0.02 |
| Multifunctional Aliphatic Organic Acid (Citric Acid) | 0 | 0.1 | 0.1 | 0 | 0.01 |
| Defoaming Agent (XFO-64) | 0 | 0.03 | 0.03 | 0 | 0.003 |

The preferred charging and mixing of the aqueous based cleaning solution and aqueous based oxidizing solution proceeds as follows. The preferred formulation for the aqueous based cleaning solution (Column I) is poured into a first tank, e.g., the supply tank 106, on the cleaning apparatus and then preferably diluted 1 part of cleaning solution with 20 parts of water. The preferred formulation for the aqueous based oxidizing solution (Column II) is poured into a second tank, e.g., the additive tank 107, on the cleaning device. Column III shows the preferred weight percent of the active components of the oxidizing solution. Column IV shows the preferred weight percent of the cleaning solution components after the 20:1 water dilution. The aqueous based cleaning solution diluted at 20:1 with water is then combined with the aqueous based oxidizing solution, at a ratio of 10 parts of the diluted aqueous based cleaning solution (Column IV) with 1 part of aqueous based oxidizing solution.

The weight percent of the components that are then present in the preferred mixed solution and applied to a given surface for cleaning is shown in Column V. In Column V, the five (5) components for cleaning include water, the peroxygen compound, metal chelating agent, free-radical scavenger (preferably shown as glycine) and carbonate anion. In addition, it is noted that the pH of the combined and mixed aqueous based cleaning solution and the aqueous based oxidizing solution is preferably >9.0, and more preferably, at the pH range of >9.0 to 10.0, including all individual values and increments therein, such as 9.0, 9.1, 9.2, 9.3, 9.4, 9.5, 9.6, 9.7, 9.8, 9.9 and 10.0. A particular preferred pH range for the combined aqueous based cleaning solution and aqueous based oxidizing solution is 9.4 to 9.6.

In addition, as can be seen from the Table 1, the level of carbonate anion ($CO_3^{2-}$) that is present in the mixed solution, that is preferably supplied by a metal bicarbonate such as sodium bicarbonate, is at 0.14 wt. %. However, in the broad context of the present disclosure, the level of carbonate anion in the mixed solution is preferably 0.10 wt. % to 0.40 wt. %, including all individual values and increments therein, such as 0.15 wt. %, 0.20 wt. %, 0.25 wt. %, 0.30. wt. %, 0.35 wt. % or 0.40 wt. %. One particularly preferred range of the carbonate anion in the mixed solution is 0.14 wt. % to 0.25 wt. %. Furthermore, while preferably sodium bicarbonate in the aqueous based cleaning solution provides one source of the carbonate anion, it is contemplated herein that the carbonate anion source includes other alkali metal carbonates such as sodium carbonate ($NaCO_3$) as well as other bicarbonates such as potassium bicarbonate.

It should be noted that the metal chelating agent, made available in the aqueous based cleaning solution, that is then present in the mixed solution applied to a given substrate, should be understood herein as any compound that binds to a metal ion, particularly transition metal ions such as iron and copper. Moreover, the metal chelating agent is one that preferably has a relatively lower binding affinity to water hardness divalent metal ions such as magnesium ($Mg^{2+}$) and calcium ($Ca^{2+}$) and a relatively higher binding affinity to transition metal ions such as iron and copper. Such is preferably provided by EDDS. Reference to metal chelating affinity is reference to the stability constant (also called formation constant or binding constant) that reflects the strength of interaction between the reagents that come together to form the complex.

Therefore, the preferred property of the metal chelating agent herein is to have a relatively higher binding constant to $Cu^{2+}$ in the preferred pH range of 9-10, with relatively lower binding constants with the water hardness ions $Ca^{2+}$ and $Mg^{2+}$. It is also desirable that the metal chelating agent is readily biodegradable to prevent accumulation in the environment. Below in Table 2 are the calculated log K (K is the binding constant) values for the preferred metal chelant EDDS herein at pH 7.0:

TABLE 2

Binding Constants For EDDS

| Metal Ion | LogK EDDS$^{4-}$ |
|---|---|
| $Cu^{2+}$ | 18.45 |
| $Ca^{2+}$ | 4.72 |
| $Mg^{2+}$ | 6.09 |

While preferably shown in Table 1 the metal chelating agent EDDS is present at a level of 0.09 wt. % in the mixed solution, it is contemplated herein that the level of metal chelating agent may fall in the range of 0.05 wt. % to 0.15 wt. %, including all individual values and increments therein. One particular preferred range is 0.08 wt. % to 0.13 wt. %. It is contemplated that the preferred metal chelating agent herein, which as alluded to above more actively binds metal ions of copper and iron found in tap water is therefore relatively more effective in neutralizing such metals in tap water that may otherwise catalyze decomposition of hydrogen peroxide to form hydroxy (OH) free radicals and lead to a reduction in bleach activity and fabric damage.

As also shown in Table 1, the preferred level of the free-radical scavenger herein in the mixed solution that engages with a substrate for cleaning is 0.02 wt. % to 0.80 wt. %, including all individual values and increments therein.

Table 3 below now presents the molar concentration ranges in aqueous solution of the identified components (peroxygen compound, metal chelating agent, carbonate anion and free-radical scavenger) when the cleaning solution and boosting solution are mixed and applied to the substrate for cleaning, where the pH of the mix is >9.0 to 10.0. Molar concentration is reference to the number of moles of the component per liter of solution.

TABLE 3

Molar Concentrations Of Key Components Applied To A Substrate For Cleaning

| Component | Molar Concentration |
| --- | --- |
| Peroxygen Compound | $5.0 \times 10^{-2}$ to $2.1 \times 10^{-1}$ |
| Metal Chelating Agent | $1.70 \times 10^{-3}$ to $5.2 \times 10^{-3}$ |
| Carbonate Anion ($CO_3^{2-}$) | $1 \times 10^{-2}$ to $5.0 \times 10^{-2}$ |
| Free Radical Scavenger | $2.0 \times 10^{-3}$ to $1.1 \times 10^{-1}$ |

The molar concentrations of the four key components after mixing as shown in Table 2 can be readily determined from the weight percents of the components identified in the aqueous based cleaning solution and aqueous based oxidizing solution after they are mixed, examples of which were provided in Table 1. The formula for converting concentrations in weight percent to molarity is: molarity=((weight percent)*10)/(molecular weight of 100% active material).

The present disclosure thus provides a composition, method and kit for cleaning carpet or fabric that preferably makes use of two separate solutions and mixing on demand that provides effective levels of identified components on selected surfaces at a desired pH to optimize cleaning performance.

Figure 2:
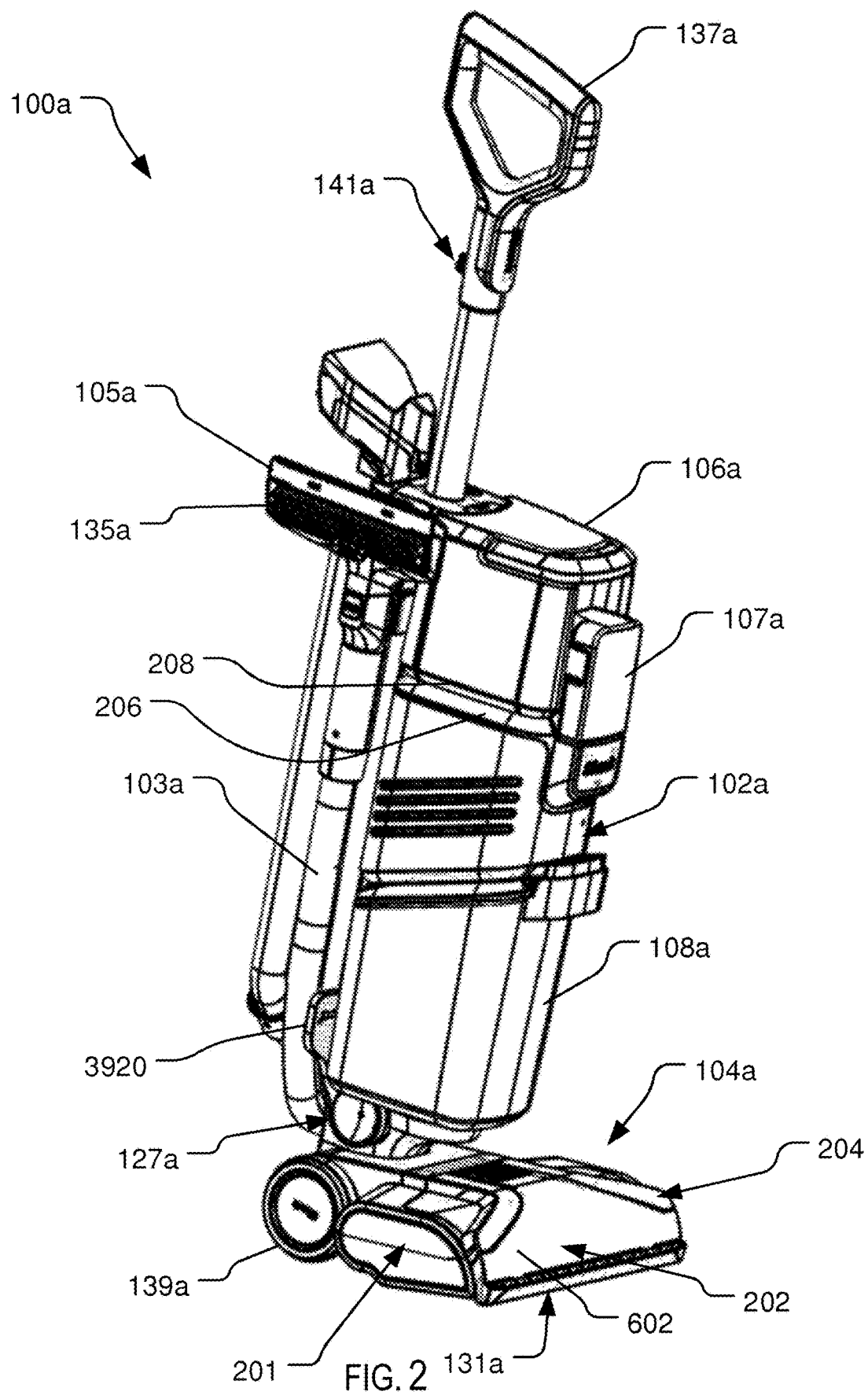
FIG. 2 is a front perspective view of another example extraction cleaner consistent with the present disclosure.

FIG. 2 is a perspective view of an extraction cleaner 100a, which may be an example of the extraction cleaner 100 of FIG. 1. The illustrated example the extraction cleaner 100a includes an upright body 102a, a base 104a pivotally coupled to the upright body 102a, a flexible hose 103a, a cleaning tool 105a with a cleaning tool suction inlet 135a coupled to an end of the flexible hose 103a, a supply tank 106a, an additive tank 107a, a recovery tank 108a, wheels 139a for moving the base 104a along a surface to be cleaned 110 (FIG. 1), and a handle 137a.

The recovery tank 108a is removably coupled to the upright body 102a and fluidly coupled to the base 104a and the cleaning tool 105a through a suction changeover valve 127a such that a suction motor 118a (FIG. 5) can establish suction for causing debris and/or liquid to be drawn through the base 104a or the cleaning tool 105a and into the recovery tank 108a. Cleaning fluid may be provided from the supply tank 106a and/or the additive tank 107a to nozzles on the base 104a and/or the cleaning tool 105a by a fluid changeover valve 123a. The upright body 102a may include a control panel 141a. The control panel 141a may be configured to receive one or more inputs from a user. For example, the control panel 141a may be configured to receive inputs corresponding to a cleaning behavior (e.g., increased/decreased fluid flow rate, pulsed/modulated fluid flow rates, control of fluid and/or suction to the base 104a or the cleaning tool 105a, increased/decreased suction, and/or the like).

The base 104a includes a frame 201, a suction nozzle 202, and door 204. In the illustrated example, the suction nozzle 202 is removable from the base 104a and the door 204 is not removable from the base 104a. In other examples the suction nozzle 202 and/or the door 204 may be removable from the base 104a, or the suction nozzle 202 and/or the door 204 may not be removable from the base 104a. As used herein, the term "removable" when used with respect to the relationship of a first component or assembly to a second component or assembly, means that the first component or assembly may be completely separated from the second component or assembly by a user without the use of tools, and without breaking the first component or assembly or the second component or assembly, such that the first component or assembly may be re-joined with the second component or assembly and be operative for its intended purpose.

Figure 3:
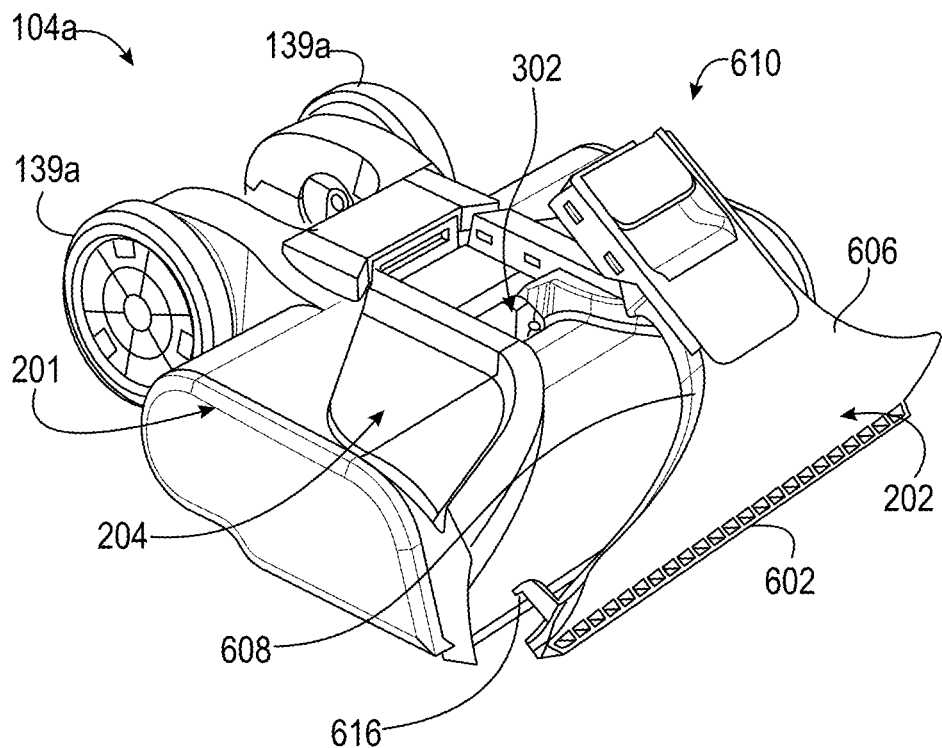
FIG. 3 is a front perspective, and partially exploded, view of a base of the extraction cleaner shown in FIG. 2.
Figure 4:
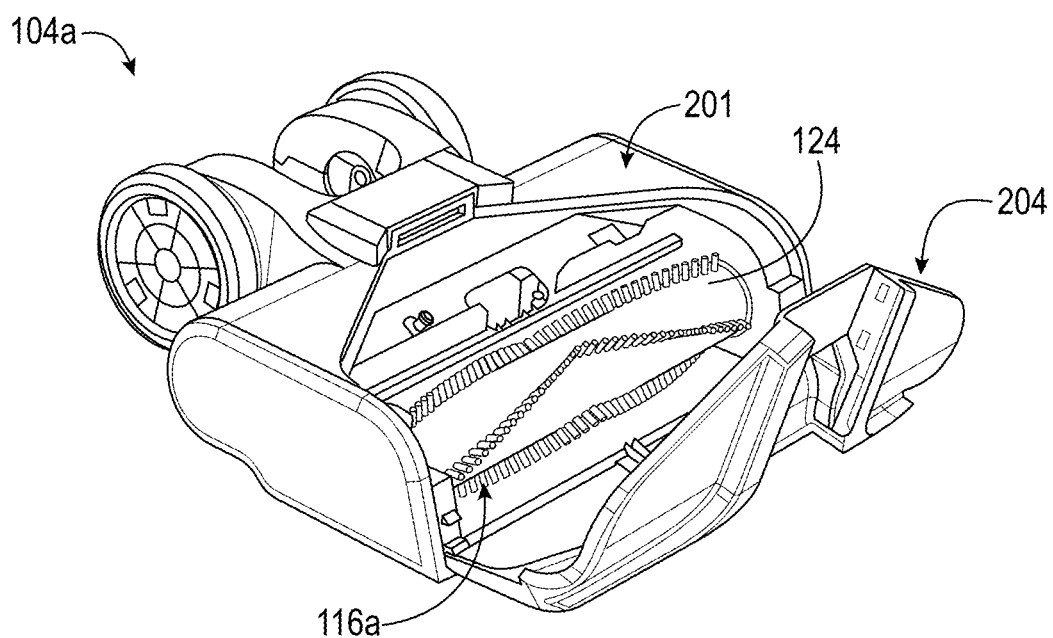
FIG. 4 is a front perspective view of a base of the extraction cleaner shown in FIG. 2 with a suction nozzle removed.

FIGS. 3 and 4 are perspective views of the base 104a of the extraction cleaner 100a. FIG. 3 shows the base 104a with the suction nozzle 202 removed from the base 104a and the door 204 in a closed position. FIG. 4 shows the door 204 pivoted to an open position and not removable from the base 104a. In general, to access the agitator cavity 116a and the agitator 124 the suction nozzle 202 may be removed from the base 104a, as illustrated in FIG. 3, and then the door 204 may be pivoted from the closed position shown in FIG. 3 to the open position shown in FIG. 4. With the door 204 in the open position shown in FIG. 4, the agitator cavity 116a and the agitator 124 may be accessed for cleaning or maintenance. Is some embodiments, when the door 204 is in the open position, the agitator 124 may be removed from the agitator cavity 116a cleaning for maintenance.

Figure 5:
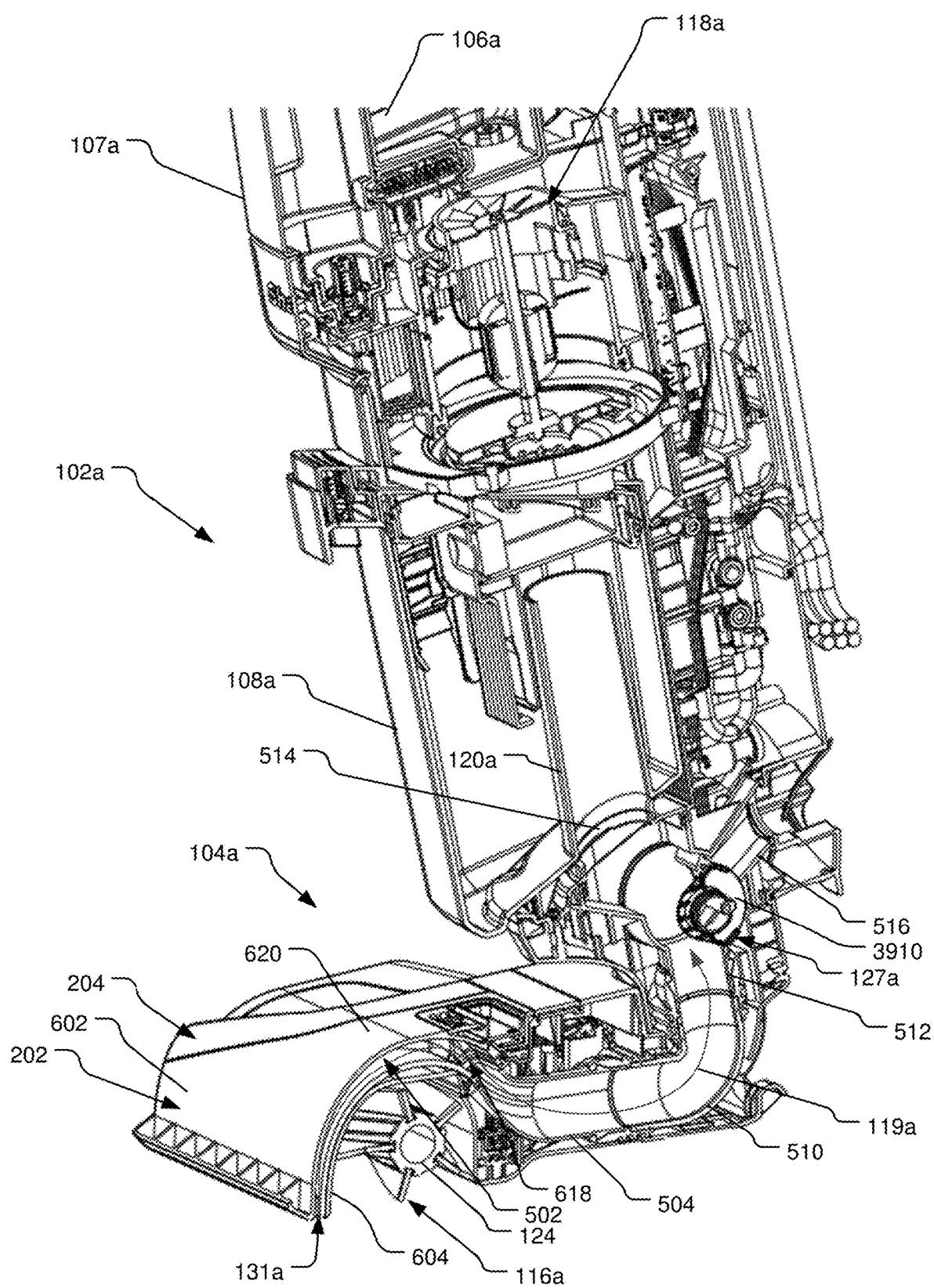
FIG. 5 is a front perspective, sectional view of a portion of the extraction cleaner shown in FIG. 2.
Figure 6:
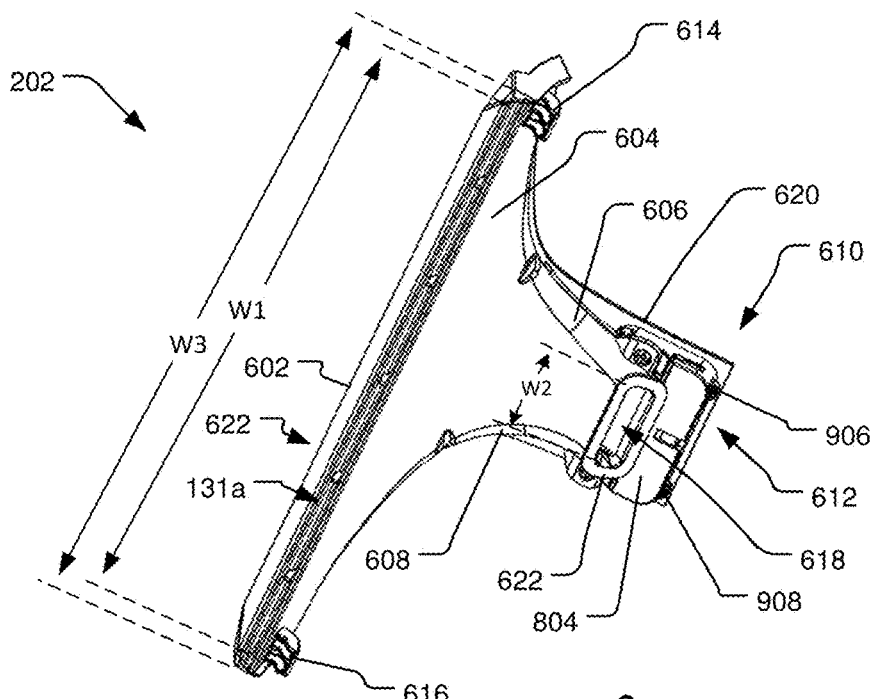
FIG. 6 is a bottom perspective view of a suction nozzle of the extraction cleaner shown in FIG. 2.
Figure 7:
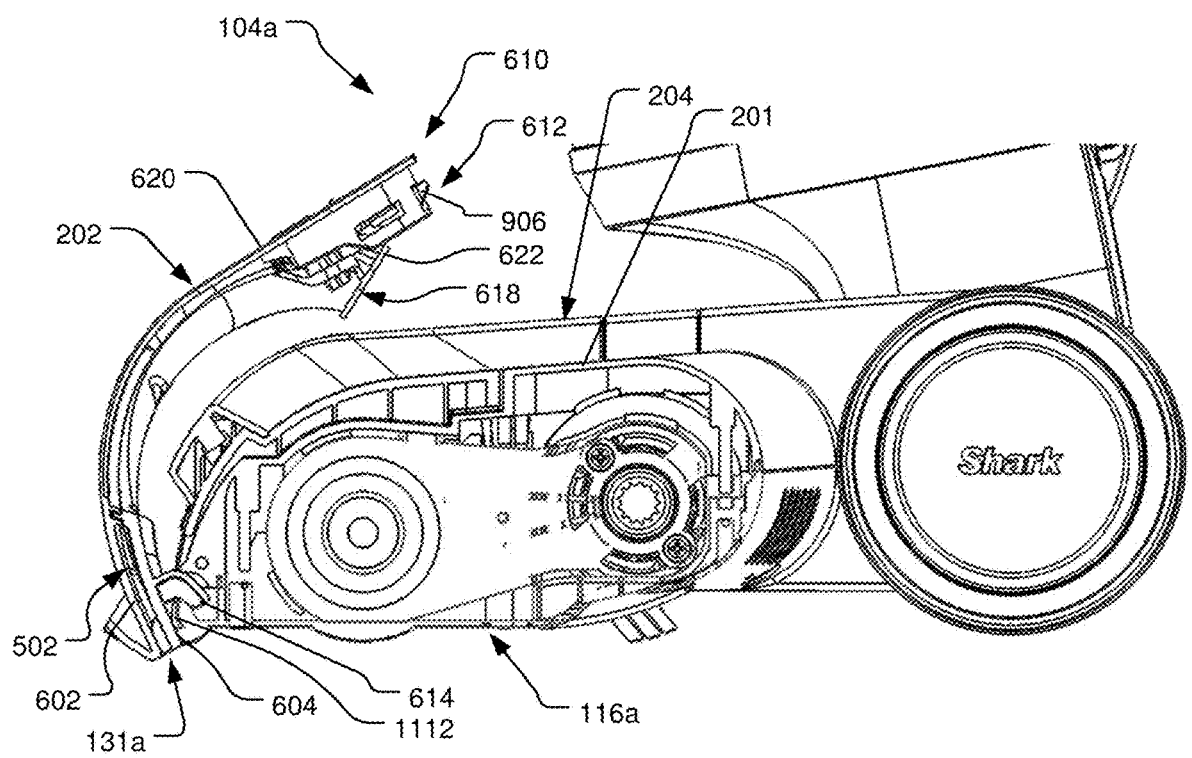
FIG. 7 is a side sectional view of a portion of the extraction cleaner shown in FIG. 2.

A suction nozzle 202 consistent with the present disclosure may be provided in a variety of configurations. FIG. 5 is a sectional view of portion of the example extraction cleaner 100a showing the suction nozzle 202 attached to the base 104a. FIG. 6 is a bottom perspective view of the suction nozzle 202. FIG. 7 is a side sectional view of a portion of the extraction cleaner 100a having a connector end 610 of the suction nozzle 202 disconnected from the base 104a. In the illustrated example embodiment, the suction nozzle 202 has a front wall 602, a rear wall 604, a first side wall 606, a second side wall 608, a connector end 610 including a spring-biased connector 612, and first 614 and second 616 toe-in features.

A suction nozzle pathway 502 is formed between the front wall 602, the rear wall 604 and the first 606 and second 608 side walls. The suction nozzle pathway 502 extends from a suction inlet 131a at a front of the nozzle to a suction outlet 618 at the rear of the nozzle and tapers from first width W1 at the section inlet 131a to a smaller second width W2 at the suction outlet 618. In some embodiments, for example, the width W1 of the suction nozzle pathway 502 at the suction inlet 131a may be 90 percent or more of the maximum width W3 of the suction nozzle 202 and the width W2 of the suction nozzle pathway 502 at the suction outlet 618 may be 25 percent or less of the width W3 of the suction nozzle 202.

Figure 10:
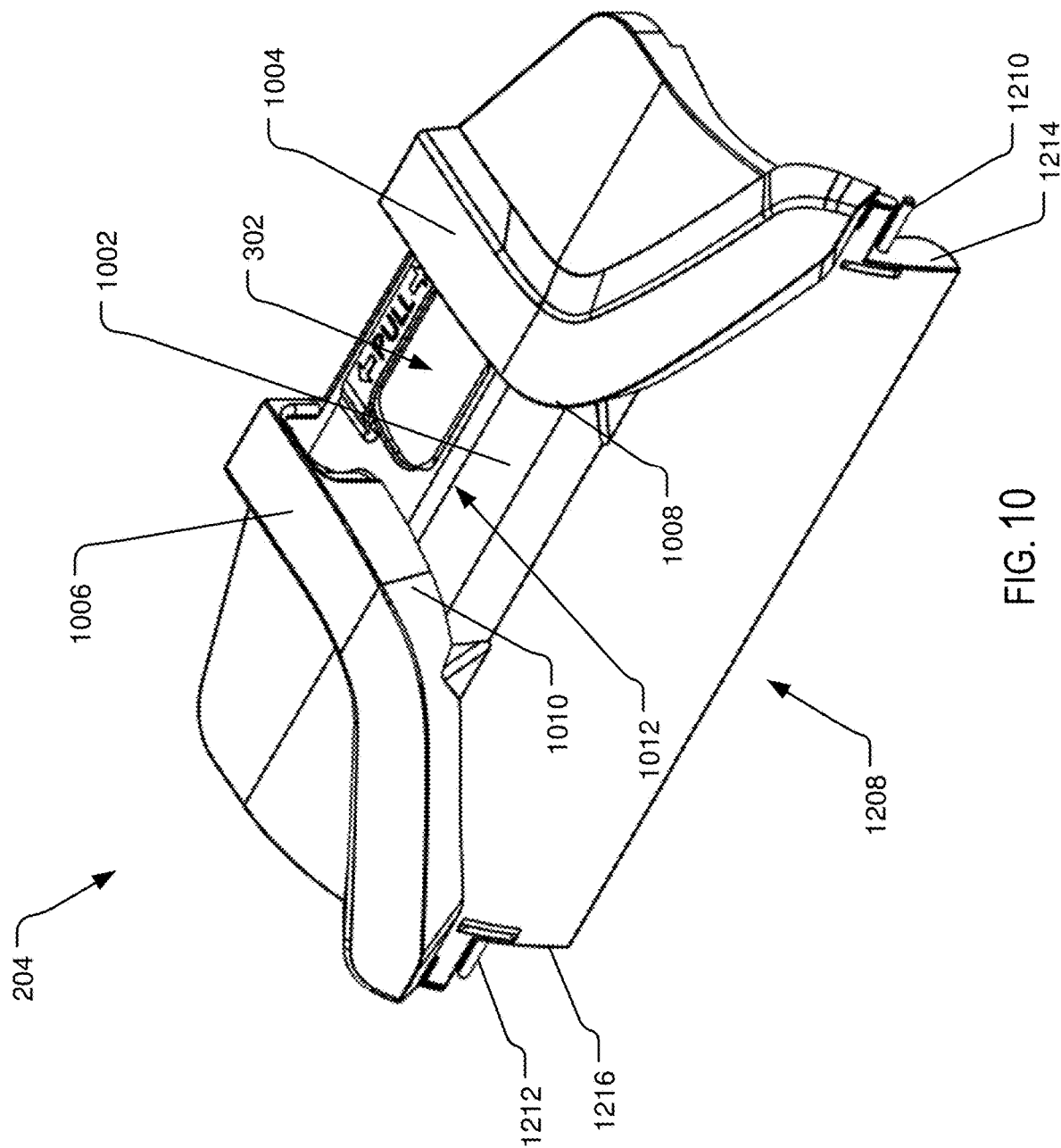
FIG. 10 is a top perspective view of the door of the extraction cleaner shown in FIG. 2.
Figure 11:
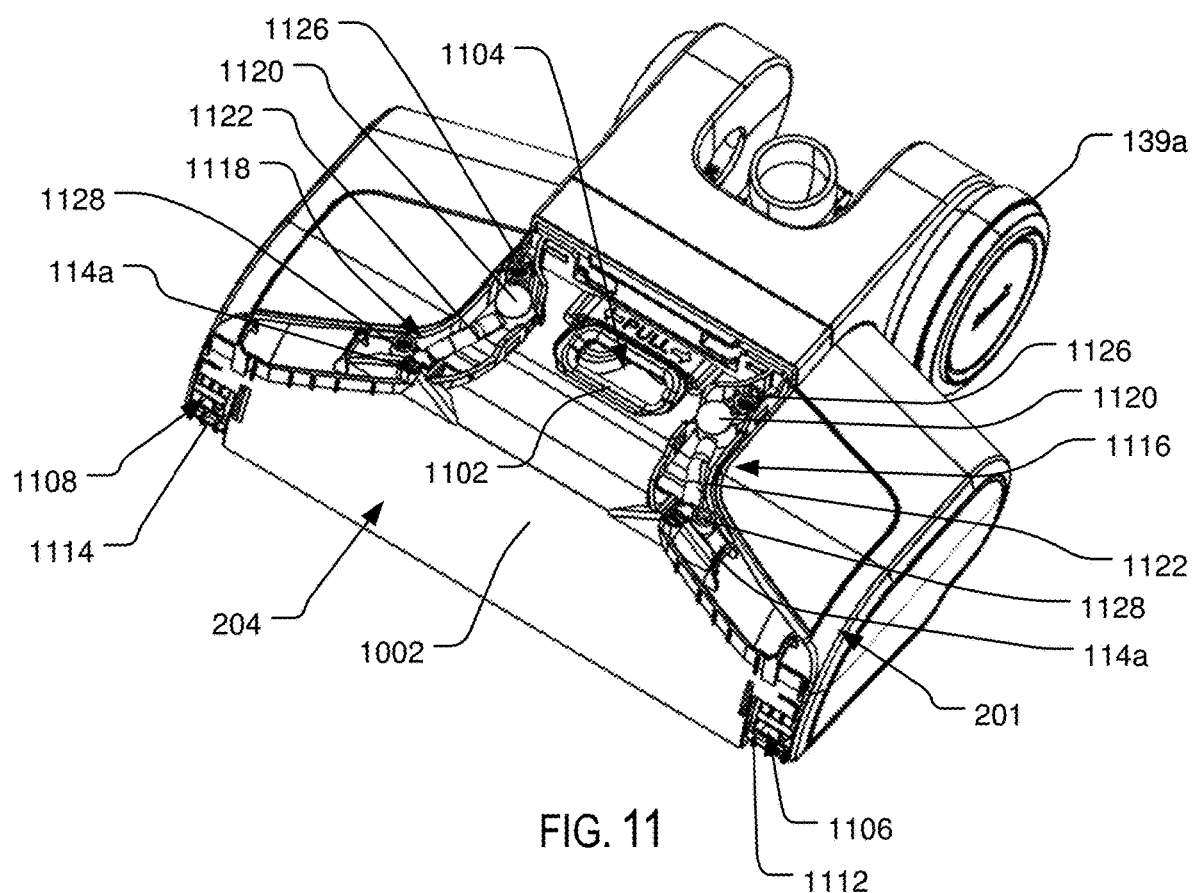
FIG. 11 is a top perspective view of the base of the extraction cleaner shown in FIG. 2 with covers on the door removed.

In the illustrated example, the suction nozzle is generally L-shaped and the suction inlet 131a is positioned to be disposed adjacent the surface to be cleaned 110 during operation of the extraction cleaner 110a. The suction outlet 618 is oriented downwardly relative to the top 620 of the suction nozzle 202 and has a seal 622. With reference also to FIG. 11, when the suction nozzle 202 is assembled to the base 104a the rear wall 604 of the suction nozzle 202 is in opposed facing relationship to a top 1002 surface of the door 204. The seal 622 on the suction outlet 618 removably couples to an opposing upwardly oriented seal 1102 on a suction inlet 1104 of an internal suction conduit 504 disposed in the base portion 104a. In the illustrated example, the suction inlet 1104 of the internal suction conduit 504 is disposed adjacent an opening 302 (see also FIG. 10) through the door 204. The internal suction conduit 504 extends through the base 104a and is fluidly coupled, through an elbow conduit 510, to a base inlet port 512 of the suction changeover valve 127a. The suction nozzle pathway 502 removably couples to the internal suction conduit 504 to at least partially define a base airflow path 119a extending from the suction inlet 131a and through the base 104a. In the illustrated example, the suction nozzle pathway 502 is in fluid communication with the internal suction conduit 504 and the base inlet port 512 of the suction changeover valve 127a to define the base airflow path 119a.

An outlet port 514 of the suction changeover valve 127a is fluidly coupled to a recovery conduit 120a formed as part of the recovery tank 108a. In FIG. 5, the suction changeover valve 127a is in a base suction state and the recovery conduit 120a is fluidly coupled through the changeover valve 127a to the base airflow path 119a. When the suction changeover valve 127a is in the base suction state, the suction motor 118a can establish suction at the suction inlet 131a to urge fluid deposited on the surface to be cleaned 110 into the suction inlet 131a, through the base airflow path 119a, through the recovery conduit 120a and into the recovery tank 108a. In the base suction state, the suction changeover valve 127a blocks fluid communication between the recovery conduit 120a and a cleaning tool inlet port 516 of the suction changeover valve 127a.

Figure 8:
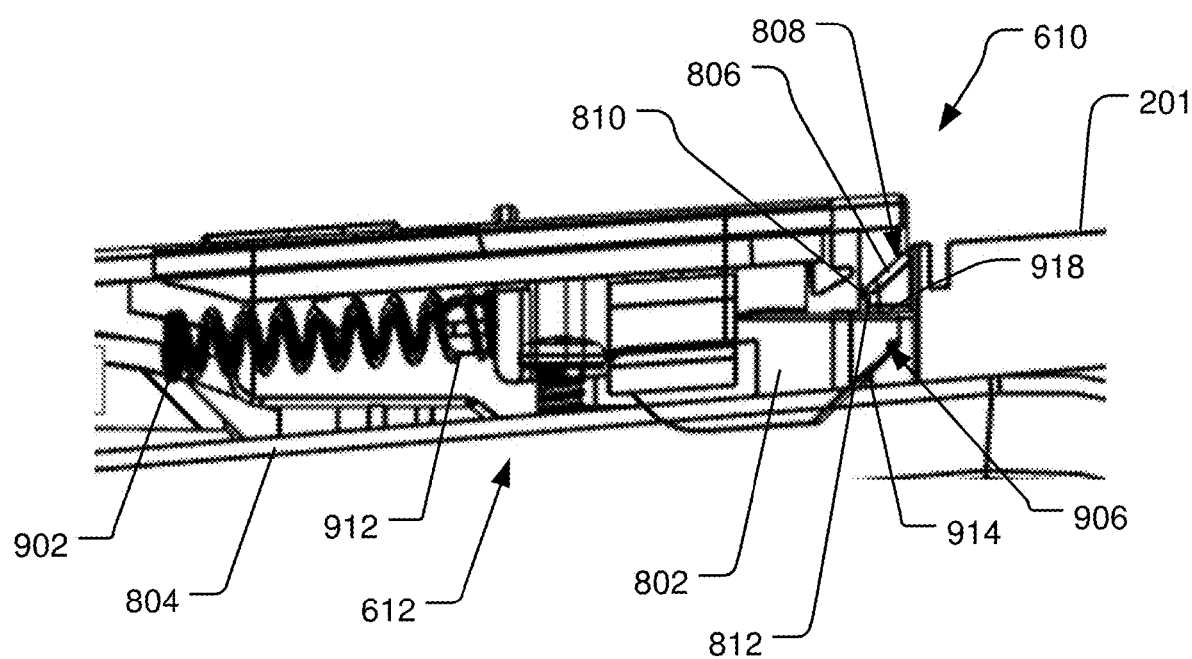
FIG. 8 is a sectional view of a portion of the extraction cleaner shown in FIG. 2 showing a connector end of the suction nozzle.

Numerous latch configurations for removably coupling the suction nozzle 202 to the base 104a will be apparent in light of the present disclosure. In the illustrated example embodiment, the suction nozzle 202 is removably coupled to the base 104a by the spring-biased connector 612 at the connector end 610 of the suction nozzle 202 and the first 616 and second 618 toe-in features at a front end 622 of the nozzle. FIG. 8 is a sectional view of the spring of a portion of the suction nozzle 202 including the spring-biased connector 612. As shown, the spring biased connector includes a connector body 802 disposed in housing 804.

Figure 9:
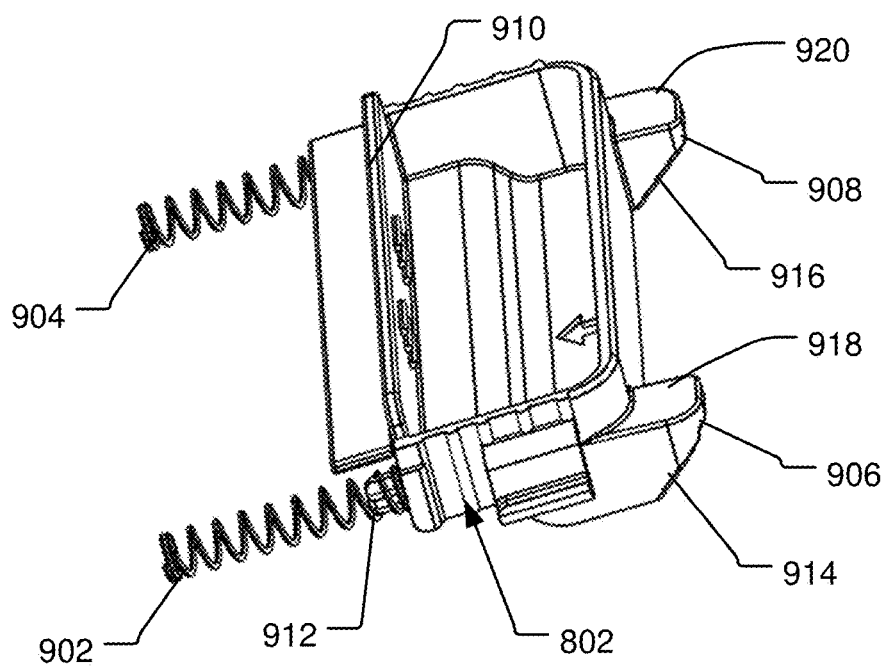
FIG. 9 is a top perspective view of a connector body and biasing springs provided at the connector end of the suction nozzle of the extraction cleaner shown in FIG. 2.

FIG. 9 is a top perspective view of the connector body 802 and first 902 and second 904 springs for biasing the connector body 802 toward a latched position. The connector body 802 has first 906 and second 908 latches extending outwardly from an end thereof and a release handle 910 defined at a top thereof. The first spring 902 is coupled to a post 912 on a first side of the connector body 802 and the second spring 904 is coupled to a post (not shown) on a second side of the connector body 802. The springs 902, 904 may be positioned against and interior surface of the suction nozzle 202 to bias the first 906 and second 908 latches outwardly from the housing 804 at the connector end 610. Application of a force to the first 906 or second 908 latches may overcome the bias force of the springs 902, 904 and force the first 906 and/or second 908 latches into the housing 804. When the force is released, the first 906 and second 908 latches may be forced outwardly from the housing 804 by the springs 902, 904.

With reference again to FIGS. 6 and 7, the first toe-in feature 614 is disposed at a first side of the suction nozzle 202 and the second toe-in feature 616 is disposed at a second side of the suction nozzle 202. The first 614 and second 616 toe-in features open downwardly and are positioned to extend into associated openings 1106, 1108 (FIG. 11) defined in the frame 201 of the base 104a to rest on associated catches 1112, 1114 (FIG. 11) on the base 104a.

The suction nozzle 202 may be installed onto the base 104a by inserting the first 614 and second 616 toe-in features into the associated openings 1106, 1108 to rest on the catches 1112, 1114 and then pivoting the suction nozzle 202 about the catches 1112, 1114 to rotate the connector end 610 of the suction nozzle 202 toward the top of the base 104a. The connector end 610 may then be latched to the base 104a by the connector 612.

For example, as the suction nozzle 202 is moved to the closed position shown in FIG. 8, the bottom surfaces 914, 916 of the first 906 and second 908 latches engage an angular top surface 806 of a catch 808 on the frame 201 of the base 104a, thereby forcing the connector body 612 into the housing 804 against the biasing force of the springs 902, 904. As the suction nozzle 202 is forced downward, the latches 906, 908 are forced sufficiently inward to clear a front face 810 of the catch 808. The latches 906, 908 then extend outwardly from the housing 804 under the force the springs 906, 908 with the top surfaces 918, 920 of the first 906 and second 908 latches extending beneath a bottom surface 812 of the catch 808. Interference between the top surfaces 918, 920 of the first 906 and second 908 latches and the bottom surface 812 of the catch 808 removably connects the connector end 610 of the suction nozzle 202 to the base 104a.

To release the connector end 610 of the suction nozzle 202 from the base 104a, user may force the release handle 910 in a direction away from the catch 808 to overcome the bias of the springs 902, 904 until the first 906 and second 908 latches clear the front face 810 of the catch 808. The user may then pull the connector end 610 upward to disconnect the connector end 610 of the suction nozzle 202 from the base 104a and then pivot the suction nozzle 202 about the catches 1112, 1114 in a direction away from the base 104a, e.g., to the position shown in FIG. 7. The toe-in features 614, 616 may then be withdrawn from the openings 1106, 1108 (FIG. 11) to remove the suction nozzle 202 from the base 104a.

Although the illustrated example embodiment includes a spring-biased connector 612 on the suction nozzle 202, numerous other configurations for removably coupling the suction nozzle 202 to the base 104a will be apparent in light of the present disclosure. For example, a spring-biased connector 612 may be provided on the base 104a or a known bump fitting may be provided on the suction nozzle 202 or the base 104a. Other known latch configurations may be implemented on the base 104a and/or the suction nozzle 202.

A door 204 consistent with the present disclosure may be provided in a variety of configurations. FIG. 10 is a top perspective view of the example door 204. The door 204 includes a top surface 1002 with the opening 302 therethrough disposed adjacent the suction inlet 1104 (FIG. 11) of the internal suction conduit 504. As previously discussed, the suction outlet 618 of the suction nozzle 202 couples to the suction inlet 1104 adjacent the opening 302 for fluidly coupling the suction nozzle pathway 502 with the internal suction conduit 504. The base airflow path 119a thus extends from the suction inlet 131a and through the opening 302.

First 1004 and second 1006 covers are disposed on the top surface 1002 of the door 204 for covering at least a portion of associated fluid supply connections 1116, 1118 (FIG. 11). The first 1004 and second 1006 covers are positioned on either side of the opening 302 and extend forwardly from the opening 302 and then outwardly toward the respective sides of the door 204. The sidewalls 1008, 1010 of the first 1004 and second 1006 covers and the top surface 1002 of the door 204 define a cavity 1012 for receiving the connector end 610 of the suction nozzle 202.

Figure 12:
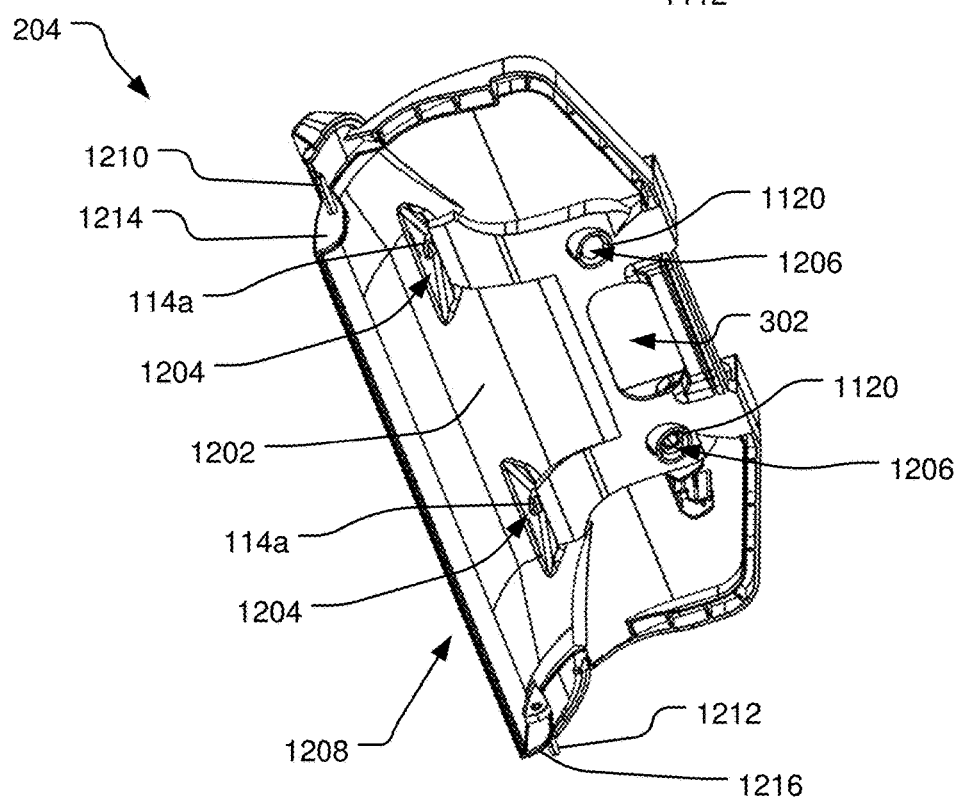
FIG. 12 is a bottom perspective view of the door of the extraction cleaner shown in FIG. 2.

In some embodiments, the first 1004 and second 1006 covers may be removable from the from the top surface 1002. FIG. 11 is a top perspective view of the door 204 with the first 1004 and second 1006 covers removed. FIG. 12 is a bottom perspective view of the door 204. FIG. 13 is a perspective view showing the fluid supply connection 1116. As shown, each of the fluid supply connections 1116, 1118 includes an inlet port 1120, a supply tube 1122, and a fluid dispensing nozzle 114a. The inlet ports 1120 and the fluid dispensing nozzles 114a may be mounted to the top surface 1002 via fasteners extending into the door 204 through associated mounting bosses 1126, 1128. The inlet ports 1120 may be fluidly coupled to the fluid dispensing nozzles 114a by the supply tubes 1122 disposed above the top surface 1002 of the door 204.

As shown particularly in FIG. 12, the door 204 has a bottom surface 1202 and a forward portion of each of the fluid dispensing nozzles 114a extends through an associated opening 1204 through the top surface 1002 and the bottom surface 1202 of the door 204. The fluid dispensing nozzles 114a are thus exposed at the bottom surface 1202 of the door for dispensing fluid onto a surface to be cleaned 110. The inlet ports 1120 also extend through associated openings 1206 through the top 1002 and bottom surface 1202 of the door 204 for removably fluidly coupling to the base supply line 117a below the bottom surface 1202 of the door 204.

When the door 204 is in the closed position the bottom surface 1202 of the door 204 rests on, and is supported by, the frame 201 of the base 104a. In some embodiments, the door 204 is held against the frame 201 of the base 104a by the suction nozzle 202 when the suction nozzle 202 is coupled to the base 104a. In other embodiments, the door 204 may be secured to the frame 201 of the base 104a using a latch or bump fitting (not shown) on the door 204 or the base 104a. In some embodiments, the one or more springs (not shown) may be provided between the door 204 and the base 104a for biasing the door 204 away from the base 104a toward an open position. A release button (not shown) for releasing the door 204 from the base 104a may be provided on the door 204 or the base 104a.

With reference to FIGS. 12 and 15, a front end 1208 of the door 204 may be pivotally coupled to the frame 201 of the base 104a by first 1210 and second 1212 pivot pins extending outwardly from opposite side surfaces 1214, 1216 of the door 204. Each of the pivot pins 1210, 1212 may extend into the frame 201 of the base 104a. The door 204 may thus pivot about the pivot pins 1210, 1212 between a closed position, as shown for example in FIG. 7, and an open position as shown in FIG. 15. In some embodiments, the pivot pins 1210, 1212 may be fixed to the door 204 and to the frame 201 so that the door 204 is not removable from the base 104a.

Figure 16:
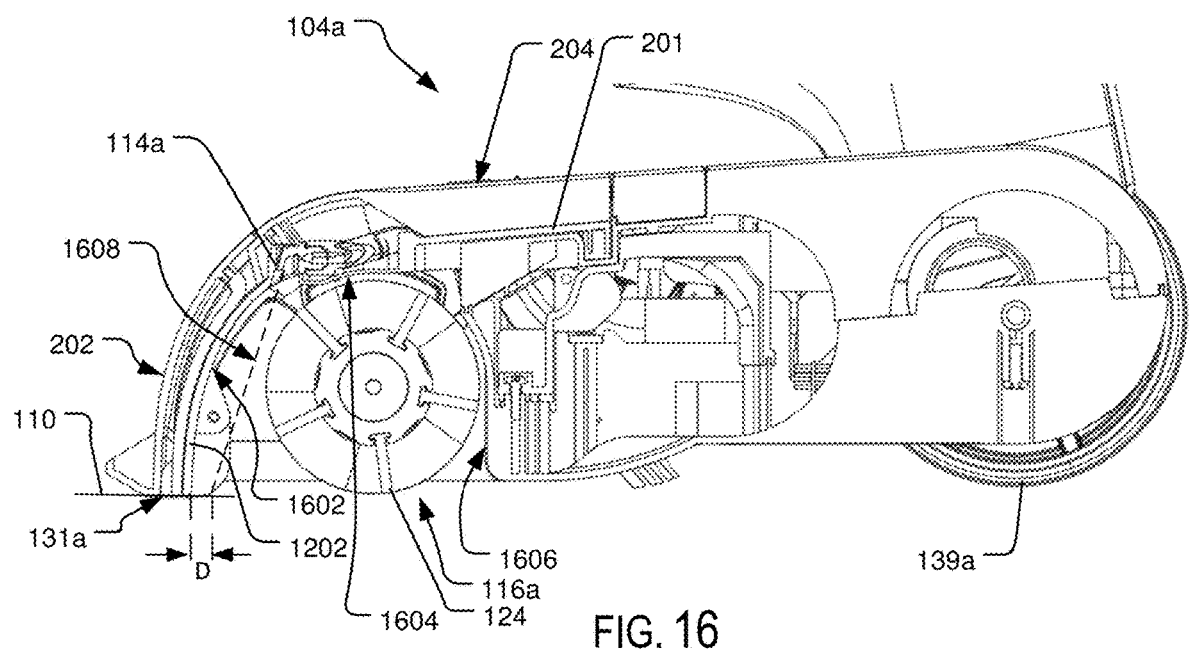
FIG. 16 is a side sectional view of a portion of the extraction cleaner shown in FIG. 2.

When the door 204 is in the closed position, as shown for example in FIG. 16, the bottom surface 1202 of the door 204 defines a front wall 1602 and at least a portion of the top wall 1604 of the agitator cavity 116a. The suction nozzle 202 does not form any part of the agitator cavity 116a. At least a portion of the rear wall 1606 of the agitator cavity 116a is defined by the frame 201 of the base 104a. The agitator 124 is supported in the agitator cavity 116a in a known manner. When the door 204 is in the closed position, as shown in FIGS. 3 and 5, the agitator is inaccessible to a user from the top of the base 104a. When the door 204 is in the open position, as shown in FIGS. 4 and 15, the agitator 124 is accessible to a user from the top of the base 104a for cleaning or maintenance.

When the door 204 is in the closed position, the inlet ports 1120 are coupled to the base supply line 117a and when the door is in the open position the inlet ports 1120 are decoupled from the base supply line 117a Numerous configurations for coupling and decoupling the inlet ports 1120 to the base supply line 117a when the door 204 moves between open and closed positions will be apparent in light of the present disclosure. With reference to FIGS. 13 and 14, for example, the base supply line 117a may have a connector 1402 disposed at an end thereof for mating with the inlet port 1120 and removably fluidly coupling the base supply line 117a to the inlet port 1120. When the door 204 is in the closed position, as shown for example in FIG. 7, the inlet ports 1120 mate with the connectors 1402 to fluidly couple the nozzles 114a to the base supply line 117a. As the door 204 is pivoted to the open position, as shown for example in FIG. 15, the inlet ports 1120 are decoupled from the supply line connector 1402 and the base supply line 117a, but the nozzles 114a, supply tubes 1122 and inlet ports 1120 remain coupled to the door 204.

When the door 204 and the suction nozzle 202 are assembled to the base 104a, the nozzles 114a are fluidly coupled to the base supply line 117a for distributing cleaning fluid 1608 including the first cleaning fluid 1608 from the supply tank 106a and/or the second cleaning fluid from the additive tank 107a directly or indirectly onto the surface to be cleaned 110. As shown for example in FIG. 16, the nozzles 114a may be positioned to spray the cleaning fluid 1608 forward of the agitator 124 toward the inlet 131a of the suction nozzle 202. In some embodiments it can be advantageous to spray the cleaning fluid 1608 so that the cleaning fluid 1608 contacts the surface to be cleaned 110 within a distance D of about 1.5 cm, and preferably within about 5 mm, from the rear wall 1202 of the door 204. This allows both effective cleaning of the surface to be cleaned 110 and fast dry time since the at least a portion of the cleaning fluid 1608 may be immediately removed from the surface to be cleaned 110 by suction from the suction inlet 131a.

Figure 17:
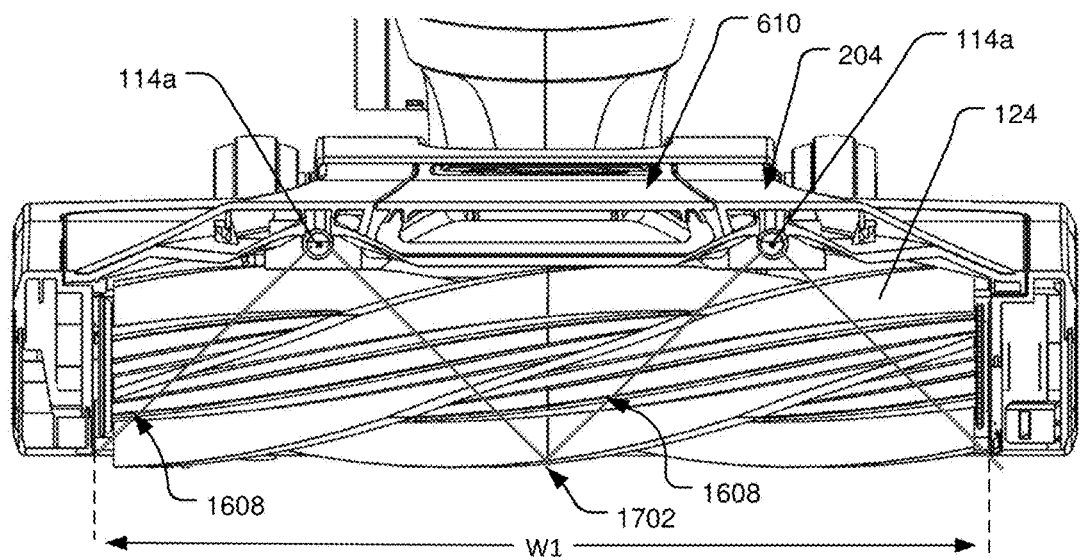
FIG. 17 is a front sectional view of a portion of the extraction cleaner shown in FIG. 2.

As shown in FIG. 17, each of the nozzles 114a spray the cleaning fluid 1608 in an associated fan shape and the nozzles 114a are positioned at a distance from the from the surface to be cleaned 110 such that the combined fan-shaped sprays of the nozzles 114a extends across the full width W1 of the suction inlet 131a. In some embodiments, the fan shaped sprays of cleaning fluid 1608 from the nozzles 114a may overlap or be separated by 5 mm or less at a location 1702 between the nozzles 114a where they both impact the surface to be cleaned 110. An extraction cleaner consistent with the present disclosure may include any number of spay nozzles 114a, including only one fluid dispensing nozzle 114a. By spraying fluid from the one or more fluid dispensing nozzles 114a in a fan shaped pattern, the cleaning fluid 1608 can cover the full width W1 of the suction inlet 131a for effective cleaning.

Although the illustrated example embodiment includes a removable suction nozzle 202 and a non-removable door 204 that is pivotally attached to the base 104a at a front end 1208 of the door 204 adjacent the front of the base 104a, numerous configurations of the suction nozzle 202 and the door 204 may be provided in an extraction cleaner consistent with the present disclosure. For example, a suction inlet 131a and suction nozzle pathway 502 may be defined by an inner surface of the door 204 and a separate channel assembly removably or non-removably coupled to the inner surface of the door 204.

Figure 18:
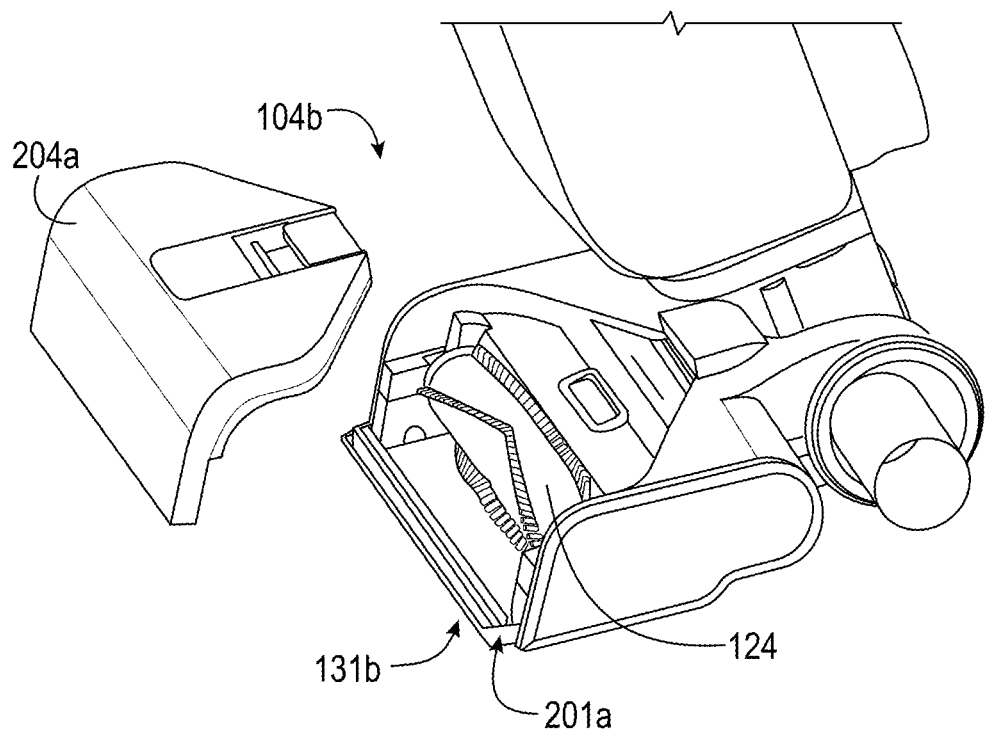
FIG. 18 is a perspective, partially exploded view of a portion of another embodiment of an extraction cleaner consistent with the present disclosure.

In some embodiments, the door 204 may be configured to pivot at a rear end of the door 204 adjacent the upright body 102a and a rear of the base 104a. In another embodiment, as shown for example in FIG. 18, the frame 201a of the base 104b may include a suction inlet 131b that extends across the base 104b and a removable or non-removable door 204a may be coupled to the base 104b and the suction inlet 131b. When the door 204a is assembled to the base 104b, the suction inlet 131b may be fluidly coupled to a suction nozzle pathway in the removable or non-removable door 204a. In some embodiments the door 204a may be pivotally attached to the base 104b at the rear of the door adjacent the upright body 102a and may rotate to closed position where the suction nozzle pathway is in fluid communication with the inlet 131b defined by the base 104a.

Figure 19:
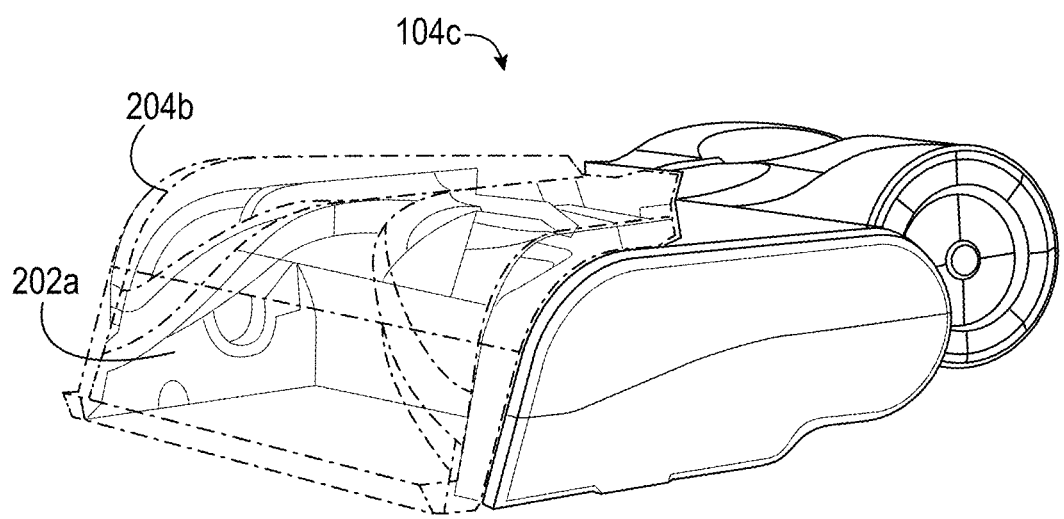
FIG. 19 is a perspective view of a portion of another embodiment of an extraction cleaner consistent with the present disclosure.
Figure 20:
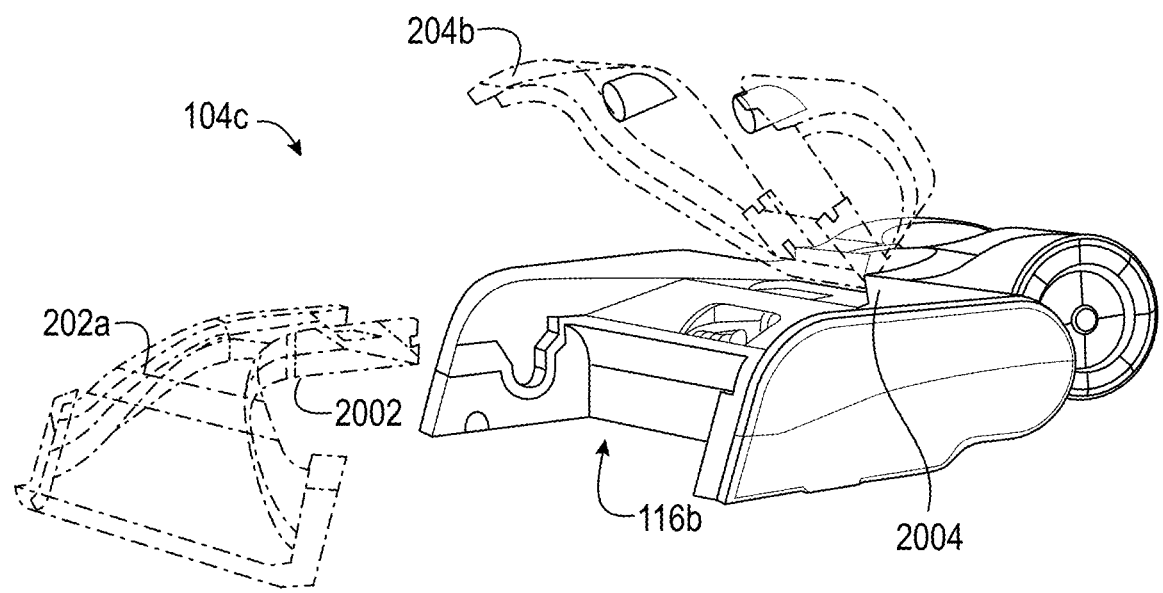
FIG. 20 is a perspective, partially exploded view of the portion of the extraction cleaner shown in FIG. 19.

In another embodiment, as shown for example FIGS. 19 and 20, the suction nozzle 202a may be removably coupled to a door 204b and, when assembled to the base 104c, a bottom surface 2002 of the suction nozzle 202a may define at least a portion of the agitator cavity 116b. The suction nozzle 202a may rest on, and be supported by, the door 204b, and may be removably coupled to the door 204b or the base 104c by a latch, bump fitting, etc. The door 204b may be pivotally coupled to the base 104c by a pivot 2004 at the rear of the door 204b and may pivot to an open position when the suction nozzle 202a is removed from the base 104c as shown in FIG. 20. The door 204b may be removable or non-removable from the base 104c and the fluid dispensing nozzles 114a may be coupled to the door.

Figure 21:
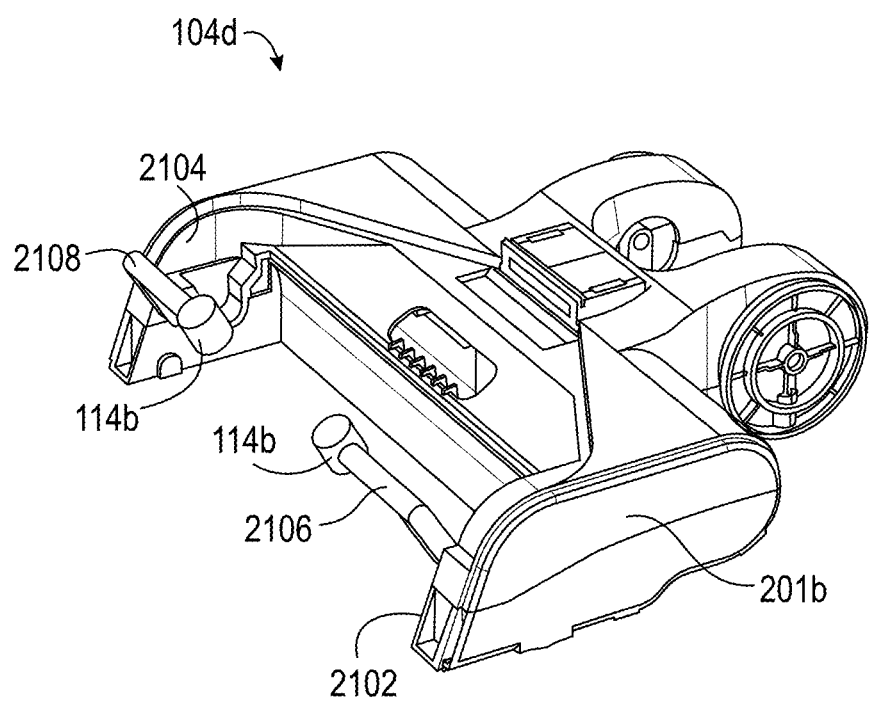
FIG. 21 is a perspective view of a portion of another embodiment of an extraction cleaner consistent with the present disclosure.
Figure 22:
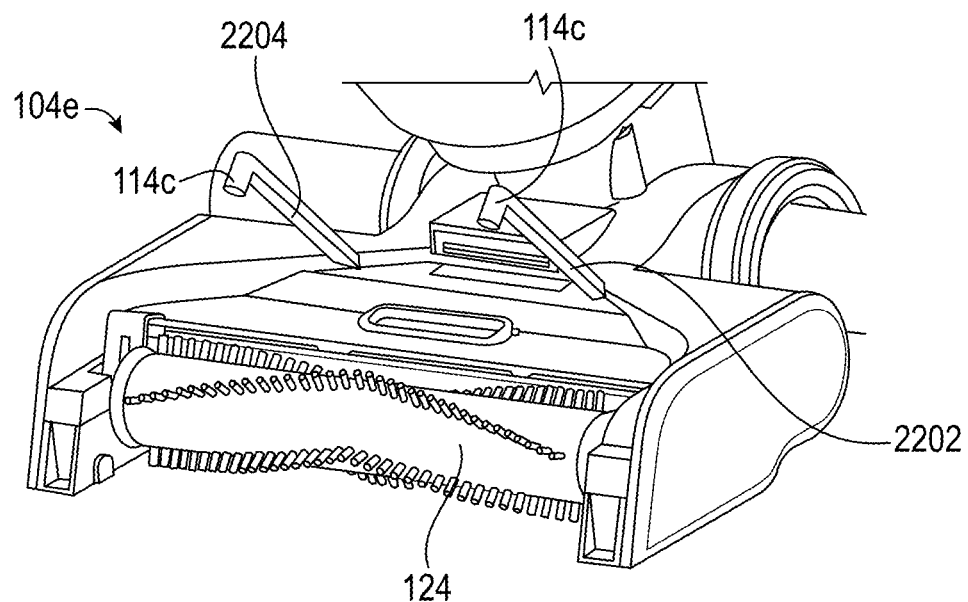
FIG. 22 is a perspective view of a portion of another embodiment of an extraction cleaner consistent with the present disclosure.

Fluid dispensing nozzles 114 consistent with the present disclosure may be provided in a variety of configurations. For example, one or more fluid dispensing nozzles 114 may be coupled to inlets adjacent the sidewalls of the door 204, as opposed to adjacent the connector end 610. In another embodiment, as shown for example in FIG. 21, one or more fluid dispensing nozzles 114b may be coupled to side walls 2102, 2104 of the frame 201b of the base 104d. The nozzles 114b may be coupled to associated arms 2106, 2108 that are pivotally coupled to the sidewalls 2102, 2104 to allow the nozzles 114b to be pivoted downwardly toward the surface to be cleaned 110 for accessing the agitator 124. In another embodiment, as shown in FIG. 22, one or more nozzles 114c may be coupled to top and rear of the base 104e adjacent the upright body 102a. The nozzles 114c may be coupled to associated arms 2202, 2204 that are pivotally coupled to the base 104e to allow the nozzles 114a to be pivoted upwardly, as shown in FIG. 22, for accessing the agitator 124. In some embodiments, a door, e.g., door 204, may be installed to the base 104c with the arms 2202, 2204 positioned beneath the bottom surface of the door. The arms 2202, 2204 may be spring-biased to pivot upwardly when the door is removed, thereby allowing access to the agitator 124.

Figure 23:
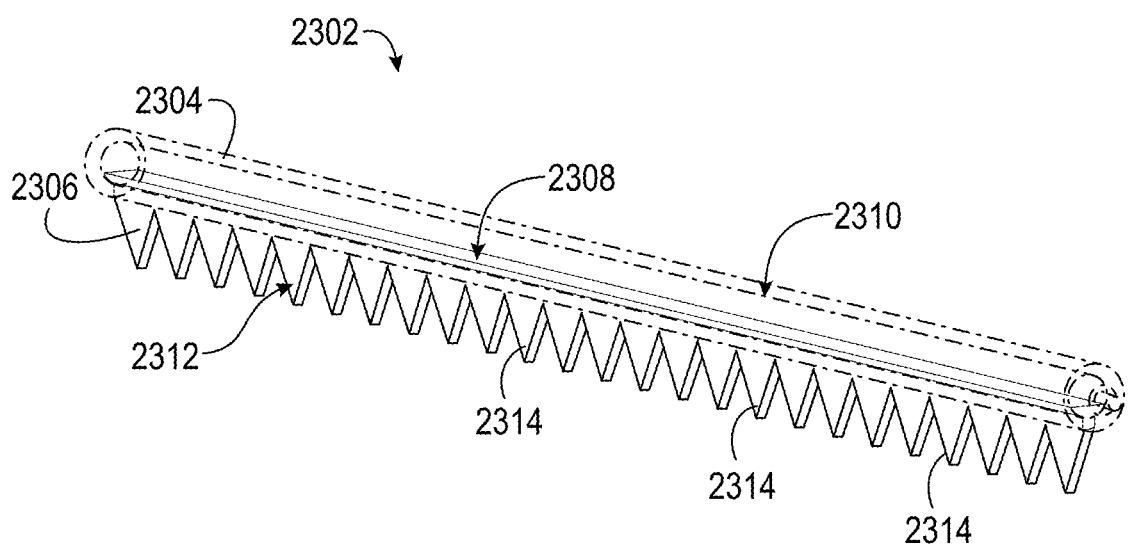
FIG. 23 is a perspective view of a wicking configuration consistent with the present disclosure.

Numerous configurations for distributing cleaning fluid directly or indirectly onto the surface to be cleaned 110 will also be apparent in light of the present disclosure. For example, instead of using one or more discrete fluid dispensing nozzles 114a, a wicking configuration may be provided. As shown, for example in FIG. 23, the wicking configuration 2302 may include a hollow body 2304 and an absorbent fabric 2306 coupled to the hollow body 2304. The absorbent fabric may have a first end 2308 in fluid communication with an interior 2310 of the hollow body 2304 and a second end 2312 defining a plurality of drip points 2314. In the illustrated example, the drip points 2314 are the tips of a series of triangular shapes formed in the absorbent fabric 2306. The hollow body 2304 may be mounted to a door, e.g., door 204, or the base, e.g., base 104a, and fluidly coupled to the base supply line 117, 117a at one or both ends thereof. Fluid from the base supply line 117, 117a may wick out from the interior 2310 of the hollow body 2304 through the absorbent fabric 2306 and drip directly or indirectly onto the surface to be cleaned 110 from the drip points 2314.

In another embodiment, the agitator 124 may have absorbent material thereon that is wet by cleaning fluid, e.g., from one or more nozzles 114a or absorbent fabric 2306. The absorbent material of the agitator 124 may be saturated by the cleaning fluid and centrifugal force associated with the rotating agitator 124 may spray the cleaning fluid outwardly from the absorbent material and directly and/or indirectly onto the surface to be cleaned 110. In another embodiment, a channel, e.g., a u-shaped channel, may be formed on an interior surface of a door, e.g., door 204, and may extend across the width of the suction inlet, e.g., inlet 131a. The channel may be fluidly coupled to the base supply line 117, 117a. Multiple outlets may be formed in the channel to allow cleaning fluid to drip from the channel and directly or indirectly onto the surface to be cleaned 110.

An extraction cleaner consistent with the present disclosure may include an auto-spray configuration for automatically distributing cleaning fluid directly or indirectly onto the surface to be cleaned 110 upon forward and/or rearward motion of the extraction cleaner by a user and without further input by a user other than moving the extraction cleaner in a forward or rearward direction. The auto-spray configuration may include at least one detector responsive to motion imparted by a user and a control mechanism for controlling distribution of the cleaning fluid in response to motion detected by the detector.

Figure 24:
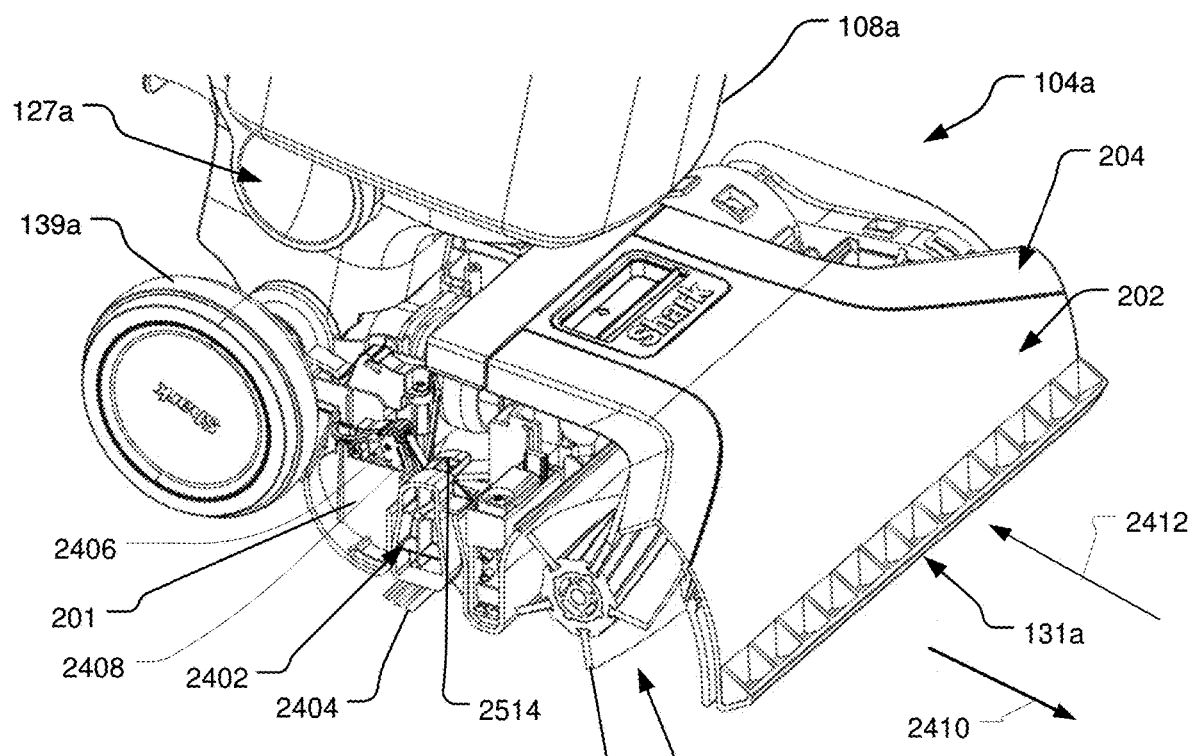
FIG. 24 is a front perspective view of a portion of the extraction cleaner shown in FIG. 2.

FIG. 24 is a front perspective view of the extraction cleaner 100a with a portion of the frame 201 of the base 104a removed. The illustrated example extraction cleaner includes a detector 2402 including a floor contacting member 2404 extending downwardly therefrom toward the surface to be cleaned 110 and a control mechanism in the form of a switch 2406. In the illustrated example embodiment, the floor contacting member 2404 is in the form of a plurality of bristles and the switch 2406 is in the form of a microswitch. It is to be understood, however, that numerous configurations for the floor contacting member 2404 and the switch 2406 are possible in an extraction cleaner consistent with the present disclosure. For example, the floor contacting member 2404 may be configured as a resilient flap, a rigid member with a flexible member at an end thereof, etc. The switch may be any type of switch configuration, e.g., a Hall effect switch, optical switch etc. configured to be responsive a position of the detector 2402.

Figure 25:
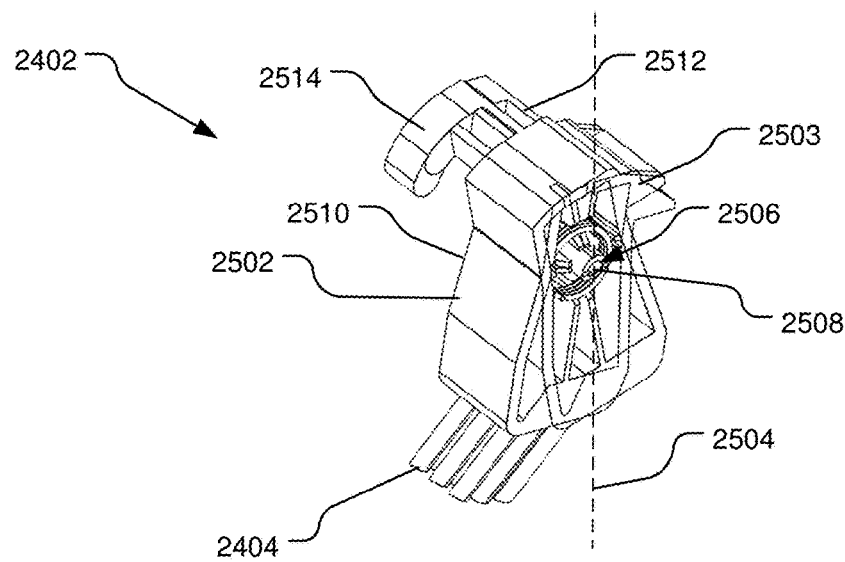
FIG. 25 is a front perspective view of the auto-spray detector of the extraction cleaner shown in FIG. 2.

A perspective view of the detector is shown in FIG. 25. As shown, the detector 2402 includes a detector body 2502 with the floor contacting member 2404 extending downwardly from the detector body 2502 and at a non-zero angle relative to a vertical axis 2504 of the detector body 2502. In some embodiments, the angle may be between about 20 and 40 degrees.

A first side 2503 of the detector body 2502 includes a receptacle 2506 for receiving a pivot pin 2508 extending into the frame 201 of the base 104a. Responsive to movement of the base 104a, the detector body 2502 pivots relative to the frame 201 about the pivot pin 2508. A second side 2510 of the detector body 2502 has an extension 2512. The extension 2512 extends outwardly from the second side 2510 of the detector body 2502 and has a hammer 2514 disposed at a distal end thereof.

Figure 26:
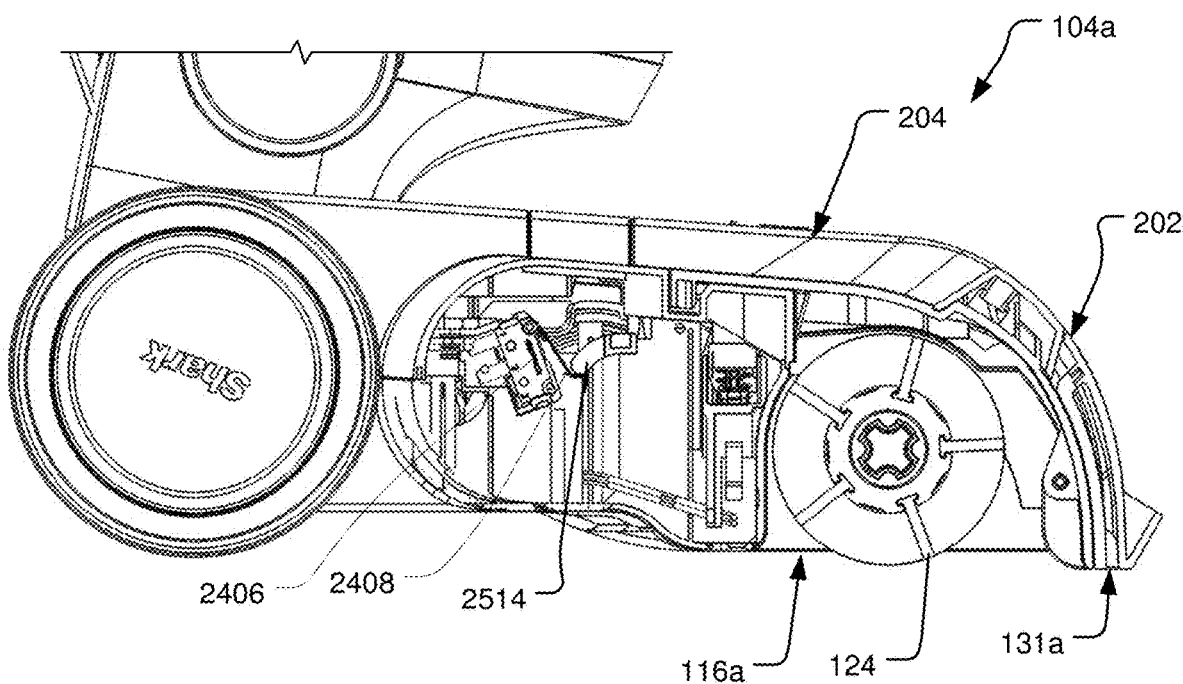
FIG. 26 is a side sectional view of a portion of the extraction cleaner shown in FIG. 2.

As shown in FIG. 24 and in the sectional view of FIG. 26, the hammer 2514 is disposed adjacent a switch arm 2408 of the switch 2406. Rotation of the detector body 2502 about the pivot pin 2508 causes the hammer 2514 to contact the switch arm 2408 to place the switch 2406 in an open or closed state. In the illustrated example embodiment, when the base 104a is moved forward by a user, i.e., in the direction of arrow 2410 in FIG. 24, the floor contacting member 2404 contacts the surface to be cleaned 110 causing the detector body 2502 to pivot about the pivot pin 2508 to the position shown in FIGS. 24 and 26. In this position the hammer 2514 may be retracted relative to the switch arm 2408 placing the switch 2406 in an open or closed state. In response to the state of the switch 2406 a controller 145 of the extraction cleaner 100a may cause cleaning fluid to flow through the supply lines 112, e.g., by energizing a pump 125, and to the nozzles 114a for distribution onto the surface to be cleaned 110.

When the base 104a is moved rearward by a user, i.e., in the direction of arrow 2412 in FIG. 24, the floor contacting member 2404 contacts the surface to be cleaned 110 causing the detector body 2502 to pivot about the pivot pin 2508 and moving the hammer 2514 toward the switch arm 2408 and the switch 2406. In this position the hammer 2514 may be forced against the switch arm 2408 placing the switch 2406 in an open or closed state. In response to the state of the switch 2406, a controller 145 of the extraction cleaner may reduce or discontinue the flow of cleaning fluid through the supply lines 112 and to the nozzles 114a.

In some embodiments, the controller 145 may cause distribution of cleaning fluid at a first high flow rate in response to the state of the switch when the extraction cleaner 100a is moved in a forward direction and a second lower, non-zero, flow rate in response to the state of the switch when the extraction cleaner 100a is moved in a rearward direction. For example, the high flow rate distribution may provide a fan-like spray pattern as described herein with respect to FIGS. 16 and 17. The low flow rate distribution may also provide a fan-like spray pattern where the fan pattern associated with the nozzles 114a does not extend the entire width W1 of the suction inlet 131a and/or does not overlap. Providing fluid distribution during both forward and rearward movement of the base 104a can provide effective cleaning compared to providing distribution in only one of the forward and rearward movement.

Detectors and control mechanisms in an auto-spray configuration consistent with the present disclosure may be provided in a variety of configurations. For example, the detector may be a Hall effect or optical sensor configured to sense movement of a component of the extraction cleaner 100a associated with forward and/or rearward movement. In another embodiment, the detector may include a ratchet provided on a wheel 139a of the extraction cleaner for moving a component to enable or disable a control mechanism.

Figure 27:
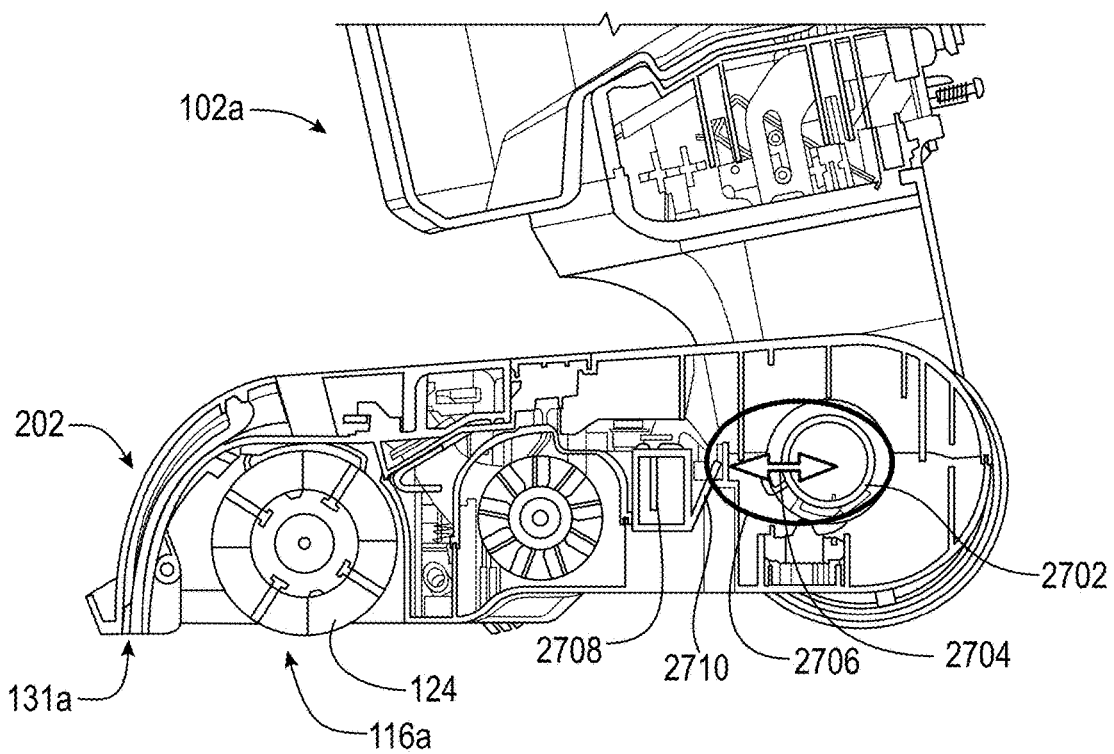
FIG. 27 is a side sectional and diagrammatic view of a portion of another embodiment of an extraction cleaner consistent with the present disclosure.

In another embodiment, as shown for example in FIG. 27, an upright body 102a of the extraction cleaner may be coupled to a base 104a of the extraction cleaner by a pivot joint 2702 that allows both pivoting movement of the upright body 102a relative to the base 104a and linear movement of the upright body 102a relative to the base 104a as illustrated by arrow 2704. For example, the pivot joint 2702 may be disposed in a slot 2706 defined in the base 104a. A switch 2708 having a switch arm 2710 may be positioned adjacent a forward end of the slot 2706. When a user pulls the base 104a rearward using a handle 137a on the upright body 102a, the pivot joint 2702 may move rearwardly in the slot 2706 to retract the pivot joint 2702 from the switch arm 2710 and place the switch 2708 in an open or closed state. In response to the state of the switch 2708, a controller 145 of the extraction cleaner may reduce or discontinue the flow of cleaning fluid through the supply lines 112 and to the nozzles 114a. When a user pushes the base 104a forward using the handle 137a on the upright body 102a, the pivot joint 2702 may move forward in the slot 2706 and a portion of the pivot joint 2702 may contact the switch arm 2710 to place the switch 2708 in an open or closed state. In response to the state of the switch 2708, the controller 145 may cause cleaning fluid to flow through the supply lines 112, e.g., by energizing a pump 125, and to the nozzles 114a for distribution onto the surface to be cleaned 110.

In some embodiments, the control mechanism may be a mechanical valve. For example, the detector may include a portion that contacts or retracts from a portion of a mechanical valve to cause distribution of fluid to the nozzles 114a, or that contacts or retracts from a portion of the mechanical valve to reduce or discontinue distribution of fluid to the nozzles 114a. In other embodiments, the mechanical valve may be configured as a one-way pressure release valve in a recirculation loop. The detector may include a portion that contacts or retracts from a portion of the pressure release valve to control fluid distribution depending on forward and/or rearward motion of the base 104a.

The supply tank 106a and the additive tank 107a in an extraction cleaner consistent with the present disclosure may be provided in a variety of configurations. In some embodiments, the supply tank 106a and the additive tank 107a are configured to be removably coupled to the upright body 102a, and the additive tank 107a is configured to be removable from the supply tank 106a. For example, one or more of the supply tank 106a and/or the additive tank 107a may be removed by a user for replenishing the first cleaning fluid stored within the supply tank 106a and/or the second cleaning fluid stored within the additive tank 107a.

Figure 28:
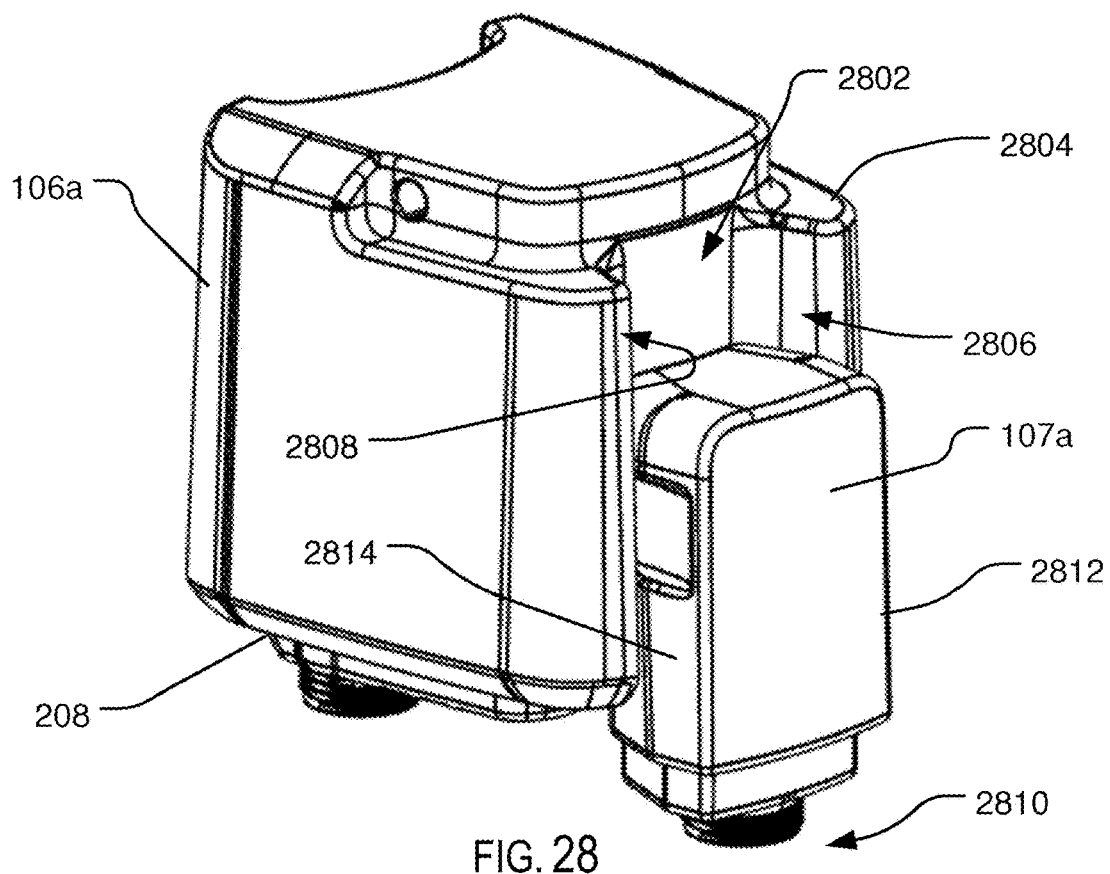
FIG. 28 a front perspective view of the supply tank and additive tank of the extraction cleaner shown in FIG. 2.

With reference to FIGS. 2 and 28, the upright body 102a may define a cleaning fluid support 206 configured to support a bottom 208 of the supply tank 106a and the additive tank 107a. The supply tank 106a may define an additive tank receptacle 2802 for removably receiving at least a portion of the additive tank 107a. The additive tank receptacle 2802 may extend from a top surface 2804 of the supply tank 106a toward bottom 208 of the supply tank 106a and may extend between first 2806 and second 2808 rails defined by the supply tank 106a. In some embodiments, the bottom 2810 of the additive tank 107a may be inserted into the top of the additive tank receptacle 2802 at the top surface 2804 of the supply tank 106a with opposite sides 2812, 2814 of the additive tank 107a slidably engaging associated ones of the rails 2806, 2808. The additive tank 107a may be lowered downwardly in the additive tank receptacle 2802 to rest on the support 206 and/or the supply tank 106a. In other embodiments, the additive tank 107a may be forced into the additive tank receptacle 2806 from the side of the supply tank 106a to slidably engage rails 2806, 2808.

When the supply tank 106a and the additive tank 107a are coupled to the upright body 102a, the additive tank 107a is at least partially received within the additive tank receptacle 2802 and the supply tank 106a may assist in supporting the additive tank 107a in an upright position. Such a configuration may generally be described as a nested configuration. The additive tank receptacle 2802 may extend around at least a portion of the additive tank 107*a* when the additive tank 107*a* is disposed in the additive tank receptacle 2802.

In some embodiments, the second cleaning fluid within the additive tank 107*a* and/or the first cleaning fluid within the supply tank 106*a* may be sensitive to sunlight. As such, the additive tank 107*a* and/or the supply tank 106*a* may be constructed of a transparent material configured to at least partially filter out wavelengths of light that may degrade the second cleaning fluid or the first cleaning fluid.

Figure 29:
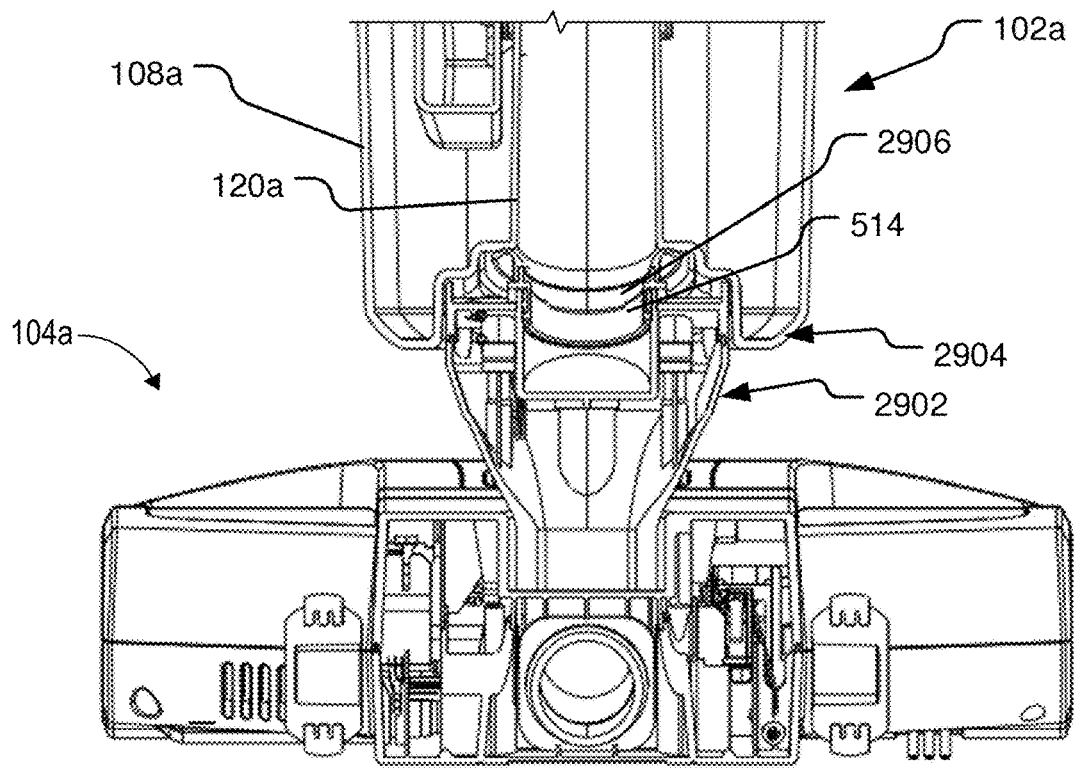
FIG. 29 is a rear sectional view of a portion of the extraction cleaner shown in FIG. 2.
Figure 30:
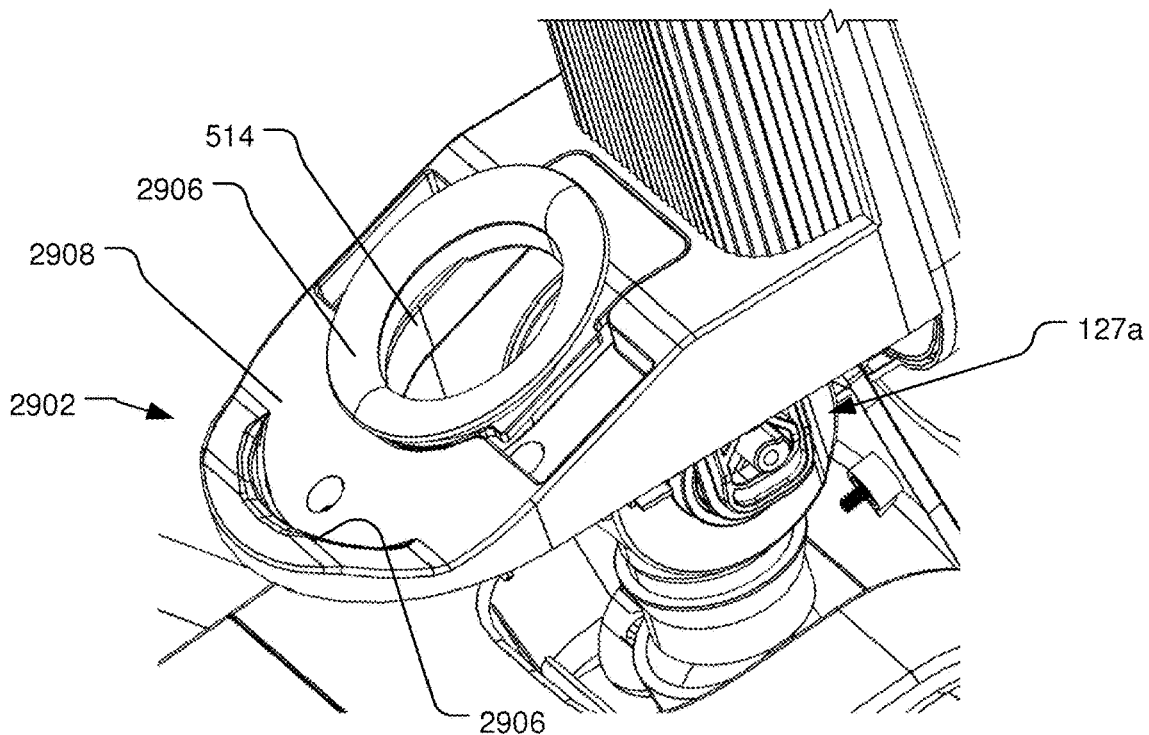
FIG. 30 is a front perspective view of a portion of the extraction cleaner shown in FIG. 2.
Figure 31:
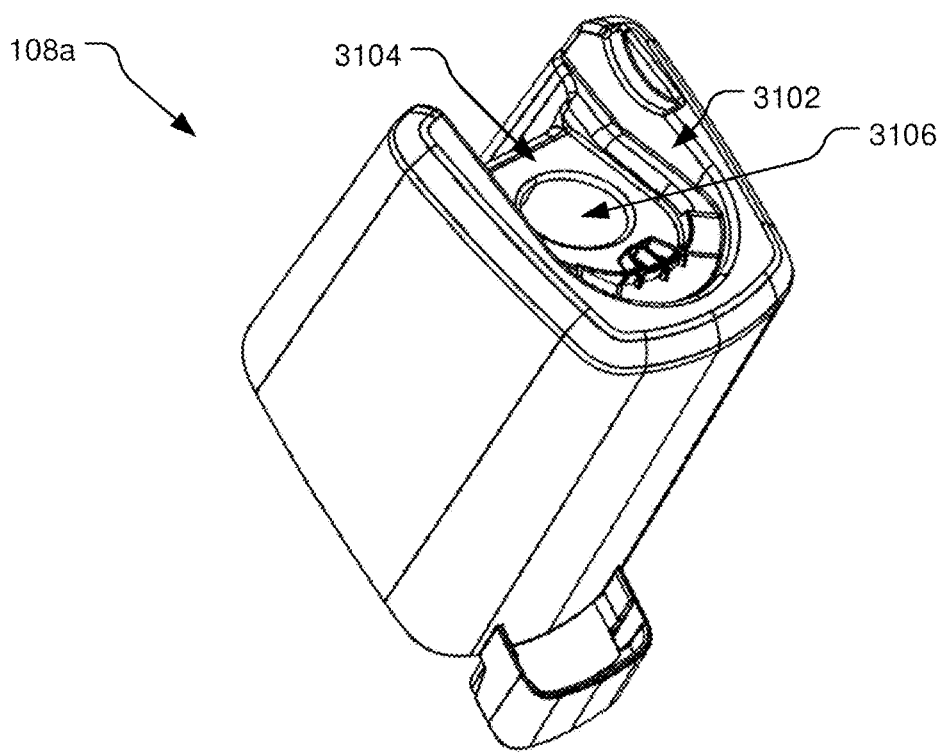
FIG. 31 is a bottom perspective view of the recovery tank of the extraction cleaner shown in FIG. 2.

The recovery tank 108, 108*a* and a support for the recovery tank 108, 108*a* consistent with the present disclosure may be provided in a variety of configurations. FIG. 29, for example, is a partial rear sectional view of the extraction cleaner 100*a* illustrating the recovery tank 108*a* removably supported on a support 2902. FIG. 30 is a top perspective view of a portion of the extraction cleaner 100*a* showing the support 2902. FIG. 31 is a bottom perspective view of a body portion the recovery tank 108*a*. As shown, the bottom surface 3102 of the recovery tank 108*a* may define a support cavity 3104 for receiving the support 2902. The support 2902 may be received in the support cavity 3104 of the recovery tank 108*a*. The recovery tank 108*a* may rest on, and be removably supported by, the support 2902 with an outer perimeter 2904 of the recovery tank 108*a* overhanging the support 2902, as shown particularly in FIG. 29. An outlet port 514 of the suction changeover valve 127*a* may extend upwardly into the support 2902 and a seal 2906 may be provided on the outlet port 514. The recovery conduit 120*a* may be formed as part of the recovery tank 108*a* and an inlet 3106 of the recovery conduit 120*a* may be seated on the seal 2906 to provided fluid communication between the outlet port 514 of the suction changeover valve 127*a* and the recovery conduit 120*a*.

Figure 32:
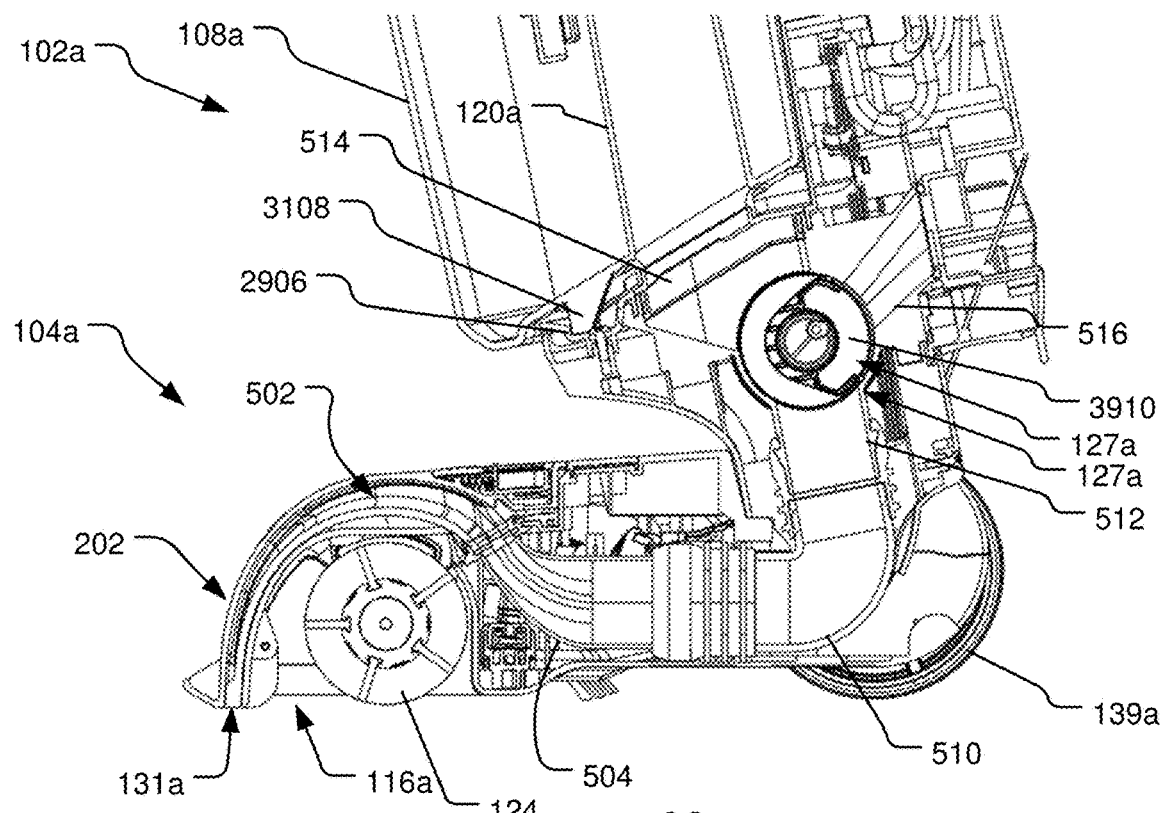
FIG. 32 is a side sectional view of a portion of the extraction cleaner shown in FIG. 2.

The recovery tank 108*a* may include a projection 3108 extending downwardly from the bottom surface 3102 thereof. The projection 3108 may be positioned within the support cavity 3104 and toward the front of the support cavity 3104. The support 2902 may include a retaining wall 2906 defined in a top surface 2908 thereof and toward the front of the support 2902. As shown in FIG. 32, when the recovery tank 108*a* is installed on the support 2902 a front surface of the projection 3108 on the recovery tank 108*a* engages the retaining wall 2906 to removably retain the recovery tank 108*a* on the support 2902.

Figure 33:
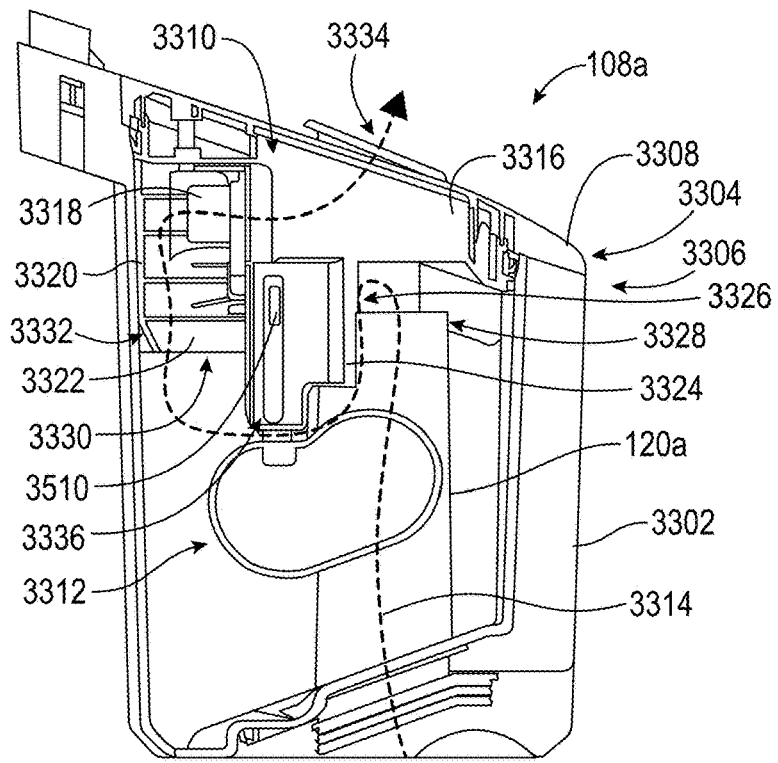
FIG. 33 is a side sectional view of the recovery tank of the extraction cleaner shown in FIG. 2.

FIG. 33 is a sectional view of the recovery tank 108*a*. As shown, the recovery tank 108*a* includes a tank body 3302 and a cover 3304 positioned over a top open end 3306 of the tank body 3302. The cover includes a top 3308, an air flow management configuration 3310 coupled to the top 3308, and a float 3312 coupled to the air flow management configuration 3310.

In the illustrated example embodiment, when the cleaner 100*a* is operating to provide suction at the suction inlet 131*a* or the cleaning tool suction inlet 135*a*, a suction motor 118*a* may generate suction airflow through the recovery conduit 120*a* and the recovery tank 108*a*, as illustrated by arrow 3314, to urge fluid and/or debris (the fluid and/or debris referred to herein as "recovered fluid") into the tank body 3302. At least a portion of the float 3312 is buoyant and floats on the recovered fluid in the tank body 3302. As the recovered fluid in the tank body 3302 rises the float 3312 is forced upward to the position shown in FIG. 33 to close the suction airflow path 114 through the recovery tank 108*a*. The controller 145 may be configured to shut off the suction motor 118*a* when the suction airflow path is closed, e.g., in response to a sensor output indicating the airflow path is closed. With this configuration, the recovered fluid may be extracted from the surface to be cleaned 110 or a target surface and stored in the tank body 3302 of the recovery tank 108*a*. When the recovery tank 108*a* is full, the suction motor 118*a* is shut off. A user may then remove the recovery tank 108*a* from the support 2902 to empty the recovery tank 108*a*.

Figure 34:
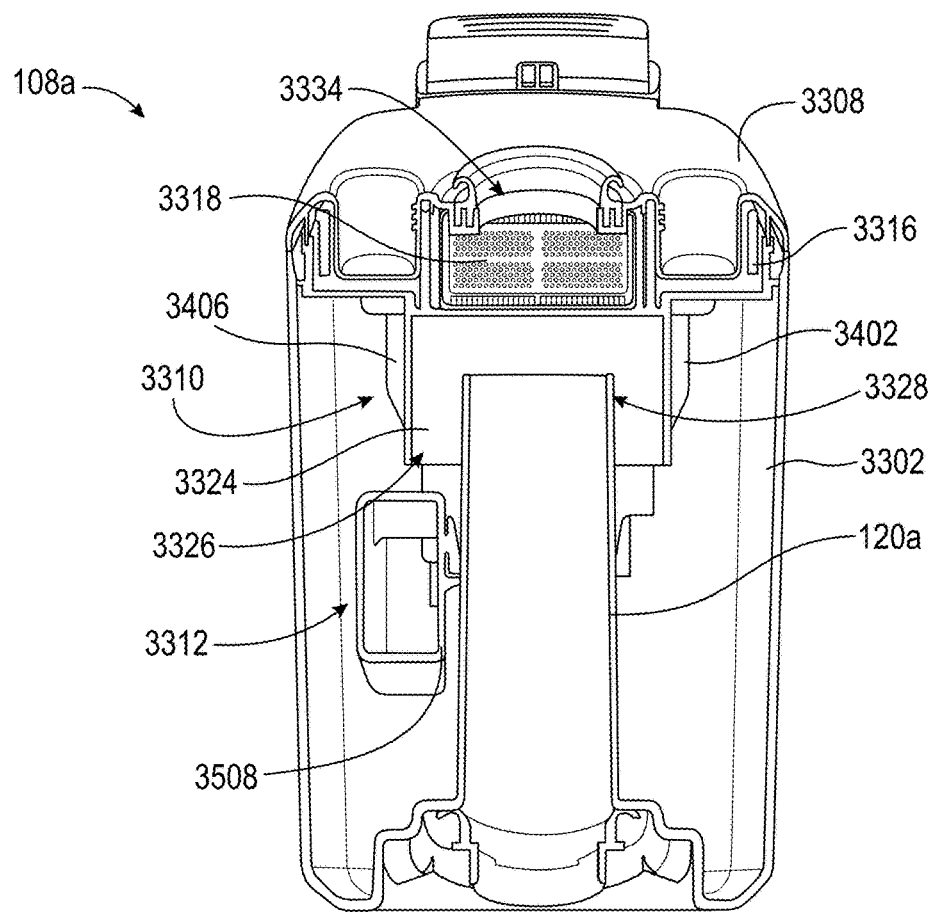
FIG. 34 is a front sectional view of the recovery tank shown in FIG. 33.

With reference also to the sectional view of FIG. 34, the air flow management configuration 3310 includes an airflow management body 3316, a screen 3318, a shield 3320 and a foam filter 3322. The airflow management body 3316 includes an outer wall 3324 defining a semi-circular cavity 3326 for receiving the top 3328 of recovery conduit 120*a* and first 3402 and second 3406 flanges extending outwardly toward respective sides of the tank body 3302. The shield 3320 defines a cavity for receiving the foam filter 3322 and has an opening in a bottom thereof defining an inlet 3330 to the foam filter 3322. A bottom portion 3332 of the shield 3320 is angled inwardly toward the inlet 3330 to the foam filter 3332. Advantageously, the outer wall 3324 forces the airflow from the recovery conduit 120*a* downward past the bottom end of the outer wall 3324, as illustrated by arrow 3314. The airflow passes around the flanges 3402, 3406 and into the inlet 3330 of the foam filter 3332. When the airflow is not blocked by the float 3312, it passes through the screen 3318 and then out through an outlet 3334 that is fluidly coupled to the suction motor 118*a*. The suction air may then pass around the suction motor 118*a* and through vents in the side of the upright body 102*a* of the extraction cleaner 100*a*. Advantageously, the flanges 3402, 3406 restrict high speed airflow from carrying water droplets into the inlet 3330 to the foam filter 3323. Also, the shield 3320 around the foam filter 3323 restricts droplets of water in the suction airflow and droplets on the walls of the tank body 3302 from entering the inlet 3330 to the foam filter 3323.

Figure 35:
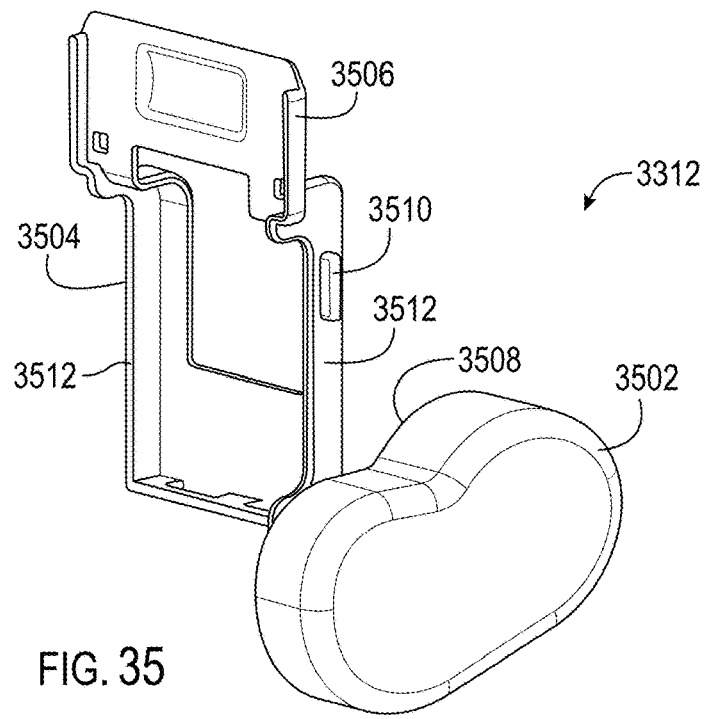
FIG. 35 is a rear perspective view of the float of the recovery tank shown in FIG. 33.

FIG. 35 is a perspective view of the float 3312. As shown, the float 3312 includes a buoyant member 3502, an arm 3504 and a valve member 3506. The buoyant member 3502 may be a hollow structure is coupled to one side of the arm 3504. The buoyant member 3502 is hollow and has a flat side surface 3508, a portion of which is in opposed facing relationship to the recovery conduit 120*a* on only one side of the recovery conduit 120*a*. The arm 3504 extends upwardly from the buoyant member 3502 and the valve member 3506 is provided to a the top of the arm 3504.

The float 3312 is supported by the airflow management body 3316. With reference also to FIG. 33, a tab 3510 extends outwardly from each side 3512 of the arm 3504 and is positioned to ride in a corresponding slot 3336 defined in the airflow management body 3316 so that the slot 3336 defines the upper and lower limits of travel of the float 3312 as the buoyant member 3502 floats on the recovered fluid in the tank body 3302. In some embodiments, the float 3312 may be assembled to the airflow management body 3316 by flexing the sides 3512 inward to position the tabs 3510 adjacent the slots 3336 and then releasing the sides 3512 to allow the tabs 3510 to enter the slots 3336.

Figure 36:
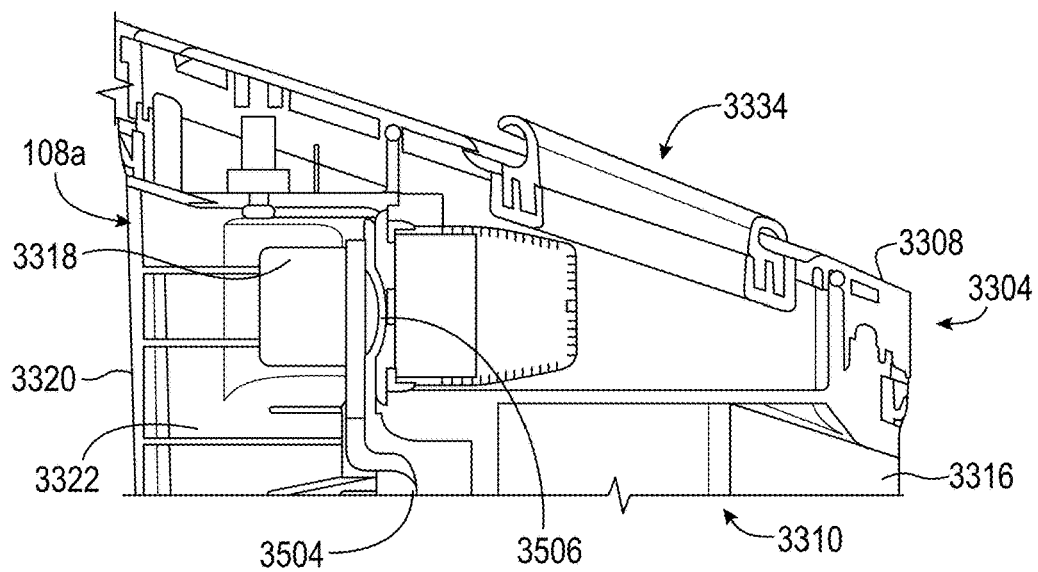
FIG. 36 is a side sectional view of a portion of the recovery tank shown in FIG. 33.

As the recovered fluid in the tank rises, the valve member is forced upward until a convex portion of the valve member 3506 obstructs the inlet to the screen 3318, as shown in FIG. 36. In this position, suction airflow is blocked from exiting the recovery tank 108*a* through the outlet 3334. The suction motor 118*a* may then be shut off by the controller 145 and the recovery tank 108*a* may be removed from the extraction cleaner 100*a* for emptying.

As mentioned previously, the suction airflow generated by the suction motor 118*a* may be selectively fluidly coupled to the base 104*a* to establish suction airflow at the suction inlet 131a or to the flexible hose 103a to establish suction airflow at the cleaning tool suction inlet 135a depending on the state of the suction changeover valve 127a. A suction changeover valve 127a consistent with the present disclosure may be provided in a variety of configurations.

Figure 37:
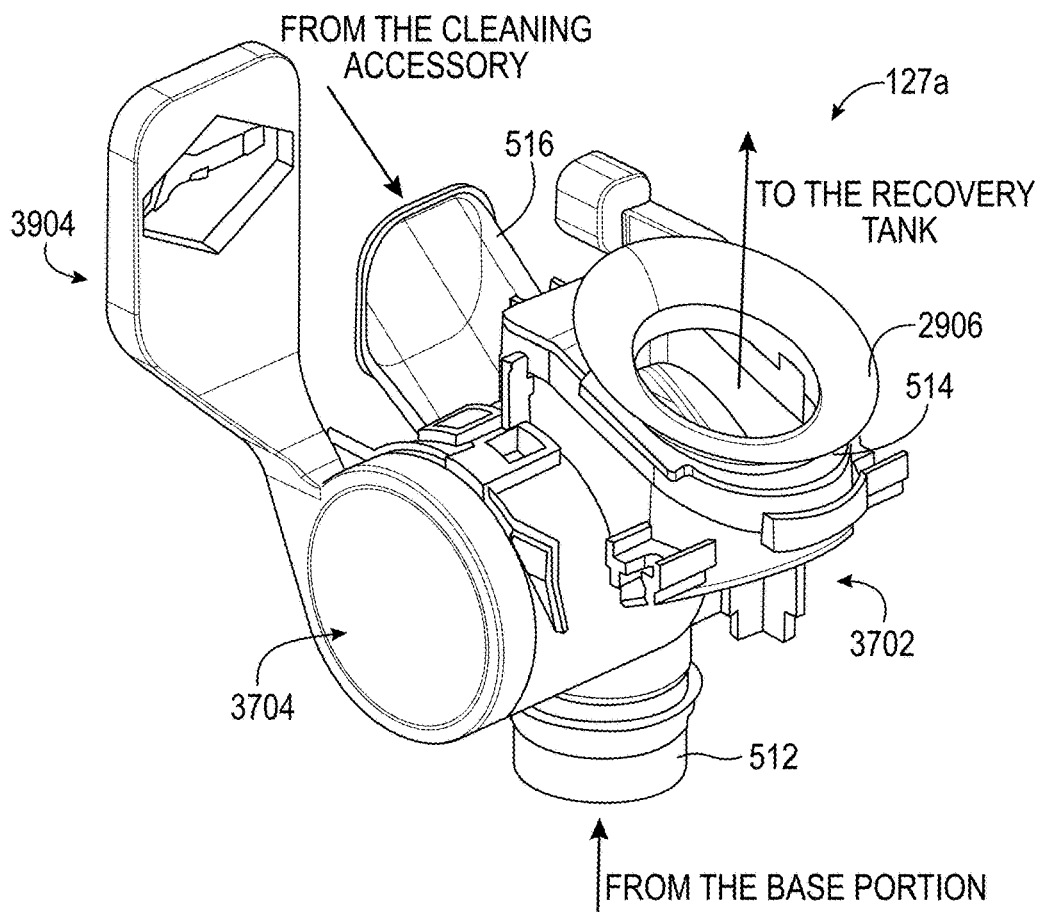
FIG. 37 is a front perspective view of the suction changeover valve of the extraction cleaner shown in FIG. 2.
Figure 38:
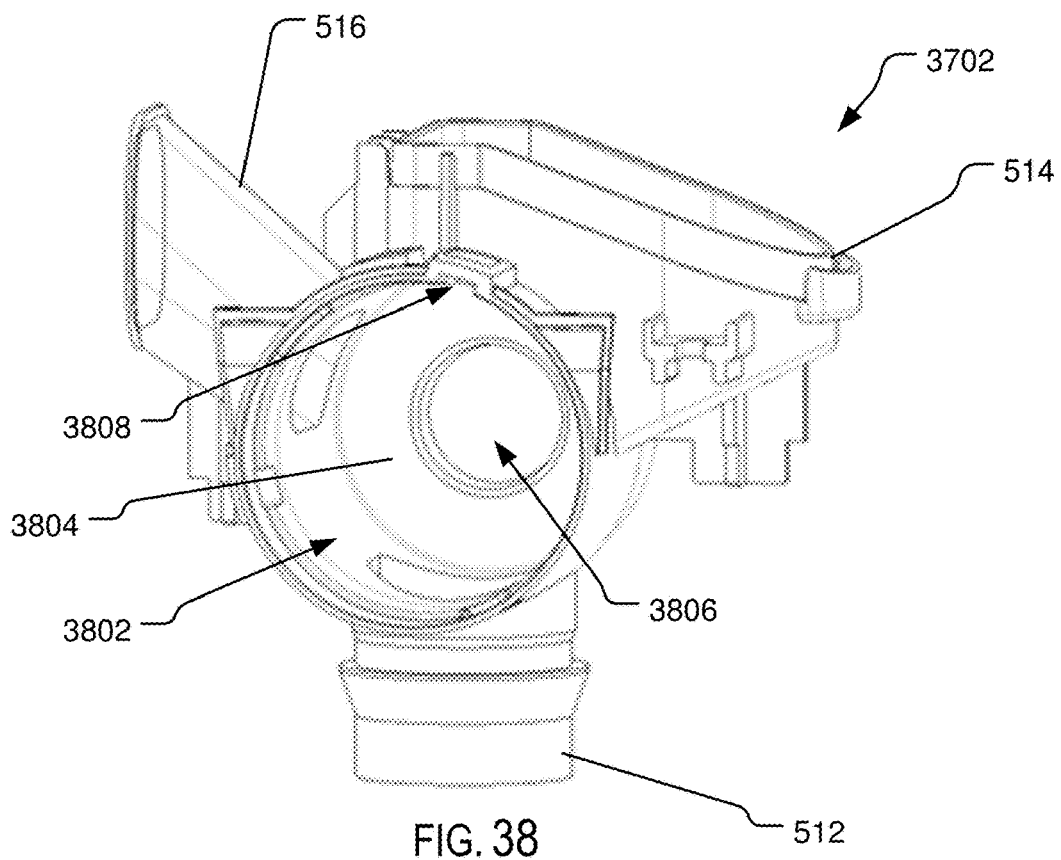
FIG. 38 is a side perspective view of the housing of the suction changeover valve shown in FIG. 37.

FIG. 37 is a perspective view of the suction changeover valve 127a. The illustrated example embodiment is configured as a rotary valve having a housing 3702 and a rotor 3704. With reference also to FIG. 38, the housing 3702 defines the base inlet port 512, the cleaning tool inlet port 516, the outlet port 514, and a generally circular rotor cavity 3802. The rotor cavity 3802 is configured for receiving at least a portion of the rotor 3704. A rear wall 3804 of the rotor cavity 3902 has an opening 3806 therein that is substantially coaxial with the rotor cavity 3802.

Figure 39:
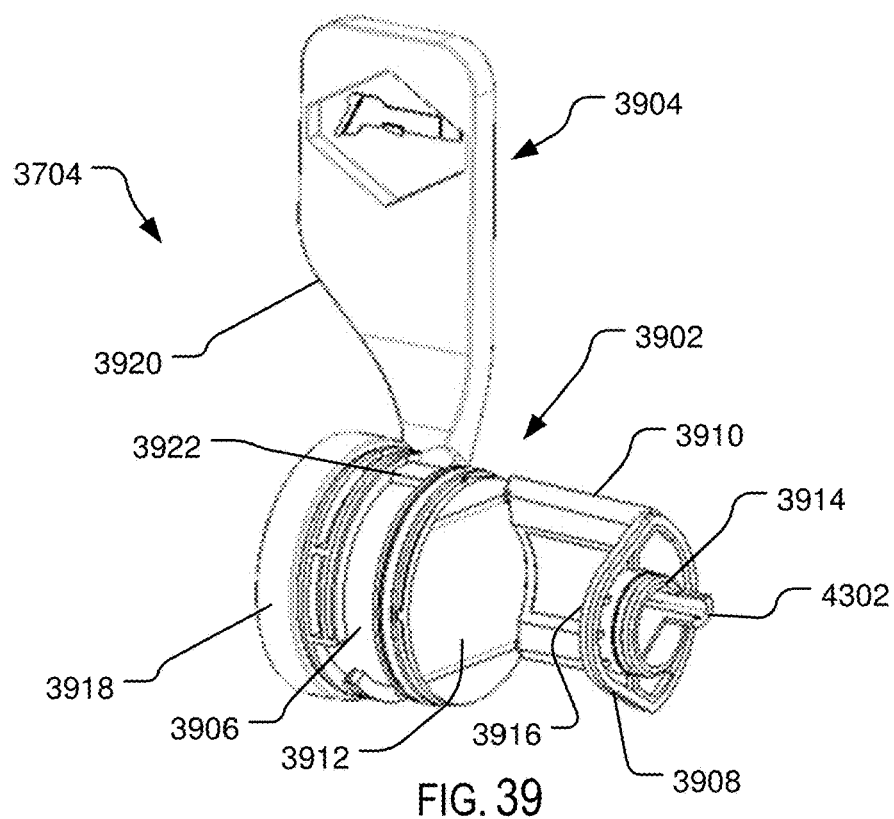
FIG. 39 is a front perspective view of the rotor of the suction changeover valve shown in FIG. 37.

As shown in FIG. 39, the rotor 3704 includes a rotor body 3902 and rotor arm 3904. The rotor body 3902 includes a first end 3906, a second end 3908, and plug 3910 extending between the first end 3906 and the second end 3908. The first end 3906 is generally cylindrical and is configured to be rotatably received in the rotor cavity 3802. A first side of the plug 3910 is coupled to and extends along a portion of the perimeter of an inner surface 3912 of the first end 3906. The second end 3908 has an outer perimeter in the shape an arc having substantially the same diameter as the cylindrical first end 3906. An outer surface of the second end 3908 has a cylindrical boss 3914 extending axially therefrom and configured to be received in the opening 3806 in the rear wall 3804 of the rotor cavity 3802. The second side of the plug 3910 is coupled to and extends along the outer perimeter of an inner surface 3916 of the second end 3908.

The rotor arm 3904 includes a rotor arm body 3918 and a handle 3920. The rotor arm body 3918 is generally cylindrical and the handle 3920 extends radially outwardly from the rotor arm body 3918. The rotor arm body 3918 is coupled to the first end 3906 of the rotor body 3902.

At least a portion of the rotor body 3902 may be received in the rotor cavity 3802 with the boss 3914 on the second end 3908 of the rotor body 3902 disposed in the opening 3806 in the rear wall 3804 of the rotor cavity 3802. In some embodiments, the rotor 3704 may include a projection 3922 on an outer surface of the first end 3906 of the rotor body 3902 or the rotor arm body 3918 that may be received in a corresponding slot 3808 defined in the housing 3702 for assembling the rotor 3704 to the housing 3702.

For example, the second end 3908 of the rotor body 3902 may be inserted into the rotor cavity 3802 with the boss 3914 aligned for extending into the opening 3806 in the rear wall 3804 of the rotor cavity 3802. The rotor 3704 may be positioned to align the projection 3922 with the slot 3808 in the housing 3704 and the rotor body 3902 may be pushed inwardly into rotor cavity 3802 so that the boss 3914 is disposed in the opening 3806. The rotor 3704 may then be rotated so that the projection 3922 and slot 3808 are no longer aligned and the rotor body 3902 is at least partially, and rotatably, secured in the rotor cavity 3802.

When the rotor body 3902 is rotatably disposed in the rotor cavity 3802, a user may move the suction changeover valve 127a between a base suction state and a cleaning tool suction state by manually manipulating the handle 3920 of the rotor arm 3904. For example, to place the suction changeover valve 127a in the base suction state, a user may move the handle 3920 to the upward orientation shown in FIGS. 2 and 32, thereby rotating the body 3902 and the plug 3910 within the rotor cavity 3802. In this upward orientation of the handle 3920, the plug 3910 blocks fluid communication between the cleaning tool inlet port 516 and the outlet port 514 of the housing 3702. With the plug 3910 in this position, the base inlet port 512 is fluidly coupled to the outlet port 514, and the recovery conduit 120a is fluidly coupled to the base airflow path 119a (FIG. 5). The suction motor 118a can thus urge recovered fluid from the surface to be cleaned 110 through the base airflow path 119a and into the recovery tank 108a.

Figure 40:
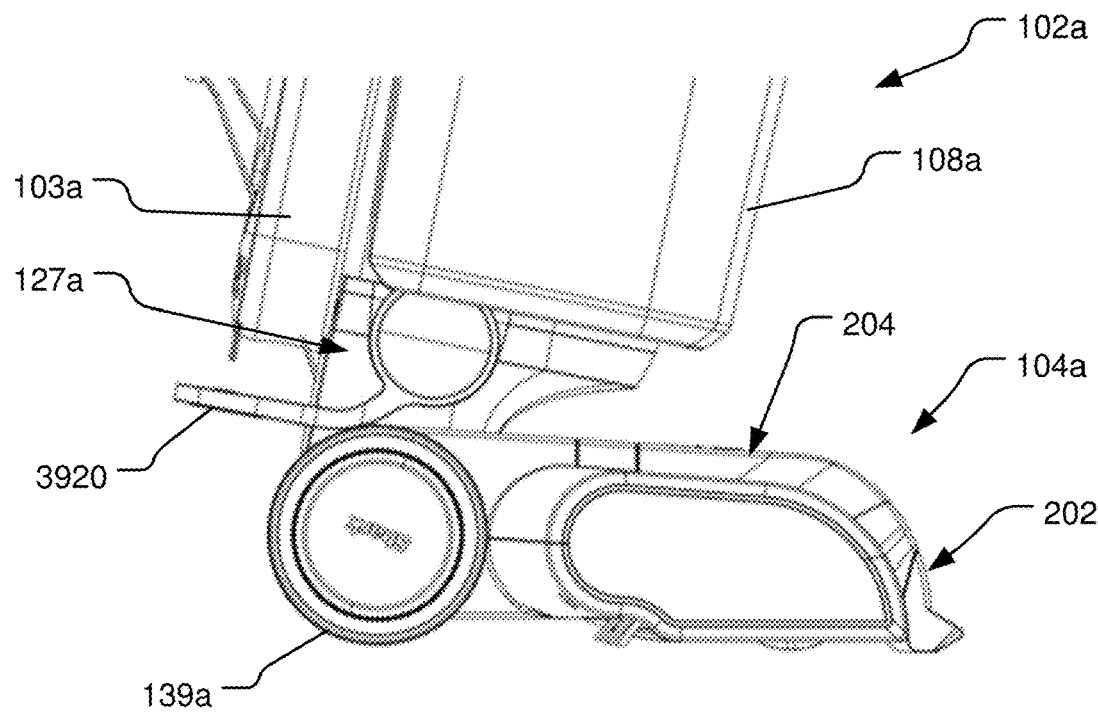
FIG. 40 is a side view of a portion of the extraction cleaner shown in FIG. 2 with a handle of a rotor in a downward orientation.
Figure 41:
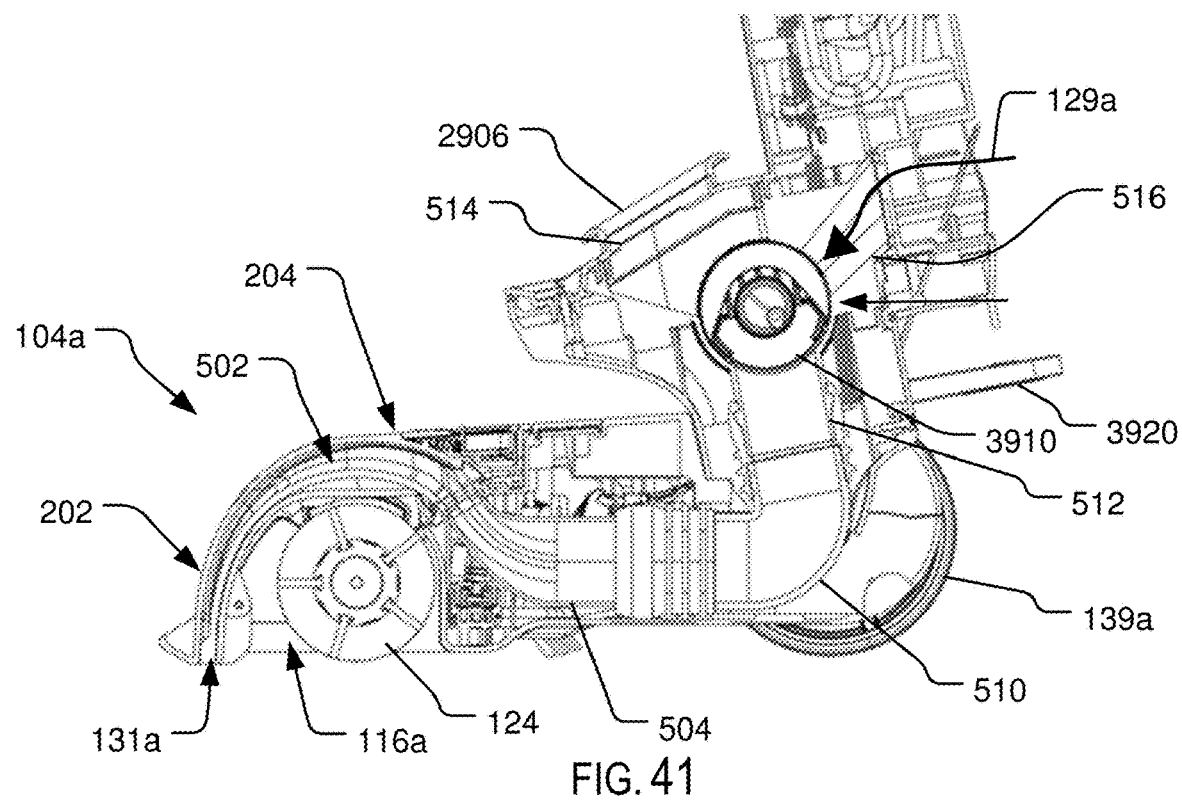
FIG. 41 is a side sectional view of a portion of the extraction cleaner shown in FIG. 2 with a handle of a rotor in a downward orientation.

To place the suction changeover valve 127a in the cleaning tool suction state, a user may move the handle 3920 to the downward orientation shown in FIGS. 40 and 41, thereby rotating the rotor body 3902 and the plug 3910 within the rotor cavity 3902. In this downward orientation of the handle 3920, the plug 3910 blocks fluid communication between the base inlet port 512 and the outlet port 514 of the housing 3702. With the plug 3910 in this position, the cleaning tool inlet port 516 is fluidly coupled to the outlet port 514, and the recovery conduit 120a is fluidly coupled to the cleaning tool airflow path 129a. The suction motor 118a can thus urge recovered fluid deposited on a target surface through the cleaning tool airflow path 129a and into the recovery tank 108a.

A suction changeover valve 127a consistent with the present disclosure may be provided in a variety of manual, automatic or semi-automatic configurations. In some embodiments, the suction changeover valve 127a may be placed in a selected state using an electrically driven member such as a solenoid. The electrically driven member may be controlled by user input, e.g., a mechanical or graphical user interface (GUI) button on a control panel 141, for selecting a desired state for the suction changeover valve 127a, and/or by an output from a controller 145 to set the state of the suction changeover valve 127a in response to the output of one or more sensors. In some embodiments, for example, the base suction state and/or the cleaning tool suction state may be selected by a user by manually manipulating or energizing an electrically controlled valve when the cleaner is an upright position, e.g., as show in FIGS. 1 and 2. In some embodiments, when the cleaner is in the upright position, a mechanical or electrical switch may automatically move the suction changeover valve 127a to a cleaning tool suction state and when the cleaner is moved to a reclined position for floor cleaning, the mechanical or electrical switch may automatically move the suction changeover valve 127a to a base suction state. In some embodiments, when the cleaning tool 105a is removed from a storage position, as shown for example in FIG. 2, the act of removing the cleaning tool 105a may change the state of mechanical or electrical switch move the suction changeover valve 127a to the cleaning tool suction state. Replacement of the cleaning tool 105a in the storage position may again change the state of the switch to move the suction changeover valve 127a to the base suction state. In some embodiments, installation or removal of the recovery tank 108a, the supply tank 106a and/or the additive tank 107a from the cleaner 100a may change the state of a mechanical or electrical switch to place the suction changeover valve 127a in the cleaning tool suction state or the base suction state.

In some embodiments, a suction changeover valve 127a consistent with the present disclosure may have a removal position. When the suction changeover valve 127a is in the removal position the rotor 3704 may be removed from the housing 3702 for cleaning or maintaining the suction changeover valve 127a. For example, in the illustrated embodiment, the suction changeover valve 127a may be placed in the removal position by moving the handle 3920 forward relative to the upright orientation to thereby align projection 3922 with the slot 3808. When the projection 3922 is aligned with the slot 3808, the rotor 3704 may be manually withdrawn from the rotor cavity 3802 by forcing the rotor 3704 axially and with the projection 3922 sliding outwardly from the slot 3808. This allows access to the rotor 3704 and the rotor cavity 3802 for cleaning. By way of example, the suction changeover valve 127a may be placed in a removal position when the handle 3920 is moved about 30 degrees Forward relative to the upright orientation shown in FIGS. 2 and 32.

A variety of other configurations for a suction changeover valve will be apparent in light of the present disclosure. In some embodiments, for example, the suction changeover valve 127a may include a removable seal portion to allow for cleaning or maintenance of the suction changeover valve 127a. The seal 2906 shown in FIG. 37, for example, may be removably or pivotally coupled to the housing 3702 to allow access to the interior of the housing 3702. In some embodiments, the flexible hose 103a coupled to the cleaning tool inlet port 512 of the suction changeover valve 127a may be removable to allow access to the interior of the housing 3702 for cleaning or maintenance. In addition, or alternatively, the rotor 3704 of the suction changeover valve 127a may include one or more features extending therefrom, such as a wiper, teeth, etc., that dislodge debris at the interior of the suction changeover valve 127a when the rotor 3704 is rotated in the rotor cavity 3802 and/or when the rotor 3704 is removed from the housing 3702. The interior of the suction changeover valve 127a may also include one or more interior suction paths through the suction changeover valve 127a that tends to dislodge debris. The rotor 3704 may also be positioned in the rotor cavity 3802 to provide clearance between the rotor 3704 and portions of the housing 3702 defining the rotor cavity 3802 to avoid trapping debris in the rotor cavity 3802.

In some embodiments, the movement of the suction changeover valve 127a to the base suction state automatically places a fluid changeover valve 123 in a base supply state to provide fluid delivery to the nozzle(s) 114a on the base 104a, and movement of the suction changeover valve 127a to the cleaning tool suction state places the fluid changeover valve 123 in a cleaning tool supply state to provide fluid delivery to the fluid dispensing nozzle(s) 115 on the cleaning tool 105a. For example, an electrical switch, e.g., a microswitch, Hall effect switch, optical switch etc. may be positioned adjacent the suction changeover valve 127a and be configured to be responsive the position of the suction changeover valve 127a to control, directly or by the controller 145, an electrically actuated fluid changeover valve 123. In other embodiments, the suction changeover valve 127a may be mechanically coupled to the fluid changeover valve 123 such that movement of the suction changeover valve 127a to the base suction state also moves the fluid changeover valve 123 to the base supply state and movement of the suction changeover valve to the cleaning tool suction state also moves the fluid changeover valve 123a to the cleaning tool supply state.

Figure 42:
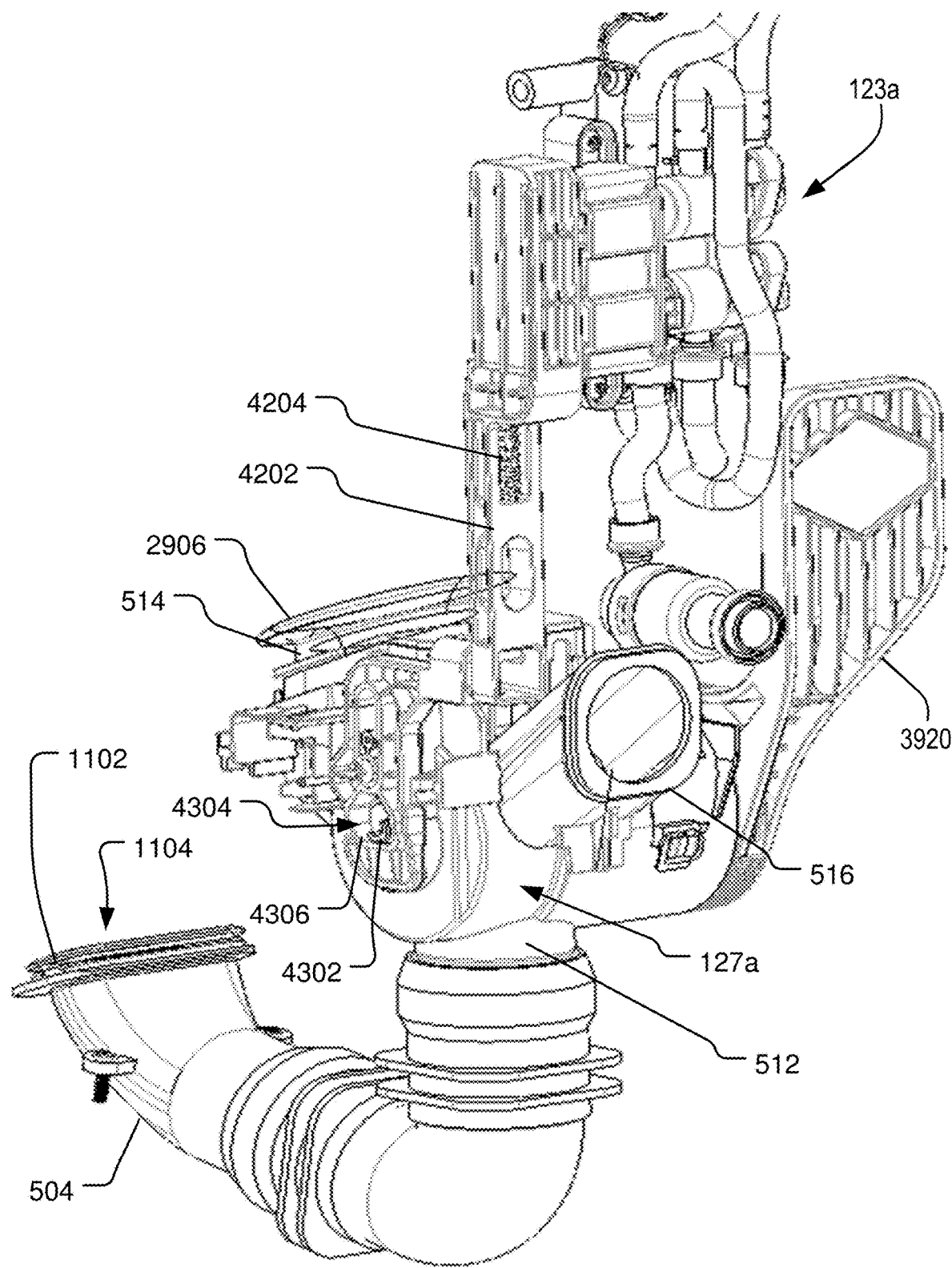
FIG. 42 is a rear perspective view of a portion of the extraction cleaner shown in FIG. 2.
Figure 43:
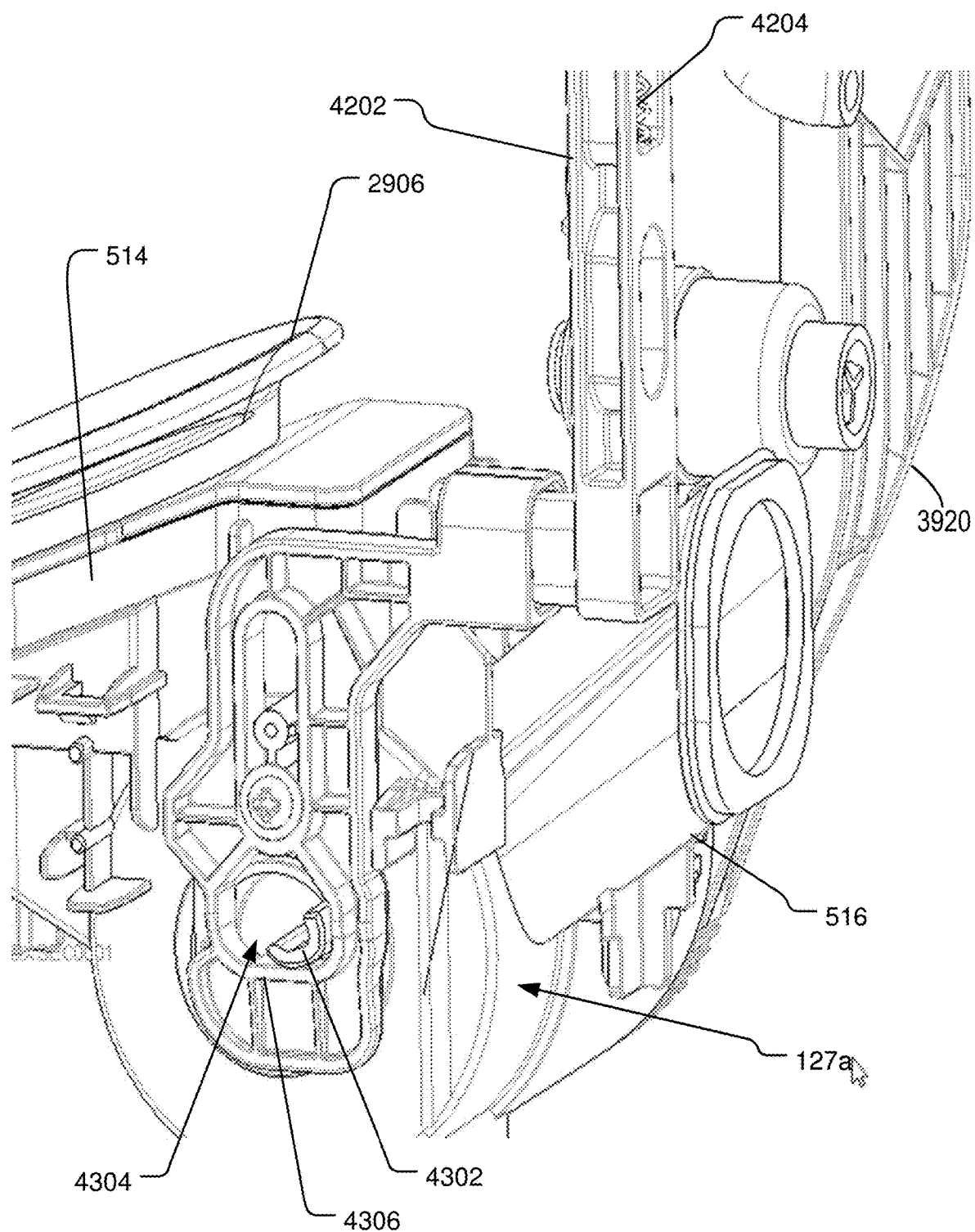
FIG. 43 is a rear perspective view of a portion of the extraction cleaner shown in FIG. 2.
Figure 44:
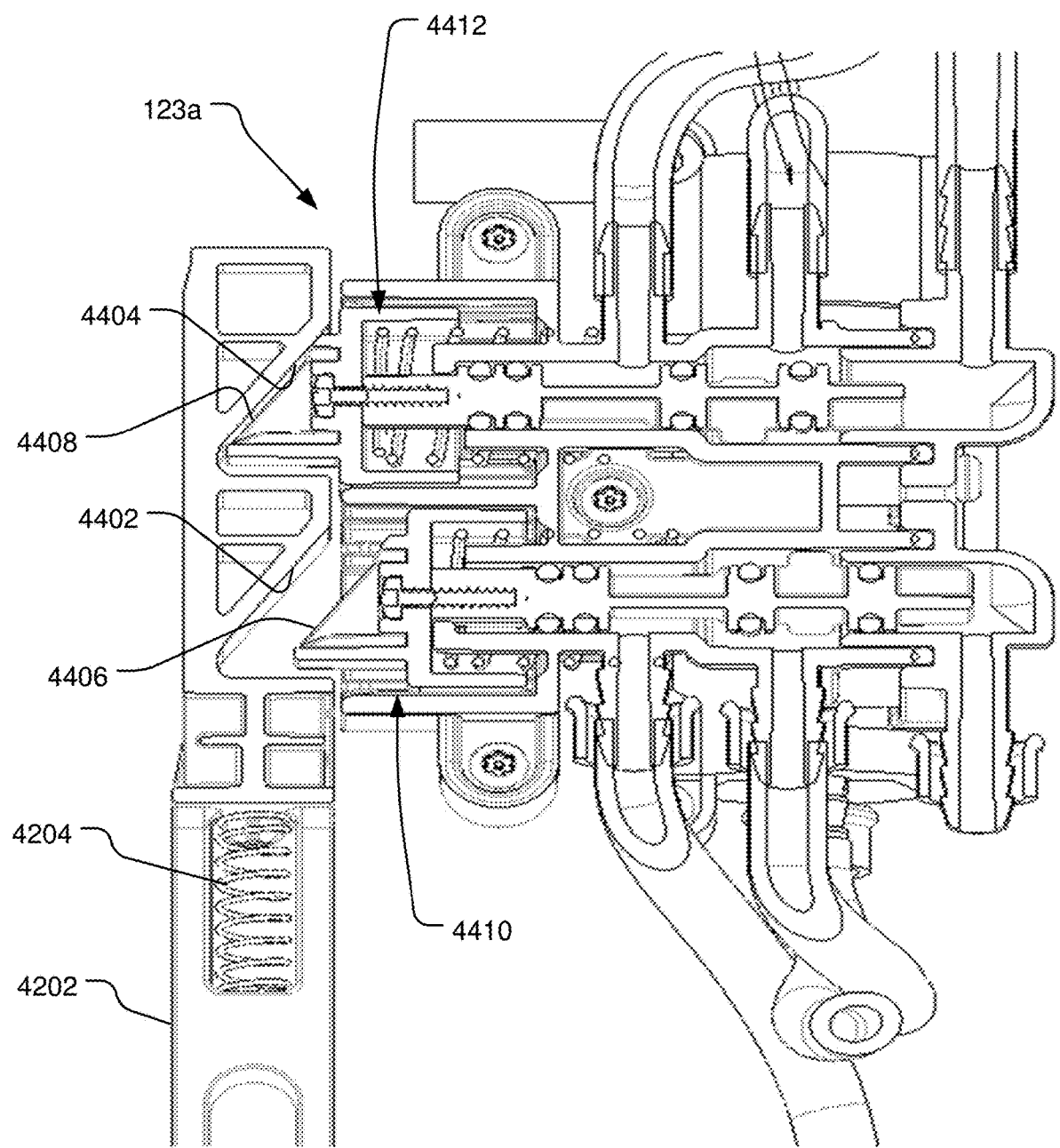
FIG. 44 is a side sectional view of a portion of the extraction cleaner shown in FIG. 2.

FIG. 42, for example, illustrates a mechanical coupling between the suction changeover valve 127a and a fluid changeover valve 123a. The illustrated example embodiment includes a connecting rod 4202 coupled between the suction changeover valve 127a and the fluid changeover valve 123a. With reference also to FIGS. 39, 43 and 44, the rotor 3704 of the suction changeover valve 127a includes a cam 4302 extending axially outward from the outer surface of the boss 3914 and adjacent the perimeter of the boss 3914. The cam 4302 extends into an opening 4304 in a cam follower 4306 configured for linear movement between an upward position and a downward position relative to the suction changeover valve 127a. When the handle 3920 of the suction changeover valve 127a is moved to the upright orientation and the suction changeover valve 127a is moved to the base suction state, the cam 4302 engages the cam follower 4306 to force the cam follower 4306 to the upward position. When the handle 3920 is moved to the downward orientation and the suction changeover valve 127a is moved to the cleaning tool suction state, the cam 4302 engages the cam follower 4306 and forces the cam 4306 follower to the downward position.

A distal end of the cam follower 4306 is coupled to one end of the connecting rod 4202. The connecting rod 4202 is disposed in the upright body 102a for linear movement corresponding to the linear movement of the cam follower 4306. In some embodiments, the connecting rod 4202 and the cam follower 4306 may be biased toward an upward or downward position by a spring 4204 disposed between the connecting rod 4202 and the upright body 102a.

With reference also to FIG. 44, an opposite end of the connecting rod 4202 includes valve engagement surfaces 4402, 4404 positioned adjacent associated engagement surfaces 4406, 4408 of respective valve members 4410, 4412 of the fluid changeover valve 123a. The valve engagement surfaces 4402, 4404 are configured to contact the engagement surfaces 4406, 4408 of the valve members 4410, 4412 to force the valve members 4410, 4412 into a configuration to place the fluid changeover valve 123a into a state corresponding to the state of the suction changeover valve 127a. That is, when the suction changeover valve 127a is moved to the base suction state, the engagement surfaces 4402, 4404 place the valve members 4410, 4412 in a position to place the fluid changeover valve 123a in the base supply state to supply cleaning fluid to the base. When the suction changeover valve 127a is moved to the cleaning tool suction state, the engagement surfaces 4402, 4404 place the valve members 4410, 4412 in a position to place the fluid changeover valve 123a in the cleaning tool supply state for supplying cleaning fluid to the cleaning tool 105a.

A connecting rod 4202 and fluid changeover valve 123a consistent with the present disclosure may be provided in a variety of configurations. For example, the fluid changeover valve 123a may include only a single valve member and the connecting rod 4202 may include only single valve engagement surface for forcing the valve member into a position corresponding to the state of the suction changeover valve 127a. Any number of valve engagement surfaces and valve members may be provided in the fluid changeover valve 123a and the fluid changeover valve 123a may be configured to provide a variety of combinations of fluid pathways depending on the position of the valve members.

Figure 45:
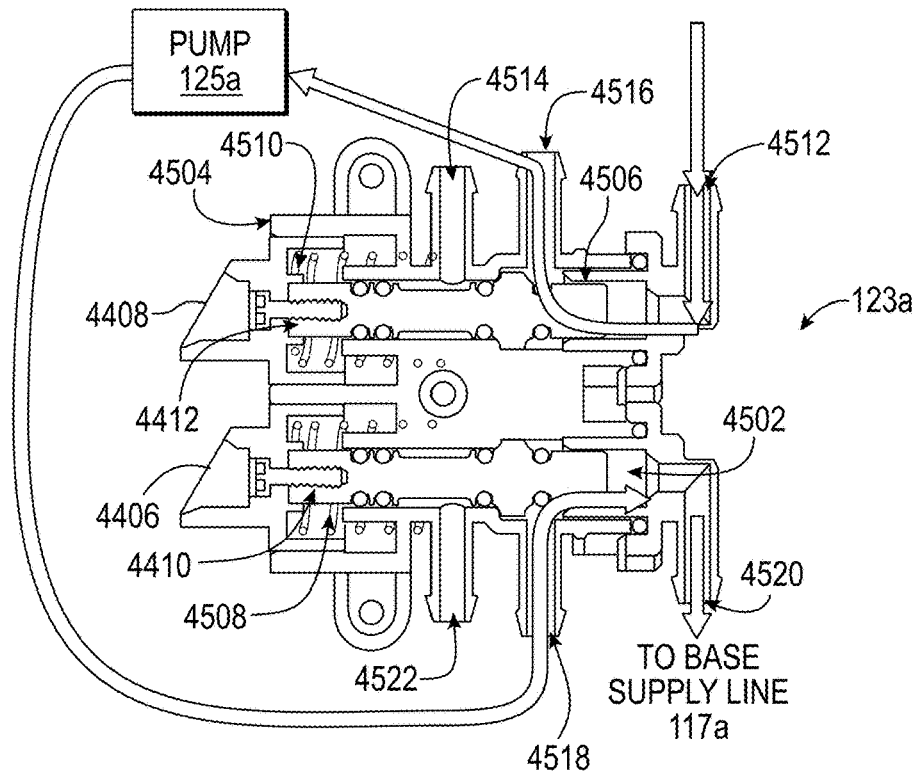
FIG. 45 is a side sectional view of the fluid changeover valve of the extraction cleaner shown in FIG. 2 and diagrammatically illustrating operation of the suction changeover valve.
Figure 46:
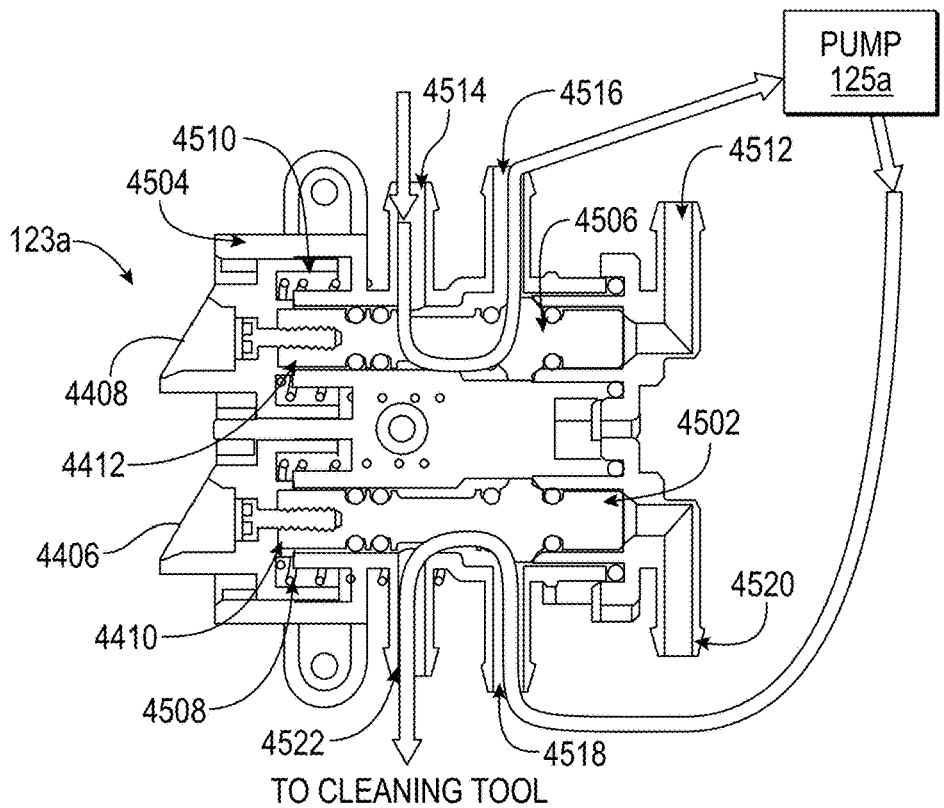
FIG. 46 is a side sectional view of the fluid changeover valve of the extraction cleaner shown in FIG. 2 and diagrammatically illustrating operation of the suction changeover valve.

A fluid changeover valve 123a may also, or alternatively, be placed in a selected state using an electrically driven member such as a solenoid controlled by user input, e.g., a mechanical or graphical user interface (GUI) button on a control panel 141, for selecting a desired position for the fluid changeover valve, and/or by an output from a controller 145 to set the position of the fluid changeover valve 123a in response to the output of one or more sensors. Also, any number of fluid changeover valves may be fluidly coupled, e.g., through one or more control valves, in a system consistent with the present disclosure for selectively coupling the first cleaning fluid and/or the second cleaning fluid to the base 104a and/or the cleaning tool 105a. In some embodiments, for example, the fluid changeover valves and the control valves may be controlled by a user input to allow a user to selectively supply a desired fluid combination, e.g.

boost fluid only, base cleaning fluid only, and/or a desired mixture of boost and base cleaning fluids to the base 104a and/or the cleaning tool 105a. FIGS. 45 and 46 schematically illustrate operation of the example fluid changeover valve 123a shown in FIGS. 42 and 44. The illustrated fluid changeover valve 123a includes a first valve member 4410 disposed in a first chamber 4502 of a housing 4504 and a second valve member 4412 disposed in a second chamber 4506 of the housing 4504. The first 4410 and second 4412 valve members are linearly moveable in the first 4502 and second 4506 chambers between an extended position shown in FIG. 45 and a retracted position as shown in FIG. 46. Each of the valve members 4410, 4412 may be biased toward the extended position by an associated spring 4508, 4510 disposed between the valve member 4410, 4412 and the housing 4504.

The housing 4504 defines first 4512 and second 4514 fluid input ports and a pump output port 4516 in selective fluid communication with the second chamber 4506 depending on the position of second valve member 4412. The housing 4504 also defines a pump input port 4518, a base output port 4520 and a cleaning tool output port 4522 in selective fluid communication with the first chamber 4502 depending on the position of the first valve member 4410.

The pump output port 4516 may be coupled to an input of a pump 125a and the pump input port 4518 may be coupled to an output of the pump 125a. The first fluid input port 4512 may be coupled to an output of the mixing valve 111 (FIG. 1) through supply lines 112 (FIG. 1) and the second input port 4514 may be coupled to a second output of the mixing valve 111 through supply lines 112 (FIG. 1). The base output port 4520 may be fluidly coupled to the base supply line 117a to supply cleaning fluid to the one or more fluid dispensing nozzles 114a coupled to the base 104a. The cleaning tool output port 4522 may be coupled to the cleaning tool supply line 121 (FIG. 1) to supply cleaning fluid to the one or more fluid dispensing nozzles 115 coupled to the cleaning tool 105a.

As shown in FIG. 45, when the first and second valve members 4410, 4412 are in the extended position the first fluid input port 4512 may be fluidly coupled to the pump output port 4516 through the second chamber 4506 and fluid communication between the second fluid input port 4514 and the pump output port 4516 may be blocked by the second valve member 4412. Also, the pump input port 4518 may be fluidly coupled to the base output port 4520 through the first chamber 4502 and fluid communication between the cleaning tool output port 4522 and the pump input port 4518 may be blocked by the first valve member 4410. In this configuration, cleaning fluid provided from a mixing valve 111 to the first fluid input port 4512 may be pumped by the pump 125a into the pump input port 4518 and out to the base supply line 117a coupled to the base output port 4520.

As shown in FIG. 46, when the first and second valve members 4410, 4412 are in the retracted position the second fluid input port 4514 may be fluidly coupled to the pump output port 4516 through the second chamber 4506 and fluid communication between the first fluid input port 4512 and the pump output port 4516 may be blocked by the second valve member 4412. Also, the pump input port 4518 may be fluidly coupled to the cleaning tool output port 4522 through the first chamber 4502 and fluid communication between the base output port 4520 and the pump input port 4518 may be blocked by the first valve member 4410. In this configuration, cleaning fluid provided from a mixing valve 111 to the second input port 4514 may be pumped by the pump 125a into the pump input port 4518 and out to the cleaning tool supply line 121 coupled to the cleaning tool output port 4522.

A single pump 125a may thus be used to pump cleaning fluid from different input ports 4512, 4514 to the base 104a or the cleaning tool 105a depending on the selected positions of the valve members 4410, 4412. In some embodiments, for example, the output of the mixing valve 111 to the first input port 4512 may include only the first cleaning fluid from the supply tank 106a, only the second cleaning fluid from the additive tank 107a, or a mixture of the first cleaning fluid and the second cleaning fluid. The output of the mixing valve 111 to the second input port 4514 may include only the first cleaning fluid from the supply tank 106a, only the second cleaning fluid from the additive tank 107a, or a mixture of the first cleaning fluid and the second cleaning fluid. In the illustrated configuration therefore different cleaning fluids or combinations of cleaning fluids may be provided from mixing valve 111 to the first 4512 and second 4514 input ports to provide the different cleaning fluids to the base 104a or the cleaning tool 105a, respectively. In some embodiments for example, only the first cleaning fluid from the supply tank 106a may be provided to the first input port 4512 for providing only the first cleaning fluid to the base 104a, and a mixture of the first cleaning fluid from the supply tank 106a and the second cleaning fluid from the additive tank 107a may be provided to the second input port 4514 to provide the mixture of the first and second cleaning fluids to the cleaning tool 105a.

Figure 47:
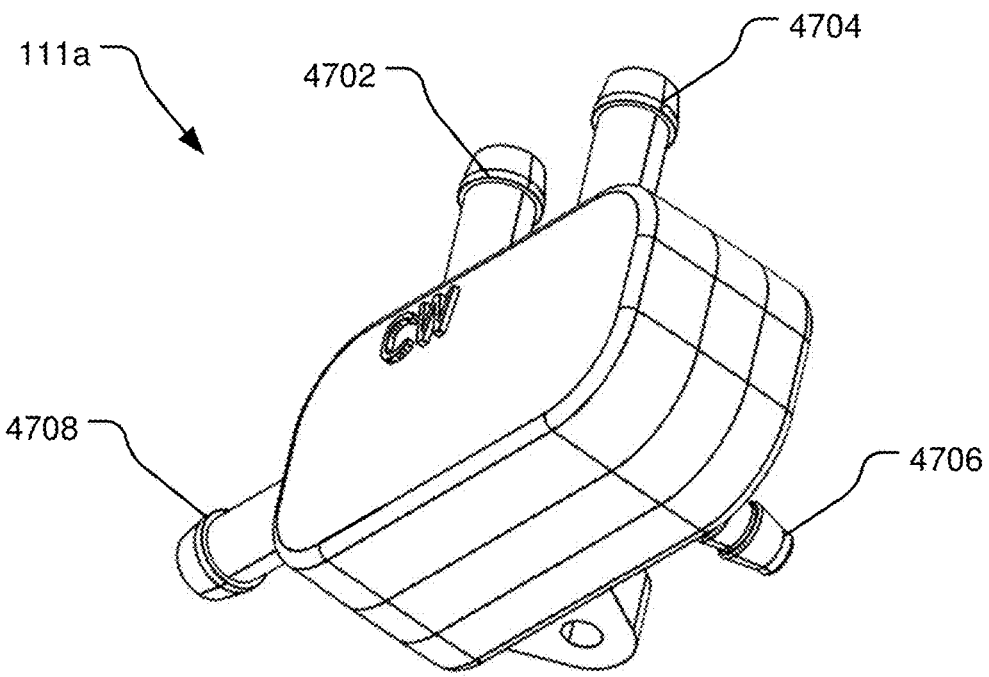
FIG. 47 is a top perspective view of the mixing valve of the extraction cleaner shown in FIG. 2.

The mixing valve 111a may be provided in a variety of configurations. One example of a mixing valve 111a useful in embodiments consistent with the present disclosure is illustrated in FIG. 47. The mixing valve 111a includes a first mixing valve inlet 4702, a second mixing valve inlet 4704, a first mixing valve outlet 4706, and a second mixing valve outlet 4708. The mixing valve 111a is configured to receive a first cleaning fluid at the first mixing valve inlet 4702 and a second fluid at the second mixing valve inlet 4704 and provide a mixture of the first and second cleaning fluids at the first mixing valve outlet 4706 and only the first cleaning fluid at the second mixing valve outlet 4708.

For example, in some embodiments the first mixing valve inlet 4702 is fluidly coupled to the supply tank 106a, the second mixing valve inlet 4704 is fluidly coupled to the additive tank 107a, the first mixing valve outlet 4706 is coupled to the second input port 4514 of the fluid changeover valve 123a and the second mixing valve outlet 4708 is coupled to the first inlet port 4512 of the fluid changeover valve 123a. When a cleaning fluid is supplied from both the supply tank 106a and the additive tank 107a, the cleaning fluid from the supply tank 106a is provided at the second mixing valve outlet 4708 and fluidly coupled to the first inlet port 4512 of the fluid changeover valve 123a, and a mixture of the cleaning fluid from the supply tank 106a and the cleaning fluid from the additive tank 107a is provided at the first mixing valve outlet 4706 and fluidly coupled to the second inlet port 4514 of the fluid changeover valve 123a. With this configuration, the fluid changeover valve 123a supplies the first cleaning fluid from the supply tank 106a to the base 104a when in a base supply state and supplies a mixture of the first cleaning fluid from the supply tank 106a and the second cleaning fluid from the additive tank 107a to the cleaning tool 105a when in a cleaning tool supply state, and a single pump 125a is used to pump the fluid to the base 104a and the cleaning tool 105a.

Figure 48:
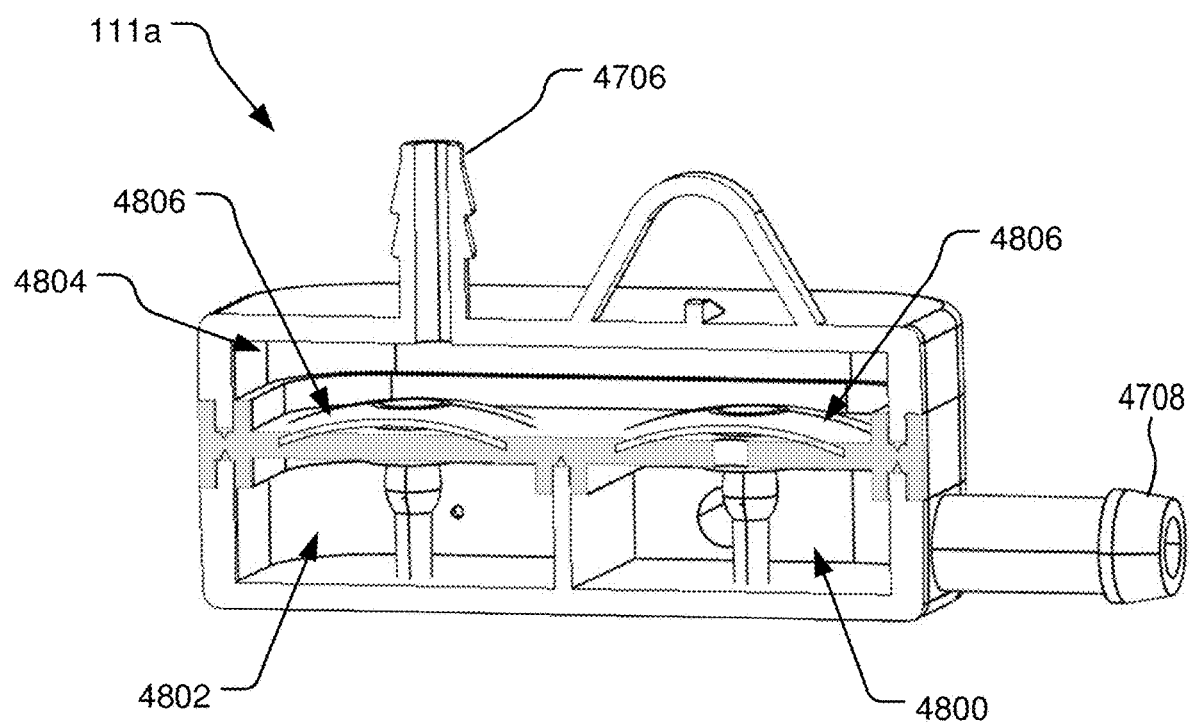
FIG. 48 is a side sectional view of the mixing valve shown in FIG. 47.
Figure 49:
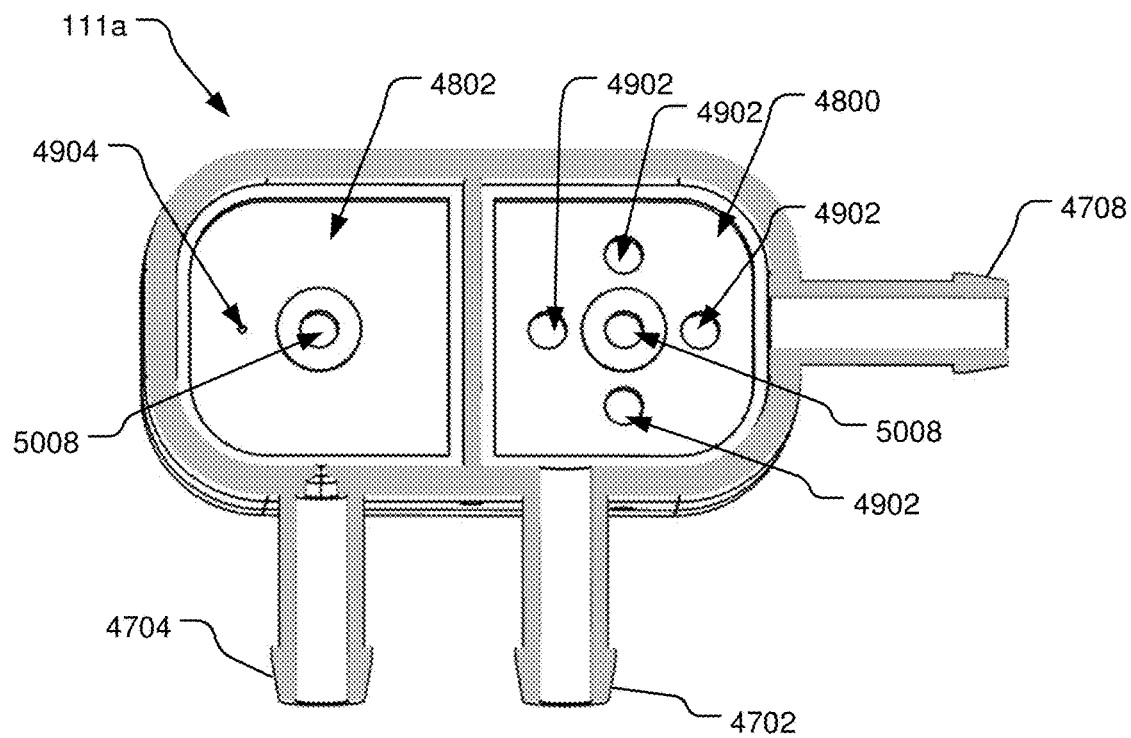
FIG. 49 is a top sectional view of the mixing valve shown in FIG. 47.
Figure 50:
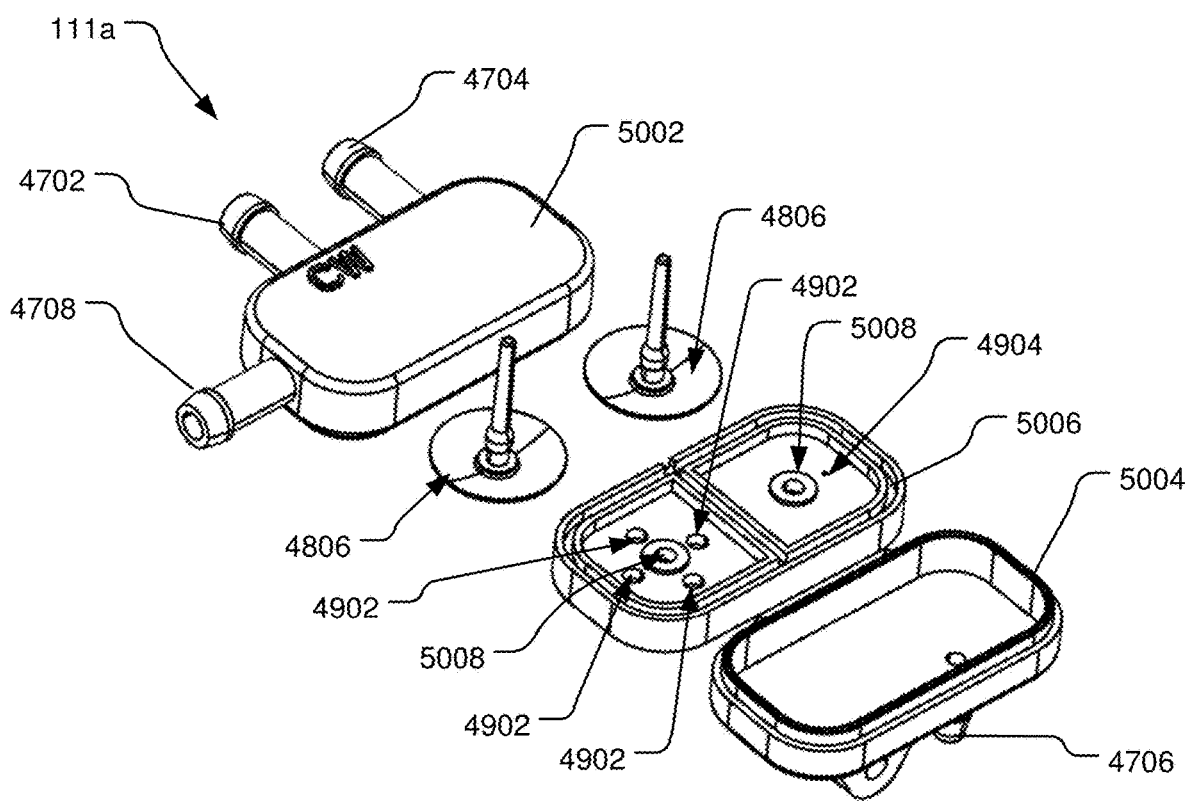
FIG. 50 is an exploded view of the mixing valve shown in FIG. 47.

FIG. 48 shows a cross-sectional view of the mixing valve 111a. As shown, the mixing valve 111a includes a first cavity 4800 corresponding to the first mixing valve inlet 4702 (FIG. 14) and fluidly coupled to the second mixing valve outlet 4708, a second cavity 4802 corresponding to the second mixing valve inlet 4704, and a mixing cavity 4804 fluidly coupled to the first and second cavities 4800 and 4802 and fluidly coupled to the first mixing valve outlet 4706. With reference also to the sectional view of FIG. 49, the first cavity 4800 includes one or more first cavity ports 4902 fluidly coupling the first cavity 4800 to the mixing cavity 4804 and the second cavity includes one or more second cavity ports 4904 fluidly coupling the second cavity 4802 to the mixing cavity 4804.

As shown, the mixing valve 111a includes a plurality of umbrella valves 4806, each umbrella valve 4806 corresponding to a respective one of the first or second cavity 4800 or 4802. The umbrella valves 4806 are configured to function as one-way valves that substantially prevent cleaning fluid within the mixing cavity 4804 from flowing back into the first and/or second cavities 4800 and/or 4802. In addition to, or in the alternative to, the umbrella valves 4806 one or more non-return valves may be fluidly coupled to the first and/or second mixing valve inlets 4702 and/or 4704. In addition to, or in the alternative to, the mixing valve 111a the first and second cleaning fluids may be mixed using a venturi coupling or valve, a T-coupling or valve, and/or a Y-coupling or valve. In these embodiments, one or more non-return valves may be fluidly coupled between the valve or coupling and a respective one of the supply tank 106a and/or the additive tank 107a.

FIG. 16A shows a perspective exploded view of the mixing valve 111a. As shown, the mixing valve 111a includes a top cover 5002, a bottom cover 5004, and an intermediary plate 5006. The top cover 5002 defines the first and second cavities 4800 and 4802 and the bottom cover defines the mixing cavity 4804. The intermediary plate 5006 includes the first and second cavity ports 4902 and 4904 and valve mounting openings 5008 for coupling to the umbrella valves 4806. As shown, the intermediary plate 5006 includes four first cavity ports 4902 and one second cavity port 4904. A diameter of the first cavity ports 4902 may be, for example, between two and four times greater than a diameter of the second cavity ports 4904. By way of further example, a diameter of the first cavity ports 4902 may be 3.125 times greater than a diameter of the second cavity ports 4904. By way of still further example, a diameter of the first cavity ports 4902 may be about (e.g., within 1% of, 5% of, or 10% of) 2.5 millimeters (mm) and a diameter of the second cavity ports may be about 0.8 mm.

The quantity and size of the first and second cavity ports 4902 and 4904 may be based, at least in part, on a desired mixing ratio of the first fluid to the second fluid. For example, the mixing ratio of the first cleaning fluid to the second cleaning fluid may be in a range of 5:1 to 15:1. By way of further example, the mixing ratio of the first cleaning fluid to the second cleaning fluid may be in a range of 9:1 to 11:1. By way of still further example, the mixing ratio of the first cleaning fluid to the second cleaning fluid may be 10:1.

An extraction cleaner consistent with the present disclosure may be provided in a variety of configurations to allow a user to selectively control supply of the first and/or second cleaning fluid (and/or a ratio of the first and second cleaning fluids) to the base 104a and/or the cleaning tool 105a. For example, the second cleaning fluid from the additive tank 107a may be provided, e.g., alone or in a mixture with the first cleaning fluid from the supply tank 106a, only to the cleaning tool 105a, and not to the base 104a. This can allow a user to clean the target area using the second cleaning fluid, with or without a boost fluid, while avoiding waste of the second cleaning fluid and/or potential damage to the surface to be cleaned 110 and surrounding surfaces or objects that may be caused by distribution of the second cleaning fluid from the base 104a.

Figure 51:
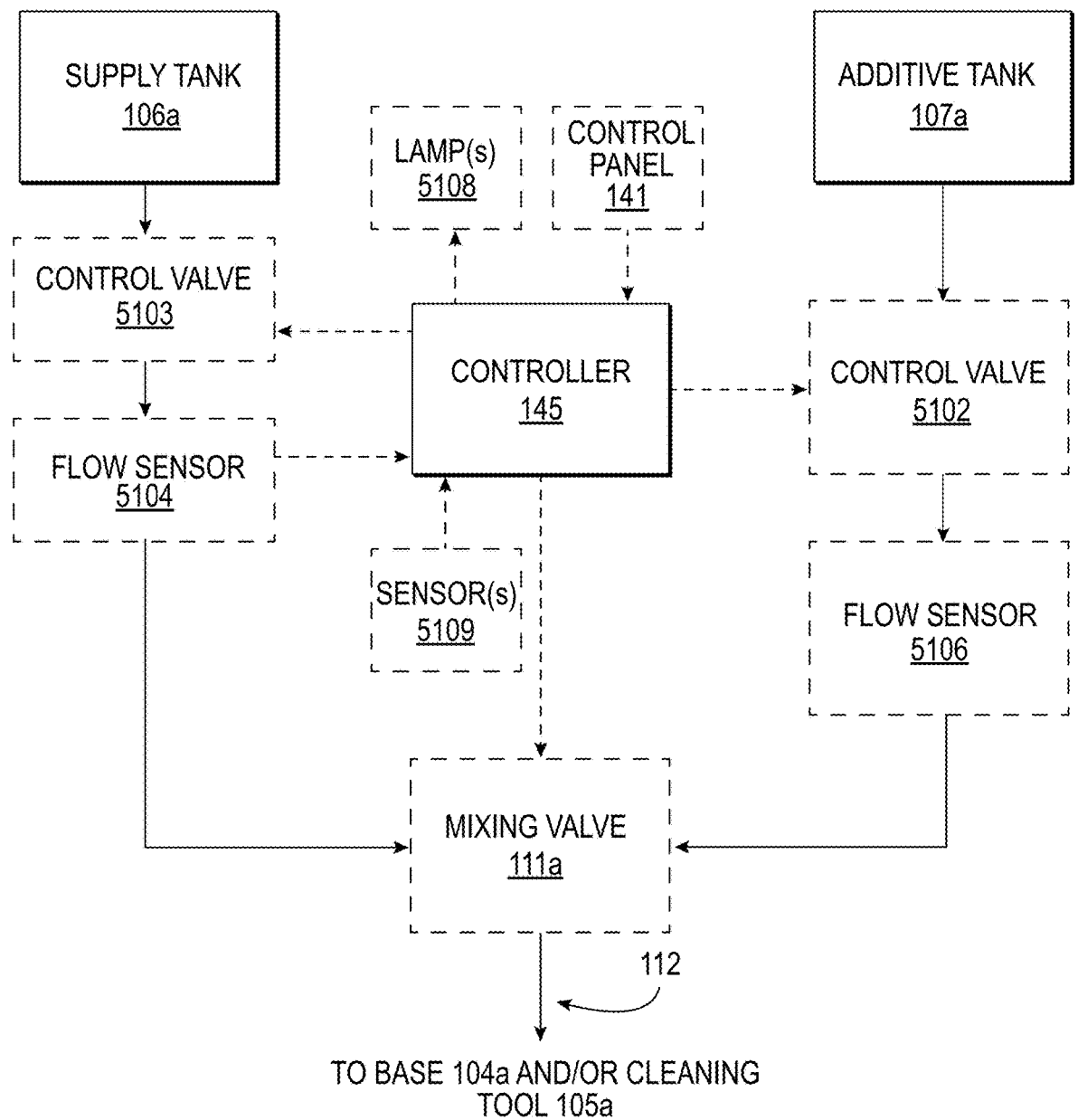
FIG. 51 is block diagram illustrating a portion of an example extraction cleaner consistent with the present disclosure.

In some embodiments, as illustrated for example in FIG. 51, a control valve 5102 may be fluidly coupled to the additive tank 107a, e.g., at the output of the additive tank 107a, to allow a user to selectively deliver the second cleaning fluid from the additive tank 107a, e.g., alone or in a mixture with the first cleaning fluid from the supply tank 106a. For example, the user may manipulate an input, e.g., a mechanical or graphical user interface (GUI) button on a control panel 141 to control, directly or through the controller 145, the control valve 5102 to control delivery of the second cleaning fluid from the additive tank 107a to the base 104a and/or cleaning tool 105a through a mixing valve 111a and/or one or more supply line(s) 112. In some embodiments, the controller 145 may implement a timer to automatically control the control valve 5102 to discontinue delivery of the second cleaning fluid from the additive tank 107 after a predetermined amount of time, e.g., 20 seconds. This can avoid unintended use of the second cleaning fluid after a user has initiated use through the input on the control panel 141.

In some embodiments, a control valve 5103 may be fluidly coupled to the supply tank 106a, e.g., at the output of the additive tank 106a, to allow a user to selectively deliver the first cleaning fluid from the supply tank 106a, e.g., alone or in a mixture with the second cleaning fluid from the additive tank 107a. For example, the user may manipulate an input, e.g., a mechanical or graphical user interface (GUI) button on a control panel 141 to control, directly or through the controller 145, the control valve 5103 to control delivery of the first cleaning fluid from the supply tank 106a to the base 104a and/or cleaning tool 105a through a mixing valve 111a and/or one or more supply line(s) 112.

In some embodiments, delivery of the first cleaning fluid from the supply tank 106a and/or the second cleaning fluid from the additive tank 107a may be controlled in response to one or more sensor(s) 5109 that provide one or more control outputs to the controller 145. The controller 145 may control state of the control valve 5102 and/or the control valve 5103 in response to the control output(s) from the sensor(s) 5109. For example, sensor(s) 5109 may include a known surface-type detection sensor coupled to the base 104a and/or the cleaning tool 105a for providing a different control output associated with each of a plurality of different floor types, e.g., hard floor, carpet and/or different types of hard floors or carpets, over which the cleaner 100a is positioned. The controller 145 may be configured to control the control valve 5102, the control valve 5103 and/or the mixing valve 111a to deliver the first cleaning fluid, the second cleaning fluid and/or a desired mixture of the first and second cleaning fluids to the base 104a or the cleaning tool 105a depending on the floor type detected by the surface-type sensor. In some embodiments, for example, the controller 145 may control the control valve 5102, the control valve 5103 and/or the mixing valve 111a to deliver only the first cleaning fluid to the base 104a and/or the cleaning tool 105a when the surface-type detection sensor provides a first output to the controller 145 indicating the base 104a or the cleaning tool 105a is positioned over a hard floor, and to deliver a desired mixture of the first and second cleaning fluids when the surface-type detection sensor provides a second output to the controller 145 indicating the base 104*a* or the cleaning tool 105*a* is positioned over a carpet.

In some embodiments, the sensor(s) 5109 may include a known turbidity and/or debris sensor coupled to the cleaner 100*a* for detecting an amount of debris in the recovered fluid drawn into the recovery tank from the base 104*a* and/or the cleaning tool 105*a*. The controller 145 may be configured to control the control valve 5102, the control valve 5103 and/or the mixing valve 111*a* to deliver the first cleaning fluid, the second cleaning fluid and/or a desired mixture of the first and second cleaning fluids to the base 104*a* or the cleaning tool 105*a* depending on the amount of debris in the recovered fluid as detected by the turbidity and/or debris sensor. In some embodiments, for example, the controller 145 may control the control valve 5102, the control valve 5103 and/or the mixing valve 111*a* to deliver only the first cleaning fluid to the base 104*a* and/or the cleaning tool 105*a* when the turbidity and/or debris sensor provides a first output to the controller 145 indicating the amount of debris in the recovered fluid is at a relatively low level, and to deliver a desired mixture of the first and second cleaning fluids when the turbidity and/or debris sensor provides a second output to the controller indicating the amount of debris in the recovered fluid is at a relatively high level. With this configuration, fluid from the additive tank 107*a*, e.g., the boost fluid, may be automatically delivered to the base 104*a* and/or cleaning tool 105*a*, when the base 104*a* and/or the cleaning tool 105*a* are cleaning a particularly soiled area, and then delivery of the boost fluid may be automatically discontinued when the base 104*a* and/or the cleaning tool 105*a* are not cleaning a particularly soiled area.

A variety of other configurations may be provided in an extraction cleaner for controlling supply of the first and/or second cleaning fluid to the base 104*a* and/or the cleaning tool 105*a*. For example, any number of mixing valves may be provided in combination with associated control valves to allow a user to selectively supply a desired fluid combination, e.g., first cleaning fluid only, second cleaning fluid only and/or a desired mixture/ratio of the first and second cleaning fluids, to the base 104*a* and/or the cleaning tool 105*a*. Also, in some embodiments the mixing valve 111*a* may be omitted and a desired mixture of the first and second cleaning fluids may be achieved using one or more fittings, such as a known t-connector.

In some embodiments where a mixture of the first cleaning fluid from the supply tank 106*a* and the second cleaning fluid from the additive tank 107*a* are supplied to the base 104*a* and/or the cleaning tool 105*a*, a known flow sensor 5104 may be provided at the output of the supply tank 106*a*. The flow sensor 5104 may provide an output to the controller 145 indicating that a flow of the first cleaning fluid from the supply tank 106*a* has been interrupted. In response, the controller may control a control valve 5102 fluidly coupled to the additive tank 107*a*, e.g., at the output of the additive tank 107*a* to discontinue flow of the second cleaning fluid from the additive tank 107 and/or control a mixing valve 111*a* fluidly coupled to the additive tank 107*a* to discontinue flow of the additive fluid from the mixing valve. This can avoid delivery of the second cleaning fluid from the additive tank 107*a* to the base 104*a* or the cleaning tool 105*a* alone, i.e., without mixing with the first cleaning fluid from the supply tank 106*a*. This can prevent damage to the surface to be cleaned 110 or a target surface caused by application of only the second cleaning fluid from the additive tank 107*a*.

In some embodiments, an extraction cleaner consistent with the present disclosure may provide a visual indictor that the second cleaning fluid from the additive tank 107*a* is being supplied to the base 104*a* or the cleaning tool 105*a*. For example, a known flow sensor 5106 may be provided at the output of the additive tank 107*a* and one or more lamp(s) 5108, such as an LED lamp, may be illuminated by the controller 145 in response to an output of the flow sensor 5106 when the second cleaning fluid is being delivered from the additive tank 107*a*. In some embodiments, the second cleaning fluid from the additive tank 107*a* and the first cleaning fluid from the supply tank 106*a* may include components that, when mixed, produce a distinct color. For example, the first cleaning fluid may have a yellow color and the second cleaning fluid may have a blue color. When both the first and second cleaning fluids are delivered to the surface to be cleaned 110 or the target surface, the mixture of the first and second cleaning fluids produces a mixed cleaning fluid having a green color indicating both fluids have been applied.

Thus, according to one aspect of the present disclosure there is provided an extraction cleaner including a base, an upright body pivotally coupled to the base; an agitator disposed in the agitator cavity of the base and configured for agitating the surface to be cleaned; a supply tank for storing the cleaning fluid; and a recovery tank configured for receiving recovered fluid extracted from the surface to be cleaned by suction established at the suction inlet.

According to another aspect of the present disclosure, the base may include a frame, a door coupled to the frame, a suction nozzle coupled to the base and at least one fluid dispensing nozzle. According to another aspect, the door may be non-removably coupled to the frame and the suction nozzle may be removably coupled to the base. According to another aspect, the door may include a top surface and a bottom surface, the bottom surface of the door defining at least a portion of an agitator cavity, and the at least one fluid dispensing nozzle may be coupled to the door and exposed at a bottom surface of the door, the at least one fluid dispensing nozzle being configured for distributing cleaning fluid directly or indirectly onto a surface to be cleaned. According to another aspect, the suction nozzle may have a front wall, a rear wall, and a suction nozzle pathway defined between the front wall and the rear wall, the rear wall being positioned in opposed facing relationship to the top surface of the door, the suction nozzle pathway having a suction inlet configured to be disposed adjacent the surface to be cleaned and a suction outlet configured for removably coupling to an internal suction conduit of the base to at least in part define a base airflow path extending from the suction inlet and through the base.

According to another aspect of the present disclosure, the door may be pivotally coupled to the frame to pivot between a closed position wherein the agitator is inaccessible from a top of the base and an open position wherein the agitator is accessible from a top of the base. According to another aspect, the door may be pivotally coupled to the frame by a first pivot pin and a second pivot pin, the first and second pivot pins extending outwardly from opposite side surfaces of the door and into associated sides of the frame. According to another aspect of the present disclosure, the bottom surface of the door defines a front wall and at least a portion of a top wall of the agitator cavity.

According to another aspect of the present disclosure, the base may further include at least one inlet port extending through an associated opening in the door, the inlet port being fluidly coupled to a base supply line below the bottom surface of the door and being fluidly coupled to a supply tube above a top surface of the door, the supply tube being fluidly coupled to the at least one fluid dispensing nozzle.

According to another aspect of the present disclosure, the door may be pivotally coupled to the frame to pivot between a closed position wherein the agitator is inaccessible from a top of the base and an open position wherein the agitator is accessible from a top of the base, and the inlet port is removably fluidly coupled to the base supply line whereby the inlet port fluidly couples to the base supply line when the door is moved to the closed position and decouples from the base supply line when the door is moved to the open position.

According to another aspect of the disclosure, the base further includes at least one cover disposed on the top surface of the door and disposed over at least a portion of the fluid dispensing nozzle, the supply tube, and the inlet port.

According to another aspect of the disclosure, the door includes an opening therein and the base airflow path extends from the suction inlet and through the opening.

According to another aspect of the disclosure, the at least one fluid dispensing nozzle includes a first fluid dispensing nozzle and a second fluid dispensing nozzle, and the base further includes a first inlet port and a second inlet port, the first and second inlet ports each being fluidly coupled to the base supply line below a bottom surface of the door, the first inlet port being fluidly coupled to a first supply tube above a top surface of the door and the second inlet port being fluidly coupled to a second supply tube above a top surface of the door, the first and second supply tubes being fluidly coupled to the first and second fluid dispensing nozzles, respectively.

According to another aspect of the disclosure, the base further includes: a first cover disposed on the top surface of the door and disposed over at least a portion of the first fluid dispensing nozzle, the first supply tube, and the first inlet port; and a second cover disposed on the top surface of the door and disposed over at least a portion of the second fluid dispensing nozzle, the second supply tube, and the second inlet port.

According to another aspect of the disclosure, a portion of the suction nozzle is received in a cavity defined by the top surface of the door, a side surface of the first cover, and a side surface of the second cover.

According to another aspect of the disclosure, the at least one fluid dispensing nozzle is configured to distribute the cleaning fluid forward of the agitator and onto the surface to be cleaned in a spray pattern.

According to another aspect of the disclosure, the at least one fluid dispensing nozzle is positioned such that the cleaning fluid distributed from the at least one fluid dispensing nozzle impacts the surface to be cleaned at a location within 1 cm from the rear wall of the suction nozzle.

According to another aspect of the disclosure, the at least one fluid dispensing nozzle includes a first fluid dispensing nozzle and a second fluid dispensing nozzle, the first fluid dispensing nozzle is configured to distribute the cleaning fluid forward of the agitator and onto the surface to be cleaned in a first spray pattern and the second fluid dispensing nozzle is configured to distribute the cleaning fluid forward of the agitator and onto the surface to be cleaned in a second spray pattern, wherein the first spray pattern and the second spray pattern overlap at a location between the first and second fluid dispensing nozzles.

According to another aspect of the disclosure, the suction outlet is oriented downward relative to a top surface of the suction nozzle for removably coupling to the internal suction conduit.

According to another aspect of the disclosure, a connector end of the suction nozzle disposed adjacent the upright portion is configured for removably coupling to the base. According to another aspect of the disclosure, the connector end includes a spring-biased connector for removably coupling to the base.

According to another aspect of the disclosure, the suction nozzle is configured for removably coupling to the base adjacent a front end of the suction nozzle. According to another aspect of the disclosure, the suction nozzle includes first and second toe-in features adjacent a front end of the suction nozzle and configured for removably coupling to first and second catches defined by the frame.

According to another aspect of the disclosure, wherein the rear wall of the suction nozzle does not form any part of the agitator cavity.

According to another aspect of the disclosure, the base further include an auto-spray detector, the auto-spray detector being responsive to movement of the base and configured to cause distribution of the cleaning fluid from the at least one fluid dispensing nozzle when the base is moved in forward direction. In some embodiments, the cleaning fluid may be distributed at a first flow rate when the base is moved in a forward direction and at a second, non-zero, flow rate when the base is moved in rearward direction.

According to another aspect of the disclosure, the base may include an auto-spray detector, the auto-spray detector being responsive to movement of the base and configured to cause distribution of the cleaning fluid from the at least one fluid dispensing nozzle when the base is moved in a forward direction, wherein the auto-spray detector includes a detector body pivotally coupled to the frame, a floor contacting member extending downward from a bottom of the detector body at a non-zero angle relative to a vertical axis of the detector body for contacting the surface to be cleaned, an extension extending outwardly from a side surface of the detector body, and a hammer disposed at a distal end of the extension, the hammer being configured for contacting a switch arm of a switch upon rotation of the detector body for changing a state of the switch, and wherein the cleaning fluid is distributed from the at least one fluid dispensing nozzle in response to the state of the switch.

According to another aspect of the disclosure, the supply tank includes a receptacle and the extractor further includes an additive tank for storing a second cleaning fluid, at least a portion of the additive tank being removably received in the receptacle.

According to another aspect of the disclosure, the upright portion defines a support and wherein a bottom of the recovery tank is removably supported on the support with an outer perimeter of the recovery tank overhanging the support. According to another aspect of the disclosure, the support defines a retaining wall at a front thereof, and wherein the bottom of the recovery tank has a projection extending therefrom for engaging the retaining wall.

According to another aspect of the disclosure, the recovery tank includes a tank body and a cover, the tank body including a recovery conduit and configured to retain the recovered fluid; the cover having an outlet fluidly coupled to a suction motor, the suction motor generating suction airflow through the recovery tank, the cover further including a float having a buoyant member configured to float on the recovered fluid and a valve member configured to block the suction airflow when the recovered fluid reaches a full level, the buoyant member having a flat side surface disposed on only one side of the recovery conduit.

According to another aspect of the disclosure, the float further includes an arm and wherein the buoyant member is disposed at the first end of the arm and the valve member is disposed at the second end of the arm, wherein the arm has tabs extending outwardly from opposite sides thereof, the tabs being configured to be received within corresponding slots in an airflow management body of the cover.

According to another aspect of the disclosure, the recovery tank includes a tank body and a cover, the cover having an outlet fluidly coupled to a suction motor, the suction motor generating suction airflow through the recovery tank, and wherein the recovery tank further includes a foam filter disposed in a shield and defining an inlet, and wherein the suction airflow passes through the inlet. According to another aspect of the disclosure, a bottom portion of the shield is angled inwardly toward the inlet.

According to another aspect of the disclosure, the recovery tank includes a tank body and a cover, the tank body including a recovery conduit and configured to retain the recovered fluid, the cover having an outlet fluidly coupled to a suction motor, the suction motor generating suction airflow through the recovery tank, the cover including an airflow management body including flanges extending outwardly therefrom and toward the side walls of the tank body, the flanges configured to direct the suction airflow from a top of the recovery conduit downwardly toward a bottom of the tank body.

According to another aspect of the disclosure, the extraction cleaner further includes: a flexible hose; a cleaning tool coupled to the flexible hose and having a suction inlet, wherein a cleaning tool airflow path extends from the suction inlet and through the flexible hose; and at least one cleaning tool fluid dispensing nozzle coupled to the cleaning tool.

According to another aspect of the disclosure, the extraction cleaner further includes a suction changeover valve, the suction changeover valve including: a base inlet port fluidly coupled to the base airflow path; a cleaning tool inlet port fluidly coupled to the cleaning tool airflow path; and an outlet port fluidly coupled to the recovery tank, the suction changeover valve having a base suction state wherein the outlet port is fluidly coupled to the base inlet port for receiving the recovered fluid from the surface to be cleaned through the base airflow path and into the recovery tank and a cleaning tool suction state wherein the outlet port is fluidly coupled to the cleaning tool inlet port for receiving the recovered fluid from the target surface through the cleaning tool inlet port and into the recovery tank.

According to another aspect of the disclosure, the suction changeover valve includes: a housing defining the base inlet port, the cleaning tool inlet port, the outlet port, and a rotor cavity; and a rotor rotatably disposed in the rotor cavity and including a plug, the rotor being rotatable between a first orientation wherein the suction changeover valve is in the base suction state and the plug blocks fluid communication between the outlet port and the cleaning tool inlet port and a second orientation wherein the suction changeover valve is in the cleaning tool suction state and the plug blocks fluid communication between the outlet port and the base inlet port. According to another aspect of the disclosure, the rotor includes a handle extending outwardly from the rotor and configured to manipulated by a user for moving the rotor between the first orientation and the second orientation.

According to another aspect of the disclosure, the extraction cleaner further includes a fluid changeover valve, the fluid changeover valve fluid changeover valve having a base supply state wherein the cleaning fluid is fluidly coupled to the base supply line and a cleaning tool supply state wherein a second cleaning fluid is fluidly coupled to the cleaning tool supply line, and wherein the fluid changeover valve is coupled to the suction change over valve, whereby when the suction changeover valve is placed in the base suction state the fluid changeover valve is placed in the base supply state and when the section changeover valve is placed in the cleaning tool suction state the fluid changeover valve is placed in the cleaning tool supply state.

According to another aspect of the disclosure, the suction changeover valve is coupled to the fluid changeover valve through a connecting rod, the connecting rod having at least one valve engagement surface for contacting at least one valve member to move the fluid changeover valve to the base supply state or the cleaning tool supply state.

According to another aspect of the disclosure, the suction changeover valve includes a cam configured to cause linear movement of a cam follower, and wherein the connecting rod is coupled to the cam follower.

According to another aspect of the disclosure, the extraction cleaner further includes a fluid changeover valve, the fluid changeover valve having a base supply state wherein the cleaning fluid is fluidly coupled to a base supply line coupled to the at least one fluid dispensing nozzle of the base and a cleaning tool supply state wherein a second cleaning fluid is fluidly coupled to a cleaning tool supply line fluidly coupled to the at least one cleaning tool fluid dispensing nozzle. According to another aspect of the disclosure, wherein the cleaning fluid is different from the second cleaning fluid.

According to another aspect of the disclosure, the fluid changeover valve includes a first fluid input port, a second fluid input port, a pump output port, a pump input port, a base output port and a cleaning tool output port, the first fluid input port being fluidly coupled for receiving the cleaning fluid and the second fluid input port being fluidly coupled for receiving the second cleaning fluid, the pump output port being coupled to an inlet port of a pump, the pump input port being fluidly coupled to an outlet of the pump, the base output port being fluidly coupled to the base supply line and the cleaning tool output port being fluidly coupled to the cleaning tool supply line.

According to another aspect of the disclosure, the fluid changeover valve includes at least one valve member, wherein when the fluid changeover valve is in the base supply state the at least one valve member fluidly couples the first fluid input port to the pump output port and the pump input port to the base output port, and blocks fluid communication from the second fluid input port to the pump output port and fluid communication from the pump input port to the cleaning tool output port, and when the fluid changeover valve is in the cleaning tool supply state, the at least one valve member fluidly couples the second fluid input port to the pump output port and the pump input port to the cleaning tool output port, and blocks fluid communication from the first fluid input port to the pump output port and fluid communication from the pump input port to the base output port.

According to another aspect of the disclosure, the at least one valve member includes a first valve member disposed in a first chamber and a second valve member disposed in a second chamber, wherein the fluid changeover valve is in the base supply state when the first valve member is in a first position in the first chamber the second valve member is in a first position in the second the second chamber and the fluid changeover valve is in the cleaning tool supply state when the first valve member is in a second position in the first chamber and the second valve member is in a second position in the second chamber.

According to another aspect of the disclosure, the extraction cleaner further includes a mixing valve, the mixing valve having a first mixing valve inlet, a second mixing valve inlet, a first mixing valve outlet and a second mixing valve outlet, the first and second mixing valve inlets and the first mixing valve outlet being fluidly coupled to a mixing cavity, whereby the first fluid received at the first mixing valve inlet and a second fluid received at the second input port are mixed in the mixing cavity and a mixture of the first and second fluids are provided at the first mixing valve outlet, the first mixing valve inlet being fluidly coupled to the second mixing valve outlet for providing a first fluid received at the first mixing valve inlet at the second mixing valve outlet. According to another aspect of the disclosure, the second mixing valve outlet is fluidly coupled to the first fluid input port of the fluid changeover valve and the first mixing valve outlet is fluidly coupled to the second fluid input port of the fluid changeover valve.

According to another aspect of the disclosure, the extraction cleaner further includes: a flexible hose; a cleaning tool coupled to the flexible hose and having a suction inlet, wherein a cleaning tool airflow path extends from the suction inlet and through the flexible hose; at least one cleaning tool fluid dispensing nozzle coupled to the cleaning tool; an additive tank for storing a second cleaning fluid; and a valve fluidly coupled to the additive tank for controlling supply of the second cleaning fluid to the at least one fluid dispensing nozzle or the cleaning tool fluid dispensing nozzle.

According to another aspect of the disclosure, the extraction cleaner further includes a controller configured to control the valve to discontinue supply of the second cleaning fluid to the at least one fluid dispensing nozzle or the cleaning tool fluid dispensing nozzle after a predetermined amount of time.

According to another aspect of the disclosure, the extraction cleaner further includes a flow sensor fluidly coupled to an output of the supply tank and a controller configured to control the valve to discontinue supply of the second cleaning fluid to the at least one fluid dispensing nozzle or the cleaning tool fluid dispensing nozzle in response to an output of the flow sensor.

According to another aspect of the disclosure, the extraction cleaner further includes a flow sensor fluidly coupled to an output of the additive tank and a controller configured to illuminate a lamp in response to an output of the flow sensor to indicate the second cleaning fluid is being delivered from the additive tank.

According to another aspect of the disclosure there is provided an extraction cleaner including: a base; an upright body pivotally coupled to the base; at least one base fluid dispensing nozzle coupled to the base, the at least one base fluid dispensing nozzle being configured for distributing a first fluid directly or indirectly onto a surface to be cleaned; a flexible hose; a cleaning tool coupled to the flexible hose; at least one cleaning tool fluid dispensing nozzle coupled to the cleaning tool, the at least one cleaning tool fluid dispensing nozzle configured for distributing a second fluid directly or indirectly onto a target surface; a supply tank for storing a first cleaning fluid; an additive tank for storing a second cleaning fluid; and at least one fluid changeover valve fluidly coupled to the at least one base fluid dispensing nozzle and the at least one cleaning fluid dispensing nozzle, the at least one fluid changeover valve having a base supply state wherein the first cleaning fluid is fluidly coupled to the at least one base fluid dispensing nozzle and a cleaning tool supply state wherein the second cleaning fluid is fluidly coupled to the at least one cleaning tool fluid dispensing nozzle.

According to another aspect of the disclosure, when the at least one fluid changeover valve is in the base supply state, the second cleaning fluid is not supplied to the at least one base fluid dispensing nozzle.

According to another aspect of the disclosure, when the at least one fluid changeover valve is in the cleaning tool supply state, a mixture of the first cleaning fluid and the second cleaning fluid is supplied to the at least one base fluid dispensing nozzle.

According to another aspect of the disclosure, the second cleaning fluid includes a boost fluid having a first pH mixed with a base cleaning fluid having a second pH, wherein the second pH is greater than the first pH. The first pH may be less than or equal to about 4.5 and the second pH may be greater than or equal to about 9. The boost fluid may include hydrogen peroxide.

According to another aspect of the disclosure, the fluid changeover valve includes a first fluid input port, a second fluid input port, a pump output port, a pump input port, a base output port and a cleaning tool output port, the first fluid input port being fluidly coupled for receiving the first cleaning fluid and the second fluid input port being fluidly coupled for receiving the second cleaning fluid, the pump output port being coupled to an inlet port of a pump, the pump input port being fluidly coupled to an outlet of the pump, the base output port being fluidly coupled to the at least one base fluid dispensing nozzle and the cleaning tool output port being fluidly coupled to the at least one cleaning tool fluid dispensing nozzle.

According to another aspect of the disclosure, the fluid changeover valve includes at least one valve member, wherein when the fluid changeover valve is in the base supply state the at least one valve member fluidly couples the first fluid input port to the pump output port and the pump input port to the base output port, and blocks fluid communication from the second fluid input port to the pump output port and fluid communication from the pump input port to the cleaning tool output port, and when the fluid changeover valve is in the cleaning tool supply state, the at least one valve member fluidly couples the second fluid input port to the pump output port and the pump input port to the cleaning tool output port, and blocks fluid communication from the first fluid input port to the pump output port and fluid communication from the pump input port to the base output port.

According to another aspect of the disclosure, the at least one valve member includes a first valve member disposed in a first chamber and a second valve member disposed in a second chamber, wherein the fluid changeover valve is in the base supply state when the first valve member is in a first position in the first chamber the second valve member is in a first position in the second the second chamber and the fluid changeover valve is in the cleaning tool supply state when the first valve member is in a second position in the first chamber and the second valve member is in a second position in the second chamber.

According to another aspect of the disclosure, the extraction cleaner further includes a mixing valve, the mixing valve having a first mixing valve inlet, a second mixing valve inlet, a first mixing valve outlet and a second mixing valve outlet, the first and second mixing valve inlets and the first mixing valve outlet being fluidly coupled to a mixing cavity, whereby a first fluid received at the first mixing valve inlet and a second fluid received at the second input port are mixed in the mixing cavity and a mixture of the first and second fluids are provided at the first mixing valve outlet, the first mixing valve inlet being fluidly coupled to the second mixing valve outlet for providing the first fluid received at the first mixing valve inlet at the second mixing valve outlet, wherein the second mixing valve outlet is fluidly coupled to the first fluid input port of the fluid changeover valve and the first mixing valve outlet is fluidly coupled to the second fluid input port of the fluid changeover valve.

According to another aspect of the disclosure, the base includes a base suction inlet configured for positioning adjacent the surface to be cleaned, and wherein the cleaning tool includes a cleaning tool suction inlet configured for positioning adjacent the target surface, the extraction cleaner further includes a recovery tank configured for receiving recovered fluid extracted from the surface to be cleaned by suction established at the base suction inlet or from the target surface by suction established at the cleaning tool suction inlet.

According to another aspect of the disclosure, the extraction cleaner further includes a suction changeover valve, the suction changeover valve includes: a base inlet port fluidly coupled to the base suction inlet; a cleaning tool inlet port fluidly coupled to the cleaning tool suction inlet; and an outlet port fluidly coupled to the recovery tank, the suction changeover valve having a base suction state wherein the outlet port is fluidly coupled to the base inlet port for receiving the recovered fluid from the surface to be cleaned through the base suction inlet and into the recovery tank and a cleaning tool suction state wherein the outlet port is fluidly coupled to the cleaning tool suction inlet for receiving the recovered fluid from the target surface through the cleaning tool inlet port and into the recovery tank.

According to another aspect of the disclosure, the suction changeover valve includes: a housing defining the base inlet port, the cleaning tool inlet port, the outlet port, and a rotor cavity; and a rotor rotatably disposed in the rotor cavity and including a plug, the rotor being rotatable between a first orientation wherein the suction changeover valve is in the base suction state and the plug blocks fluid communication between the outlet port and the cleaning tool inlet port and a second orientation wherein the suction changeover valve is in the cleaning tool suction state and the plug blocks fluid communication between the outlet port and the base inlet port.

According to another aspect of the disclosure, the rotor includes a handle extending outwardly from the rotor and configured to manipulated by a user for moving the rotor between the first orientation and the second orientation.

According to another aspect of the disclosure, the suction changeover valve is in the cleaning tool suction state when the upright portion is in an upright position and automatically transitions to the base suction state when the upright portion is reclined from the upright position.

According to another aspect of the disclosure, the fluid changeover valve is coupled to the suction change over valve whereby when the suction changeover valve is placed in the base suction state the fluid changeover valve is placed in the base supply state and when the section changeover valve is placed in the cleaning tool suction state the fluid changeover valve is placed in the cleaning tool supply state.

According to another aspect of the disclosure, the suction changeover valve is coupled to the fluid changeover valve through a connecting rod, the connecting rod having at least one valve engagement surface for contacting at least one valve member to move the fluid changeover valve to the base supply state or the cleaning tool supply state.

According to another aspect of the disclosure, the suction changeover valve includes a cam configured to cause linear movement of a cam follower, and wherein the connecting rod is coupled to the cam follower.

According to another aspect of the disclosure there is provided an extraction cleaner including: a base; an upright body pivotally coupled to the base; at least one base fluid dispensing nozzle coupled to the base, the at least one base fluid dispensing nozzle being configured for distributing a first fluid directly or indirectly onto a surface to be cleaned; a base suction inlet disposed at a bottom of the base and configured for positioning adjacent the surface to be cleaned; a flexible hose; a cleaning tool coupled to the flexible hose; at least one cleaning tool fluid dispensing nozzle coupled to the cleaning tool, the at least one cleaning tool fluid dispensing nozzle configured for distributing a second fluid directly or indirectly onto a target surface; a cleaning tool suction inlet disposed at a bottom of the cleaning tool and configured for positioning adjacent the target surface; a recovery tank configured for receiving recovered fluid extracted from the surface to be cleaned by suction established at the base suction inlet suction inlet or from the target surface by suction established at the cleaning tool suction inlet; a suction changeover valve, the suction changeover valve including: a base inlet port fluidly coupled to the base suction inlet, a cleaning tool inlet port fluidly coupled to the cleaning tool suction inlet, and an outlet port fluidly coupled to the recovery tank, the suction changeover valve having a base suction state wherein the outlet port is fluidly coupled to the base inlet port for receiving the recovered fluid from the surface to be cleaned through the base suction inlet and into the recovery tank and a cleaning tool suction state wherein the outlet port is fluidly coupled to the cleaning tool suction inlet for receiving the recovered fluid from the target surface through the cleaning tool inlet port and into the recovery tank; a supply tank for storing a first cleaning fluid; an additive tank for storing a second cleaning fluid; and at least one fluid changeover valve, the at least one fluid changeover valve having a base supply state wherein the first cleaning fluid is fluidly coupled to the at least one base fluid dispensing nozzle and a cleaning tool supply state wherein the second cleaning fluid is fluidly coupled to the at least one cleaning tool fluid dispensing nozzle.

According to another aspect of the disclosure there is provided a method of operating an extraction cleaner including a base portion pivotally coupled to an upright body and a cleaning tool coupled to a flexible hose, the method including: fluidly coupling a first cleaning fluid stored in a supply tank to at least one base fluid dispensing nozzle coupled to the base for distributing the first cleaning fluid directly or indirectly onto a surface to be cleaned; and fluidly coupling a second cleaning fluid stored an additive tank to at least one cleaning tool fluid dispensing nozzle coupled to the cleaning tool for distributing the second cleaning fluid directly or indirectly onto a target surface, wherein the second cleaning fluid is not supplied to the at least one base fluid dispensing nozzle when the first cleaning fluid is supplied to the at least one base fluid dispensing nozzle.

According to another aspect of the disclosure there is provided a method for cleaning carpet or fabric, including the steps of providing an aqueous based cleaning solution and an aqueous based oxidizing solution wherein the aqueous based cleaning solution is at a pH of >7.0 and comprises water, metal chelating agent, and a source of carbonate anion ($CO_3^{2-}$) and the aqueous based oxidizing solution is at a pH of <7.0 and comprises water and a peroxygen compound. A free-radical scavenger is present in the aqueous based cleaning solution and/or the aqueous based oxidizing solution. This is followed by mixing and dispensing the aqueous based cleaning solution with the aqueous based oxidizing solution on a carpet or fabric. The mixed composition is at a pH of 9.0 to 10.0 and comprises water, peroxygen compound at a molar concentration of $5.0 \times 10^{-2}$ to $2.1 \times 10^{-1}$, metal chelating agent at a molar concentration of $1.70 \times 10^{-3}$ to $5.2 \times 10^{-3}$, carbonate anion ($CO_3^{2-}$) at a molar concentration of $1 \times 10^{-2}$ to $5.0 \times 10^{-2}$ and free-radical scavenger at a molar concentration of $2.0 \times 10^{-3}$ to $1.1 \times 10^{-1}$.

According to another aspect of the disclosure, there is provided a kit for cleaning carpet or fabric including a first aqueous based cleaning solution at a pH of >7.0 comprising water, metal chelating agent, and a water soluble source of carbonate anion ($CO_3^{2-}$) and a second aqueous based oxidizing solution at a pH of <7.0 comprising water and a peroxygen compound. A free-radical scavenger is present in the aqueous based cleaning solution and/or the aqueous based oxidizing solution. The first and second aqueous solutions are configured to be combined and provide an aqueous based carpet or fabric cleaning composition, comprising water, peroxygen compound at a molar concentration of $5.0 \times 10^{-2}$ to $2.1 \times 10^{-1}$, metal chelating agent at a molar concentration of $1.70 \times 10^{-3}$ to $5.2 \times 10^{-3}$, carbonate anion ($CO_3^{2-}$) at a molar concentration of $1 \times 10^{-2}$ to $5.0 \times 10^{-2}$, free-radical scavenger at a molar concentration of $2.0 \times 10^{-3}$ to $1.1 \times 10^{-1}$, wherein the aqueous based carpet or fabric cleaning composition has a pH of 9.0 to 10.0.

According to another aspect of the disclosure there is provided an extraction cleaner including a cleaner body including a pump and a suction motor, a flexible hose including a fluid delivery pathway fluidly coupled to the pump and a recovery pathway fluidly coupled to the suction motor, a supply tank configured to be removably coupled to the cleaner body and being configured to be fluidly coupled to the fluid delivery pathway, the supply tank including a relatively basic first aqueous based cleaning solution, an additive tank configured to be fluidly coupled to the fluid delivery pathway, the additive tank including a relatively acidic second aqueous based oxidizing solution, a recovery tank configured to be removably coupled to the cleaner body and configured to be fluidly coupled to the recovery pathway, and a cleaning tool configured to be fluidly coupled to the supply tank, the additive tank, and the recovery tank.

According to another aspect of the disclosure, there is provided an extraction cleaner including a cleaner body including a pump and a suction motor; a supply line fluidly coupled to the pump and an airflow path fluidly coupled to the suction motor; a supply tank configured to be removably coupled to the cleaner body and being configured to be fluidly coupled to the supply line, the supply tank including a relatively basic first aqueous based cleaning solution; an additive tank configured to be fluidly coupled to the supply line, the additive tank including a relatively acidic second aqueous based oxidizing solution; and a recovery tank configured to be removably coupled to the cleaner body and configured to be fluidly coupled to the airflow path.

In some instances, the first aqueous based cleaning solution and the second aqueous based oxidizing solution may be mixed prior to application to a surface to be cleaned to form an aqueous based cleaning composition. In some instances, the aqueous based cleaning composition may include water, peroxygen compound at a molar concentration of $5.0 \times 10^{-2}$ to $2.1 \times 10^{-1}$, metal chelating agent at a molar concentration of $1.70 \times 10^{-3}$ to $5.2 \times 10^{-3}$, carbonate anion ($CO_3^{2-}$) at a molar concentration of $1 \times 10^{-2}$ to $5.0 \times 10^{-2}$, free-radical scavenger at a molar concentration of $2.0 \times 10^{-3}$ to $1.1 \times 10^{-1}$ and wherein the composition has a pH of 9.0 to 10.0. In some instances, the peroxygen compound may include hydrogen peroxide. In some instances, the peroxygen compound may include sodium peroxide or urea hydrogen peroxide. In some instances, the peroxygen compound may include an alkyl hydroperoxide or an aryl hydroperoxide. In some instances, the free radical scavenger may be selected from the group consisting of glycine, sarcosine, lysine, serine, glutamic acid, and mixtures thereof. In some instances, the free radical scavenger may be selected from the group consisting of 2-methoxyethylamine, glucosamine, morpholine, piperdine, ethylamine and 3-amino-1-propanol, and mixture thereof. In some instances, the metal chelating agent may have relatively higher binding affinity to transition metals than to calcium and magnesium divalent ions. In some instances, the metal chelating agent may include ethylenediamine-N,N'-disuccinic acid.

According to another aspect of the disclosure, there is provided an aqueous based carpet or fabric cleaning composition including water, peroxygen compound at a molar concentration of $5.0 \times 10^{-2}$ to $2.1 \times 10^{-1}$, metal chelating agent at a molar concentration of $1.70 \times 10^{-3}$ to $5.2 \times 10^{-3}$, carbonate anion ($CO_3^{2-}$) at a molar concentration of $1 \times 10^{-2}$ to $5.0 \times 10^{-2}$, free-radical scavenger at a molar concentration of $2.0 \times 10^{-3}$ to $1.1 \times 10^{-1}$ and wherein the composition has a pH of 9.0 to 10.0.

In some instances, the peroxygen compound may include hydrogen peroxide. In some instances, the peroxygen compound may include sodium peroxide or urea hydrogen peroxide. In some instances, the peroxygen compound may include an alkyl hydroperoxide or an aryl hydroperoxide. In some instances, the free radical scavenger may be selected from the group consisting of glycine, sarcosine, lysine, serine, glutamic acid, and mixtures thereof. In some instances, the free radical scavenger may be selected from the group consisting of 2-methoxyethylamine, glucosamine, morpholine, piperdine, ethylamine and 3-amino-1-propanol, and mixture thereof. In some instances, the metal chelating agent may have relatively higher binding affinity to transition metals than to calcium and magnesium divalent ions. In some instances, the metal chelating agent may include ethylenediamine-N,N'-disuccinic acid.

According to another aspect of the disclosure there is provided a method for cleaning carpet or fabric including the steps of providing an aqueous based cleaning solution and an aqueous based oxidizing solution wherein the aqueous based cleaning solution is at a pH of >7.0 and comprises water, metal chelating agent, and a water soluble source of carbonate anion ($CO_3^{2-}$) and the aqueous based oxidizing solution is at a pH of <7.0 and comprises water and a peroxygen compound, a free-radical scavenger present in the aqueous based cleaning solution and/or the aqueous based oxidizing solution, mixing and dispensing the aqueous based cleaning solution with the aqueous based oxidizing solution on a carpet or fabric, wherein the mixed composition is at a pH of 9.0 to 10.0 and comprises water, peroxygen compound at a molar concentration of $5.0 \times 10^{-2}$ to $2.1 \times 10^{-1}$, metal chelating agent at a molar concentration of $1.70 \times 10^{-3}$ to $5.2 \times 10^{-3}$, carbonate anion ($CO_3^{2-}$) at a molar concentration of $1 \times 10^{-2}$ to $5.0 \times 10^{-2}$, and free-radical scavenger at a molar concentration of $2.0 \times 10^{-3}$ to $1.1 \times 10^{-1}$.

In some instances, the peroxygen compound may include hydrogen peroxide. In some instances, the peroxygen compound may include sodium peroxide, urea hydrogen peroxide, or mixtures thereof. In some instances, the peroxygen compound may include an alkyl hydroperoxide or an aryl hydroperoxide. In some instances, the free radical scavenger may be selected from the group consisting of glycine, sarcosine, lysine, serine, glutamic acid, and mixtures thereof. In some instances, the free radical scavenger may be selected from the group consisting of 2-methoxyethylamine, glucosamine, morpholine, piperdine, ethylamine and 3-amino-1-propanol, and mixture thereof. In some instances, the metal chelating agent may have relatively higher binding affinity to transition metals than to calcium and magnesium divalent ions. In some instances, the metal chelating agent may include ethylenediamine-N,N'-disuccinic acid. In some instances, the water soluble source of carbonate anion may include an alkali metal carbonate or alkali metal bicarbonate. In some instances, the source of carbonate anion may be selected from the group consisting of sodium bicarbonate, potassium bicarbonate, potassium carbonate and sodium carbonate.

According to another aspect of the disclosure, there is provided a kit for cleaning carpet or fabric including a first aqueous based cleaning solution at a pH of >7.0 comprising water, metal chelating agent, and a water soluble source of carbonate anion ($CO_3^{2-}$), a second aqueous based oxidizing solution at a pH of <7.0 comprising water and a peroxygen compound, a free-radical scavenger present in the aqueous based cleaning solution and/or the aqueous based oxidizing solution, wherein the first and second aqueous solutions are configured to be combined and provide an aqueous based carpet or fabric cleaning composition, comprising water, peroxygen compound at a molar concentration of $5.0 \times 10^{-2}$ to $2.1 \times 10^{-1}$, metal chelating agent at a molar concentration of $1.70 \times 10^{-3}$ to $5.2 \times 10^{-3}$, carbonate anion ($CO_3^{2-}$) at a molar concentration of $1 \times 10^{-2}$ to $5.0 \times 10^{-2}$, free-radical scavenger at a molar concentration of $2.0 \times 10^{-3}$ to $1.1 \times 10^{-1}$ and wherein the aqueous based carpet or fabric cleaning composition has a pH of 9.0 to 10.0.

In some instances, the peroxygen compound may include hydrogen peroxide. In some instances, the free radical scavenger may be selected from the group consisting of glycine, sarcosine, lysine, serine, glutamic acid, and mixtures thereof. In some instances, the free radical scavenger may be selected from the group consisting of 2-methoxyethylamine, glucosamine, morpholine, piperdine, ethylamine and 3-amino-1-propanol, and mixture thereof. In some instances, the metal chelating agent may have relatively higher binding affinity to transition metals than to calcium and magnesium divalent ions. In some instances, the metal chelating agent may include ethylenediamine-N,N'-disuccinic acid. In some instances, the water soluble source of carbonate anion may include an alkali metal carbonate or alkali metal bicarbonate.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

It is, therefore, to be understood that the foregoing embodiments are presented by way of example only and that, within the scope of the appended claims and equivalents thereto, the invention may be practiced otherwise than as specifically described and claimed. The present invention is directed to each individual feature, aspect, embodiment, system, article, material, kit, and/or method described herein. In addition, any combination of two or more such features, aspects, embodiments, systems, articles, materials, kits, and/or methods, if such features, systems, articles, materials, kits, and/or methods are not mutually inconsistent, is included within the scope of the present invention.

The functions of the various elements shown in the figures, including any functional blocks labeled as a controller or processor, may be provided through the use of dedicated hardware as well as hardware capable of executing software in association with appropriate software. The functions may be provided by a single dedicated processor, by a single shared processor, or by a plurality of individual processors, some of which may be shared. Moreover, explicit use of the term controller or processor should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection.

Elements, components, modules, and/or parts thereof that are described and/or otherwise portrayed through the figures to communicate with, be associated with, and/or be based on, something else, may be understood to so communicate, be associated with, and/or be based on in a direct and/or indirect manner, unless otherwise stipulated herein.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

As used herein, use of the term "nominal" or "nominally" when referring to an amount means a designated or theoretical amount that may vary from the actual amount.

Spatially relative terms, such as "beneath," "below," "upper," "lower," "above", "left", "right" and the like may be used herein for ease of description to describe one element or feature's relationship to another element(s) or feature(s) as illustrated in the drawings. These spatially relative terms are intended to encompass different orientations of the device in use or operation in addition to the orientation shown in the drawings. For example, if the device in the drawings is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

Although the terms "first," "second," "third" etc. may be used to describe various elements, components, regions, layers and/or sections, these elements, components, regions, layers and/or sections are not to be limited by these terms as they are used only to distinguish one element, component, region, layer or section from another element, component, region, layer or section. Thus, a first element, component, region, layer or section could be termed a second element, component, region, layer or section without departing from the scope and teachings of the present invention.

Although the methods and systems have been described relative to specific embodiments thereof, they are not so limited. Obviously, many modifications and variations may become apparent in light of the above teachings. Many additional changes in the details, materials, and arrangement of parts, herein described and illustrated, may be made by those skilled in the art.

What is claimed is:

1. An extraction cleaner comprising:
   a base comprising:
      a frame,
      a door coupled to the frame, a bottom surface of the door defining at least a portion of an agitator cavity,
      at least one fluid dispensing nozzle coupled to the door, the at least one fluid dispensing nozzle being configured for distributing a cleaning fluid directly or indirectly onto a surface to be cleaned, and
      a suction nozzle removably coupled to the base, the suction nozzle defining a suction inlet configured to be disposed adjacent the surface to be cleaned;
   an upright body pivotally coupled to the base;
   an agitator disposed in the agitator cavity and configured for agitating the surface to be cleaned;
   a supply tank for storing the cleaning fluid;
   a recovery tank configured for receiving recovered fluid extracted from the surface to be cleaned by suction established at the suction inlet; and
   an auto-spray detector, the auto-spray detector comprising a floor contacting member configured to engage the surface to be cleaned, and being configured to pivot in response to movement of the base and engagement of the surface to be cleaned by the floor contacting member and configured to cause distribution of the cleaning fluid from the at least one fluid dispensing nozzle at a first flow rate when the base is moved in a forward direction and at a second, non-zero, flow rate when the base is moved in rearward direction.

2. The extraction cleaner according to claim 1, wherein the first flow rate is greater than the second flow rate.

3. The extraction cleaner according to claim 1, wherein the auto-spray detector comprises a detector body pivotally coupled to the frame, and a hammer being configured for contacting a switch arm of a switch upon rotation of the detector body for changing a state of the switch, and wherein the cleaning fluid is distributed from the at least one fluid dispensing nozzle in response to the state of the switch.

4. The extraction cleaner according to claim 1, the extraction cleaner further comprising:
   a flexible hose;
   a cleaning tool coupled to the flexible hose and having a suction inlet, wherein a cleaning tool airflow path extends from the suction inlet and through the flexible hose; and
   at least one cleaning tool fluid dispensing nozzle coupled to the cleaning tool.

5. The extraction cleaner according to claim 4, the extraction cleaner further comprising a fluid changeover valve, the fluid changeover valve having a base supply state wherein the cleaning fluid is fluidly coupled to a base supply line coupled to the at least one fluid dispensing nozzle of the base and a cleaning tool supply state wherein a second cleaning fluid is fluidly coupled to a cleaning tool supply line fluidly coupled to the at least one cleaning tool fluid dispensing nozzle.

6. The extraction cleaner according to claim 5, wherein the cleaning fluid is different from the second cleaning fluid.

7. The extraction cleaner according to claim 5, wherein the fluid changeover valve comprises a first fluid input port, a second fluid input port, a pump output port, a pump input port, a base output port and a cleaning tool output port, the first fluid input port being fluidly coupled for receiving the cleaning fluid and the second fluid input port being fluidly coupled for receiving the second cleaning fluid, the pump output port being coupled to an inlet port of a pump, the pump input port being fluidly coupled to an outlet of the pump, the base output port being fluidly coupled to the base supply line and the cleaning tool output port being fluidly coupled to the cleaning tool supply line.

8. The extraction cleaner according to claim 7, wherein the fluid changeover valve comprises at least one valve member, wherein when the fluid changeover valve is in the base supply state the at least one valve member fluidly couples the first fluid input port to the pump output port and the pump input port to the base output port, and blocks fluid communication from the second fluid input port to the pump output port and fluid communication from the pump input port to the cleaning tool output port, and
   when the fluid changeover valve is in the cleaning tool supply state, the at least one valve member fluidly couples the second fluid input port to the pump output port and the pump input port to the cleaning tool output port, and blocks fluid communication from the first fluid input port to the pump output port and fluid communication from the pump input port to the base output port.

9. The extraction cleaner according to claim 8, wherein the at least one valve member comprises a first valve member disposed in a first chamber and a second valve member disposed in a second chamber, wherein the fluid changeover valve is in the base supply state when the first valve member is in a first position in the first chamber the second valve member is in a first position in the second the second chamber and the fluid changeover valve is in the cleaning tool supply state when the first valve member is in a second position in the first chamber and the second valve member is in a second position in the second chamber.

10. The extraction cleaner according to claim 7, the extraction cleaner further comprising a mixing valve, the mixing valve having a first mixing valve inlet, a second mixing valve inlet, a first mixing valve outlet and a second mixing valve outlet, the first and second mixing valve inlets and the first mixing valve outlet being fluidly coupled to a mixing cavity, whereby the first fluid received at the first mixing valve inlet and a second fluid received at the second input port are mixed in the mixing cavity and a mixture of the first and second fluids are provided at the first mixing valve outlet, the first mixing valve inlet being fluidly coupled to the second mixing valve outlet for providing a first fluid received at the first mixing valve inlet at the second mixing valve outlet, wherein the second mixing valve outlet is fluidly coupled to the first fluid input port of the fluid changeover valve and the first mixing valve outlet is fluidly coupled to the second fluid input port of the fluid changeover valve.

11. The extraction cleaner according to claim 4, the extraction cleaner further comprising a suction changeover valve, the suction changeover valve comprising:
a base inlet port fluidly coupled to a base airflow path;
a cleaning tool inlet port fluidly coupled to the cleaning tool airflow path; and
an outlet port fluidly coupled to the recovery tank,
the suction changeover valve having a base suction state wherein the outlet port is fluidly coupled to the base inlet port for receiving the recovered fluid from the surface to be cleaned through the base airflow path and into the recovery tank and a cleaning tool suction state wherein the outlet port is fluidly coupled to the cleaning tool inlet port for receiving the recovered fluid from the target surface through the cleaning tool inlet port and into the recovery tank.

12. The extraction cleaner according to claim 11, wherein the suction changeover valve comprises:
a housing defining the base inlet port, the cleaning tool inlet port, the outlet port, and a rotor cavity; and
a rotor rotatably disposed in the rotor cavity and comprising a plug, the rotor being rotatable between a first orientation wherein the suction changeover valve is in the base suction state and the plug blocks fluid communication between the outlet port and the cleaning tool inlet port and a second orientation wherein the suction changeover valve is in the cleaning tool suction state and the plug blocks fluid communication between the outlet port and the base inlet port.

13. The extraction cleaner according to claim 12, wherein the rotor comprises a handle extending outwardly from the rotor and configured to manipulated by a user for moving the rotor between the first orientation and the second orientation.

14. The extraction cleaner according to claim 11, the extraction cleaner further comprising a fluid changeover valve, the fluid changeover valve having a base supply state wherein the cleaning fluid is fluidly coupled to the base supply line and a cleaning tool supply state wherein a second cleaning fluid is fluidly coupled to the cleaning tool supply line, and wherein the fluid changeover valve is coupled to the suction change over valve, whereby when the suction changeover valve is placed in the base suction state the fluid changeover valve is placed in the base supply state and when the section changeover valve is placed in the cleaning tool suction state the fluid changeover valve is placed in the cleaning tool supply state.

15. The extraction cleaner according to claim 14, wherein the suction changeover valve is coupled to the fluid changeover valve through a connecting rod, the connecting rod having at least one valve engagement surface for contacting at least one valve member to move the fluid changeover valve to the base supply state or the cleaning tool supply state.

16. The extraction cleaner according to claim 15, wherein the suction changeover valve comprises a cam configured to cause linear movement of a cam follower, and wherein the connecting rod is coupled to the cam follower.

17. The extraction cleaner according to claim 1, the extraction cleaner further comprising:
a flexible hose;
a cleaning tool coupled to the flexible hose and having a suction inlet, wherein a cleaning tool airflow path extends from the suction inlet and through the flexible hose;
at least one cleaning tool fluid dispensing nozzle coupled to the cleaning tool;
an additive tank for storing a second cleaning fluid; and
at least one valve fluidly coupled to the additive tank for controlling supply of the second cleaning fluid to the at least one fluid dispensing nozzle or the cleaning tool fluid dispensing nozzle.

18. The extraction cleaner according to claim 1, the base further comprising at least one inlet port extending through an associated opening in the door, the inlet port being fluidly coupled to a base supply line below the bottom surface of the door and being fluidly coupled to a supply tube above a top surface of the door, the supply tube being fluidly coupled to the at least one fluid dispensing nozzle.

19. The extraction cleaner according to claim 1, wherein the at least one fluid dispensing nozzle comprises a first fluid dispensing nozzle and a second fluid dispensing nozzle, and wherein the base further comprises:
a first inlet port and a second inlet port, the first and second inlet ports each being fluidly coupled to the base supply line below a bottom surface of the door, the first inlet port being fluidly coupled to a first supply tube above a top surface of the door and the second inlet port being fluidly coupled to a second supply tube above a top surface of the door, the first and second supply tubes being fluidly coupled to the first and second fluid dispensing nozzles, respectively;
a first cover disposed on the top surface of the door and disposed over at least a portion of the first fluid dispensing nozzle, the first supply tube, and the first inlet port; and
a second cover disposed on the top surface of the door and disposed over at least a portion of the second fluid dispensing nozzle, the second supply tube, and the second inlet port,
wherein at least a portion of the suction nozzle is received in a cavity defined by the top surface of the door, a side surface of the first cover, and a side surface of the second cover.

* * * * *